United States Patent [19]

Barkans

[11] Patent Number: 5,519,823

[45] Date of Patent: May 21, 1996

[54] APPARATUS FOR RENDERING ANTIALIASED VECTORS

[75] Inventor: Anthony C. Barkans, Ft. Collins, Colo.

[73] Assignee: Hewlett-Packard Company

[21] Appl. No.: 371,663

[22] Filed: Jan. 11, 1995

Related U.S. Application Data

[63] Continuation of Ser. No. 670,552, Mar. 15, 1991, abandoned.

[51] Int. Cl.⁶ .................................................. G06F 15/62
[52] U.S. Cl. ............................................................ 395/143
[58] Field of Search .................................... 395/130, 131, 395/141, 142, 143, 164, 155, 161, 140; 345/150, 152

[56] References Cited

U.S. PATENT DOCUMENTS

| | | | |
|---|---|---|---|
| 4,593,372 | 6/1986 | Bandai et al. | 364/719 |
| 4,996,653 | 2/1991 | Butler et al. | 364/521 |
| 5,025,405 | 6/1991 | Swanson | 364/723 |
| 5,185,599 | 2/1993 | Doornink et al. | 340/747 |
| 5,185,856 | 2/1993 | Alcorn et al. | 395/130 |
| 5,220,650 | 6/1993 | Barkans | 395/163 |
| 5,265,210 | 11/1993 | Vatti et al. | 395/143 |
| 5,287,442 | 2/1994 | Alcorn et al. | 395/143 |

OTHER PUBLICATIONS

S. Gupta and Robert F. Sproull, "Filtering Edges For Gray-Scale Displays", Computer Graphics vol. 15, No. 3 (Aug. 1981).

T. Duff, "Compositing 3-D Rendered Images", Computer Graphics vol. 19, No. 3 (1985).

A. C. Barkans, "High Speed High Quality Antialiased Vector Generation," Computer Graphics, vol. 24, No. 4, Aug. 1990, p. 321.

"Filtering Edges for Gray-Scale Displays," *Computer Graphics*, vol. 15, No. 3, (Aug. 1981), pp. 1–5.

T. Duff, "Compositing 3-D Rendered Images," *San Francisco Jul. 22–26*, vol. 19, No. 3 (1985), pp. 41–43.

Akira Fujimoto and Kansei Iwata, "Jag-Free Images on Raster Displays," *IEEE Computer Graphics & Applications*, (Dec. 1983), pp. 26–34.

J. E. Bresenham, "Algorithm for computer control of a digital plotter," *IBM Systems Journal*, vol. 4, No. 1 (1965), pp. 25–30.

James F. Blinn, "What We Need Around Here Is More Aliasing," *IEEE Computer Graphics & Applications*, (1989), pp. 75–79.

James F. Blinn, "Return of the Jaggy," *IEEE Computer Graphics & Applications*, (Mar. 1989), pp. 82–89.

David Oakley, "Dejagging Raster Graphics by Pixel Phasing," *SID 86 Digest*, (1986), pp. 344–347.

*Primary Examiner*—Phu K. Nguyen

[57] ABSTRACT

A color/texture interpolator (CTI) for use in rendering antialiased vectors in a computer graphics system comprises: an x-stepper circuit for receiving input data defining a vector to be rendered and generating respective pixel addresses of pixels composing the vector; a filter memory for storing predetermined filter values addressed according to the vector's minor axis subpixel addresses and slope; and a color interpolator for generating a color value for each pixel composing the vector.

15 Claims, 8 Drawing Sheets

FIG. 1
(PRIOR ART)
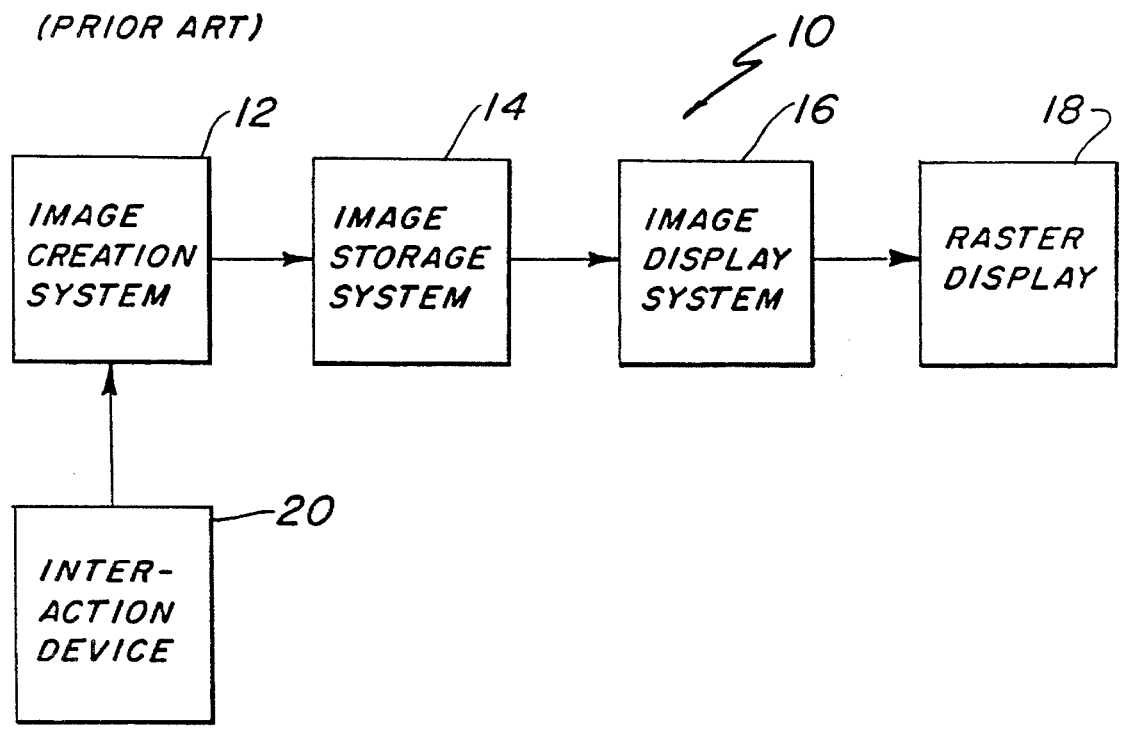
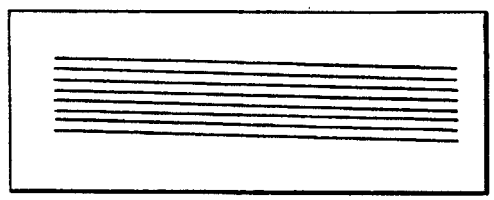
FIG. 3(a)
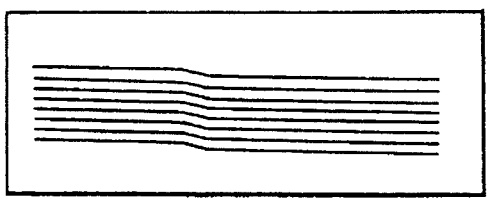
FIG. 3(c)
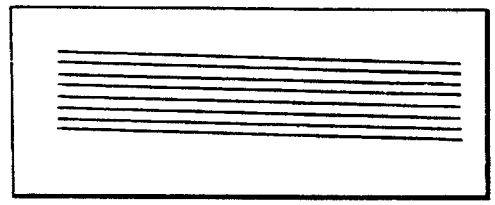
FIG. 3(b)
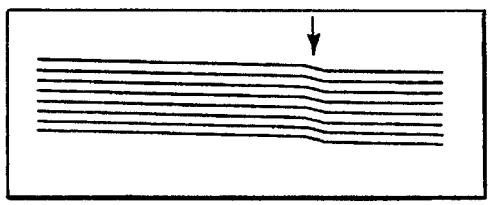
FIG. 3(d)

APPARATUS FOR RENDERING ANTIALIASED VECTORS

CROSS REFERENCE TO RELATED APPLICATION

This is a continuation of application Ser. No. 07/670,552 filed on Mar. 15, 1991, now abandoned.

FIELD OF THE INVENTION

The present invention generally relates to the field of computer graphics, and more particularly relates to apparatuses for rendering antialiased vectors in an interactive computer graphics system. Still more particularly, the present invention relates to a high speed color/texture interpolator (CTI). A computer graphics system embodying the present invention comprises components that are related to the present invention in one way or another. These related components are described in the following copending applications, each of which is hereby incorporated by reference into the instant application:

Application Ser. No. 495,005, filed Mar. 16, 1990, entitled "Arithmetic And Logic Processing Unit For Computer Graphics System;"

Application Ser. No. 639,626, filed Jan. 19, 1991, entitled "Serpentine Rendering Of Antialiased Vectors;"

Application Ser. No. 644,188, filed Jan. 22, 1991, entitled "High Speed Method For Rendering Antialiased Vectors;"

Application Ser. No. 669,824, filed Mar. 15, 1991, entitled "Dynamic Scheduling of a Pipelined Processor for Parallel Execution of Multiple Processes."

Application Ser. No. 670,081, filed Mar. 15, 1991, entitled "Command Pipelining For A High-Speed Computer Graphics System."

Application Ser. No. 669,150, filed Mar. 12, 1991, entitled "A Polygon Renderer For A Computer Graphics System."

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever or joystick. See *Fundamentals of Interactive Computer Graphics*, by J. D. Foley and A. Van Dam, ISBN: 0-201-14468-9. The creation of synthetic images (i.e., images which exist as abstract collections of lines, points, curves, etc., in the computer's memory) is the usual domain of interactive computer graphics.

The two primary classes of interactive computer graphics systems are random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. As explained below, the data is stored in a "frame buffer" (also called a "refresh buffer").

In the random-scan system the component points of each successive output primitive are stored sequentially in memory and plotted in the same order, one point at a time. This is because the beam may be moved randomly on the screen. In the raster-scan system the frame buffer memory is arranged as a 2-dimensional array of data. The value stored at a particular row and column encodes an intensity and/or color value of a corresponding display element on the screen. The location of each display element is typically specified by a unique (X,Y) coordinate. Since each memory location defines a single point-sized element of an image, both the display screen location and its corresponding memory location are often called a "pixel," short for "picture element." Hereinafter, to avoid confusion, the term "display pixel" will be used to indicate picture elements of a display device, and "storage pixel" to indicate memory locations corresponding to the display pixels.

FIG. 1 is a simplified block diagram of a raster-scan graphics system 10, which includes an image creation system 12, an image storage system 14 (such as a frame buffer), an image display system 16, a raster-scan display 18 and an interaction device 20. The image creation system 12 converts output primitives into the data stored in the frame buffer of the image storage system 14. The processing speed of the image creation system 12 establishes most of the characteristics of the overall raster-scan system 10. Moreover, the image creation system 12 is particularly malleable because it is typically implemented with a microprocessor. The overall speed at which the stored image data can be modified is dependent upon, among other things, how fast the image creation system executes instructions. It is the image creation system's execution of instructions which is often the slowest process in creating or changing an image. This is because the "scan conversion" algorithm (described below) typically requires many iterations. Usually, the faster the scan conversion algorithm, the faster the overall system response time to user commands. Moreover, it is known that response time is critical to user satisfaction and, more importantly, to user productivity.

The process of converting a mathematical representation of an image to the array of pixel data in the image storage system 14 is called "scan conversion." Scan conversion algorithms are always needed in a raster-scan graphics system and are usually carried out by the image creation system 12. The scan conversion algorithm is typically invoked hundreds or even thousands of times each time an image is created or modified; therefore, it must not only create visually pleasing images, but must also execute as rapidly as possible. Indeed speed versus image quality is the basic tradeoff inherent in known scan conversion algorithms. Some scan conversion algorithms are fast and create images with jagged edges, while others are slower and create images with smoother edges; however it can generally be said that faster is better for a given smoothness of image.

FIG. 2 depicts an exemplary line, y=mx+b, along with a vector 22 as it might be rendered (i.e., stored) in the frame buffer of the image storage system 14. Vector 22 is composed of a set of display pixels $P_0, P_1, P_2, \ldots P_N$ driven by a corresponding set of storage pixels in the frame buffer. Vector 22 is rendered by stepping along the major axis, in this case the X-axis, and computing corresponding minor axis (Y-axis) ordinate values. These (X,Y) coordinates define the storage and display pixels composing the vector 22. The basic task in scan converting a line is computing the integer coordinates of the display pixels lying nearest the line, determining the storage pixel addresses corresponding to those display pixels, and determining a value to assign to each storage pixel.

As can be seen from vector 22, the limited resolution of the frame buffer 14 and display device 18 causes the vector to become jagged, or "aliased." Techniques for generating antialiased (i.e., smooth) vectors are known in the art. See, e.g., Chapter 11.2.3 of *Fundamentals of Interactive Computer Graphics*, referenced above, and references cited therein for details of known antialiasing techniques. The problem with these known antialiasing techniques is that they are too slow for many applications.

FIGS. 3(a) and 3(c) depict two sets of vectors. The endpoint description of the set shown in FIG. 3(a) is a simple horizontal translation of the endpoint description of the set shown in FIG. 3(c). Both sets of vectors have a slope of 1/200. The vectors of FIG. 3(a) have been filtered, i.e., are antialiased, while the vectors of FIG. 3(c) are aliased. The spatial aliasing shown by the unfiltered set of vectors in FIG. 3(c) is not the only aliasing problem in computer generated graphics. Another aliasing problem is shown in FIGS. 3(b) and 3(d). The vectors in FIG. 3(b) are the same as those in FIG. 3(a), and the vectors in FIG. 3(d) are the same as those in FIG. 3(c), with the exception that the vectors in FIGS. 3(b) and 3(d) have been vertically translated one-half pixel. If these two sets of aliased and antialiased vectors are displayed as part of a real time series, the antialiased vectors will have the correct apparent motion, i.e., the antialiased vectors will appear to be slowly moving up, while the aliased vectors will appear to be quickly moving in the horizontal direction. The arrow in FIG. 3(d) points to a step in the displayed pixels, which is similar to the steps in FIG. 2, e.g., between $P_1$ and $P_2$ This step is noticeably offset from the step in FIG. 3(c). The motion of these steps dominate the apparent motion of the unfiltered vectors in the real time series. I.e., the image on the right will appear to move at the wrong speed and in the wrong direction. This artifact is called "aliasing-induced motion." A viewer sees a combination of all aliasing artifacts, including those due to both spatial aliasing and aliasing-induced motion. As pixel rendering speed increases and the goal of real-time generation of images is approached, aliasing-induced motion becomes greater and the total aliasing problem becomes more troublesome. See A. C. Barkans, "High Speed High Quality Antialiased Vector Generation," *Computer Graphics*, Vol. 24, Number 4, August 1990, which is incorporated herein by reference.

Users of interactive graphics systems now expect vector generation to be fast enough to support the real time display of user-controlled complex images. This has aggravated the aliasing problem since aliasing-induced motion is added to the formerly dominant static spatial aliasing. Most of the research into techniques for rendering antialiased vectors has focused on the use of "filtering" to remove the aliasing artifacts (which may be thought of as due to high frequency quantization "noise"). When filtering is used, the intensity of a display pixel is determined by the image brightness within a small area around the idealized line y=mx+b, not by the brightness at the pixel's center. Filtering is controlled by a "filter function" that describes the spatial distribution of light emitted by a display pixel; i.e., filtering is an averaging process, and the filter function in effect provides a weighting function for the averaging process. See, S. Gupta and R. F. Sproull, "Filtering Edges for Gray-Scale Displays," Proceedings of SIGGRAPH '81, Computer Graphics, Vol. 15, Number 3 (August 1981), wherein the authors suggest truncating the filter function so that a lookup table of filter values can be used, thus increasing scan conversion speed relative to the speed achievable by computing the filter values while rendering; however, using lookup tables as suggested by Gupta and Sproull still results in a decrease in scan conversion speed over rendering aliased vectors.

The numerical values that result from filtering are often thought of as intensity values; however, the use of intensity values places limitations on the usefulness of the vectors. In many applications it is necessary to compose the image with differently-colored vectors, each of which is shaded and/or depth-cued. (Depth cueing is a process designed to enhance a user's comprehension of three dimensional images by varying a pixel's intensity with the pixel's distance from the user's viewpoint.) The limitations inherent in storing intensity values may be removed by using "alpha" values in combination with color values to produce intensity values in rendering antialiased vectors. See T. Duff, "Compositing 3-D Rendered Images," Proceedings of SIGGRAPH '85, Computer Graphics, Vol. 19, Number 3 (July 1985). Elmquist combined using the alpha values of Duff in the filter table of Gupta. See A.C. Barkans, "High Speed High Quality Antialiased Vector Generation," *Computer Graphics*, Vol 24, No 4, August 1990, pg. 321. An important goal of the present invention is to provide a high speed solution to the problem of rendering antialiased vectors at speeds formerly achievable only when rendering aliased vectors. A further object of the present invention is to provide high speed hardware for rendering antialiased vectors (as opposed to the slower sequential software techniques that are known).

SUMMARY OF THE INVENTION

The present invention provides an apparatus, called an "X-Stepper," for use in rendering antialiased vectors in a computer graphics system. The X-Stepper computes position data for pixels that compose the vectors and is capable of addressing respective filter (alpha) values stored in a filter lookup table for use in generating pixel values. Moreover, the invention provides means for rendering antialiased vectors at speeds not possible with known sequential (e.g., software and other hardware) solutions. The invention encompasses the X-Stepper per se and a computer graphics system comprising an X-Stepper.

An X-Stepper for generating minor axis coordinates of pixels composing a vector to be rendered comprises input means for receiving input data defining a vector to be rendered, the input data including major axis start data, minor axis start data, and slope data; first register means for storing the major axis start data, the contents of the first register means defining current major axis data; second register means for storing the minor axis start data; third register means for storing at least an integer part of the minor axis start data, the contents of the third register means defining current minor axis data; and minor step means for incrementing and/or decrementing the current minor axis data. The X-Stepper is thus capable of generating minor axis data for additional pixels corresponding to the current major and minor axis data.

In a preferred embodiment, the input data further includes X-axis end data, and the X-Stepper further comprises fourth register means for storing the X-axis end data; and first comparator means for comparing the current X-axis data to the X-axis end data and producing a signal indicative of the result of the comparison.

A second embodiment further comprises major step means for adjusting (e.g., incrementing and/or decrementing) the current major axis data.

A third embodiment further comprises filter address means for addressing a filter memory adapted for storing antialiasing filter values.

Another embodiment of the invention comprises an X-Stepper in combination with a filter memory adapted for storing antialiasing filter values.

In yet another embodiment the filter values are addressable in accordance with particular combinations of vector slope and minor axis subpixel position corresponding to the pixel to be rendered. The X-Stepper in this case may advantageously comprise means for providing address data to the filter memory to access the filter values, wherein the address data is indicative of the slope and minor axis subpixel position.

The X-Stepper most preferably will comprise means for generating data for at least two, but preferably three, minor axis positions corresponding to the pixels to be rendered at each major axis step.

In a still more preferred embodiment, the input data further comprises endpoint color data defining color values corresponding to endpoints of the vector to be rendered. In this case, the invention encompasses an X-Stepper in combination with color interpolator means for receiving the endpoint color data and interpolating color data for each pixel composing the vector.

The invention further encompasses a combination X-Stepper/color interpolator means in combination with a frame buffer and blending means for computing new pixel data for the vector to be rendered, the new pixel data based upon the filter values and color data.

The present invention also encompasses a computer graphics system which includes image creation means for computing color data corresponding to endpoints of a vector and for computing major and minor axis position data for at least one pixel at each of a plurality of major axis steps; filter memory means for storing predetermined antialiasing filter values; stepper means comprising (1) means for receiving input data defining the position of a first pixel composing a vector to be rendered, (2) means for computing respective minor axis ordinates of at least one additional pixel for antialiasing the vector, and (3) means for addressing filter values for the first pixel and the additional pixel(s); and color interpolator means for receiving the endpoint color data and position data for at least one pixel at each major axis step and on the basis thereof interpolating color data for each pixel composing the vector. The computer graphics system further includes blending means for computing new pixel data for the vector to be rendered, the new pixel data based upon the filter values and color data, and frame buffer means for storing the new pixel data.

BRIEF DESCRIPTION OF THE DRAWINGS

FIG. 1 is a block diagram of a raster-scan graphics system.

FIGS. 3(a) and 3(c) depict a set of antialiased vectors and a corresponding set of aliased vectors, respectively. FIGS. 3(b) and 3(d) depict the same sets of vectors depicted in FIGS. 3(a) and 3(c) shifted up one-half pixel.

DETAILED DESCRIPTION OF THE PREFERRED EMBODIMENT

Figure 4:
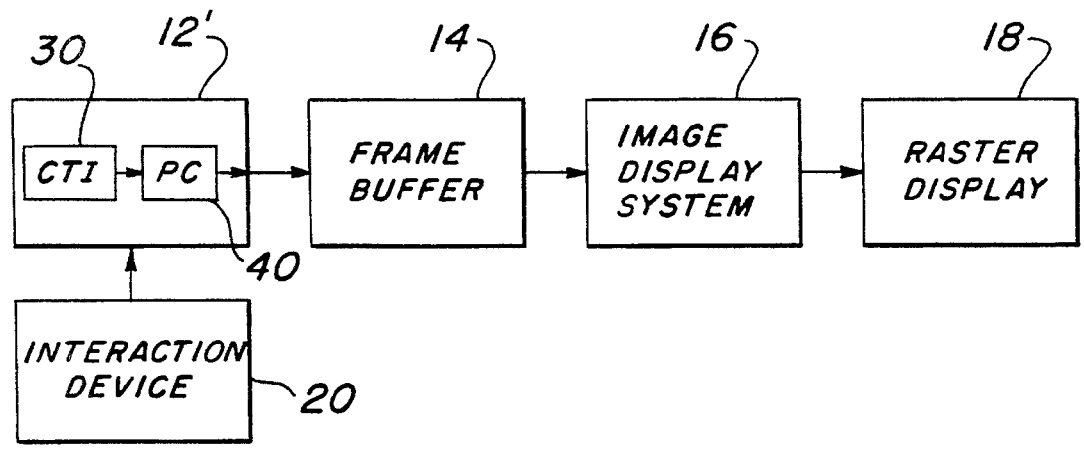
FIG. 4 is a block diagram of a raster-scan graphics system in accordance with the present invention.

FIG. 4 depicts a raster-scan graphics system in accordance with the present invention. The difference between FIGS. 1 and 4 is that the image creation system 12' of FIG. 4 includes a CTI chip 30 coupled to a pixel cache (PC) 40 (PC 40 is the subject of copending application Ser. No. 495,005, filed Mar. 16, 1990, entitled "Arithmetic And Logic Processing Unit For Computer Graphics System," which is hereby incorporated by reference into the instant application). In the preferred embodiment, CTI 30 is a Color/Texture Interpolator, part no. 1FY5-0001, manufactured by Hewlett Packard Co., Palo Alto, Calif. The present invention is particularly directed to the X-Stepper 33 of CTI 30 (see FIGS. 8 and 9), and more particularly to a computer graphics system comprising one or more CTIs including the X-Stepper.

Figure 2:
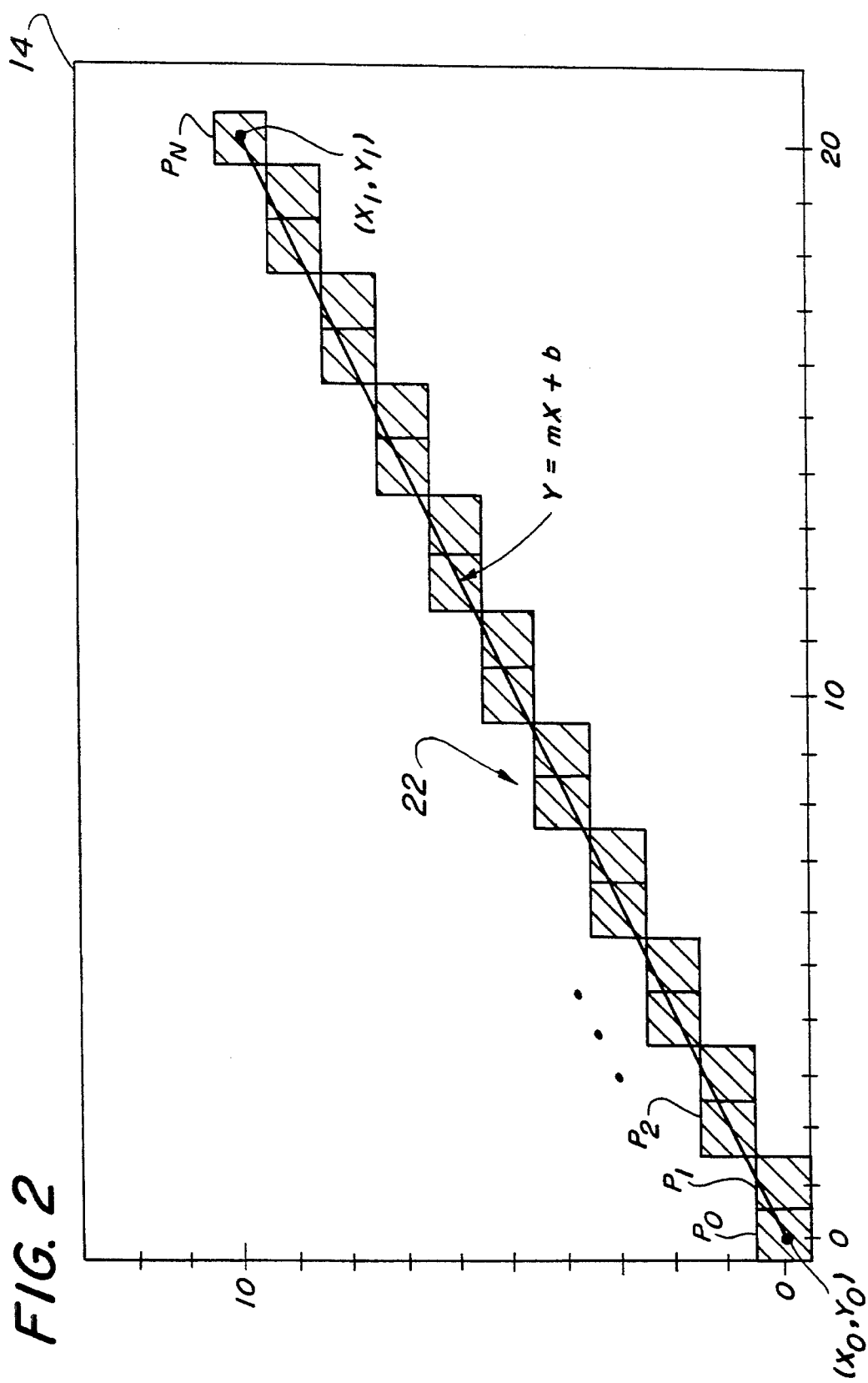
FIG. 2 is a depiction of an aliased vector.
Figure 5:
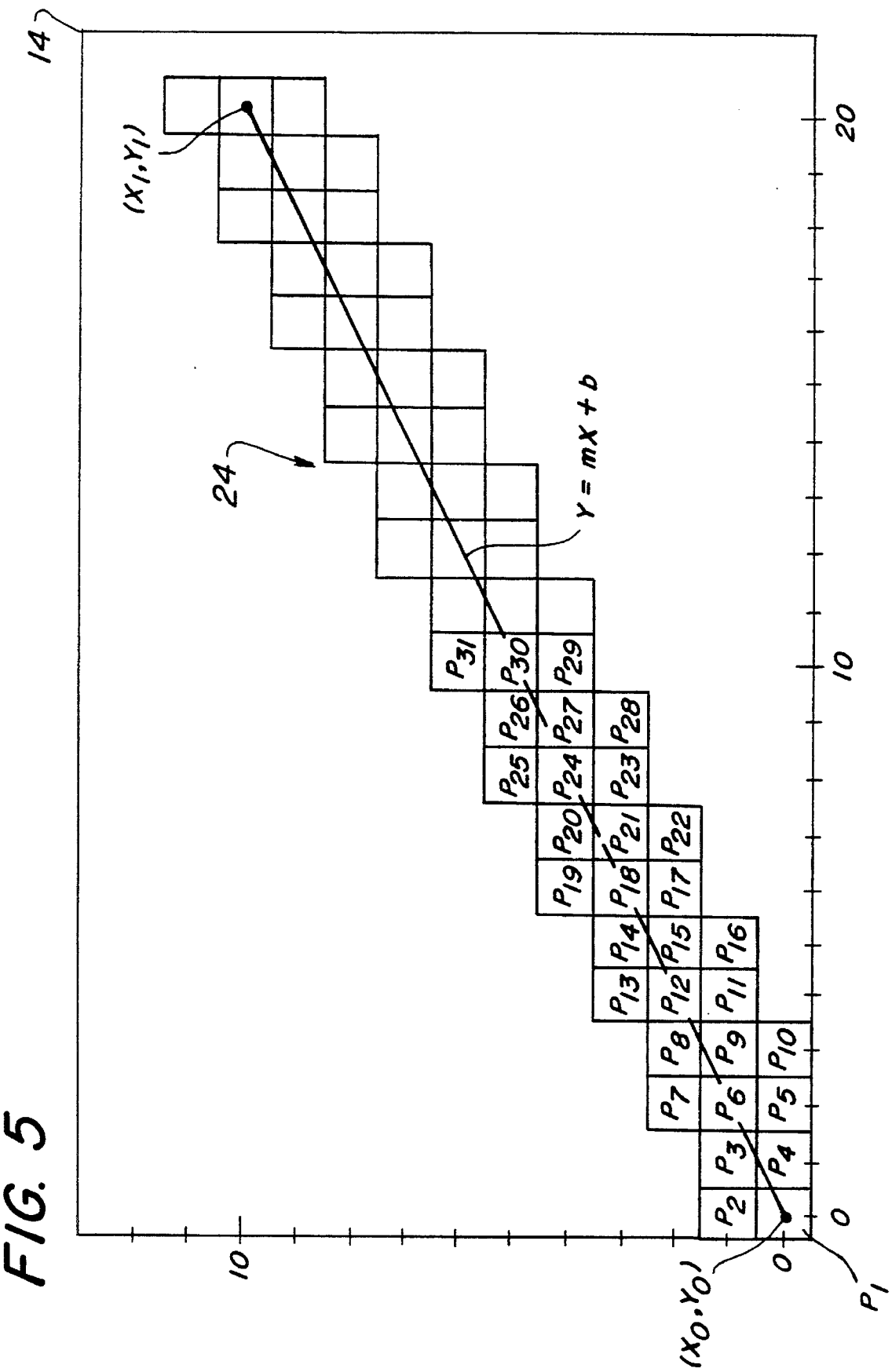
FIG. 5 depicts an antialiased vector.

FIG. 5 depicts an antialiased vector 24 corresponding to the line y=mx+b from the point ($X_0=0$, $Y_0=0$) to the point ($X_1=20$, $Y_1=10$). This is the same line represented in FIG. 2 by the aliased vector 22. The antialiased vector 24 is preferably composed of three pixels for each major axis step. Vector 24 has a major axis in the horizontal (X) direction and a minor axis in the vertical (Y) direction. Vector 24 is rendered at each major axis step, beginning at the first major axis step $X_0$, by rendering groups of three pixels along the minor axis. (Note that one of the three pixels at each of the first two major axis steps is "clipped" by the lower window boundary.) The Y ordinate of the middle pixel in each group of three pixels corresponds as nearly as possible to the line y=mx+b; however, as with the aliased vector 22 discussed above, there will still be some error due to the limited number of storage pixels in the frame buffer and the limited number of display pixels. The smoother appearance of antialiased vector 24 is achieved by "filtering," i.e., tapering the intensity distribution of the display pixels along the vector minor axis (Y-axis). For example, one such scheme is to assign all pixels centered exactly on the line y=mx+b (e.g., $P_1$ and $P_{30}$) a peak intensity, and assign their neighboring pixels along the minor axis an intensity less than the peak intensity. A set of pixels centered below (above) the line (e.g., $P_8$, $P_9$, $P_{10}$) is assigned an intensity distribution weighted more heavily above (below) the line. There are many possible intensity distribution functions that will achieve a satisfactory result, however the Hamming function (a modification of the two-dimensional Sinc function (sinR/R), where $R=(X^2+Y^2)^{1/2}$) is most preferred. Antialiased vector 24 is rendered by first rendering pixel $P_1$, then $P_2$, then $P_3$, then $P_4$ and so on, in the order shown. (The immediately-preceding sentence holds for a single processor system. In a multi-processor system, multiple pixels are rendered simultaneously.) At each new major axis step the rendering order along the minor axis changes direction; e.g., at the first major axis step $P_1$ and $P_2$ are rendered in the positive minor axis direction, while at the second major axis step $P_3$ and $P_4$ are rendered in the negative minor axis direction. See copending application Ser. No. 639,626, filed Jan. 19, 1991, entitled "Serpentine Rendering Of Antialiased Vectors," which is hereby incorporated by reference into the instant application.

To take full advantage of modern VLSI parallel processing technology, a parallel processor algorithm (the Barkans algorithm) for vector generation was developed. This algorithm is described in copending application Ser. No. 644, 188, filed Jan. 22, 1991, entitled "High Speed Method For Rendering Antialiased Vectors," which is hereby incorporated by reference into the instant application. This algorithm efficiently matches the apparatus of the present invention with an image space sub-division; i.e., the algorithm is most efficiently carried out by the CTI of the present invention.

Figure 6:
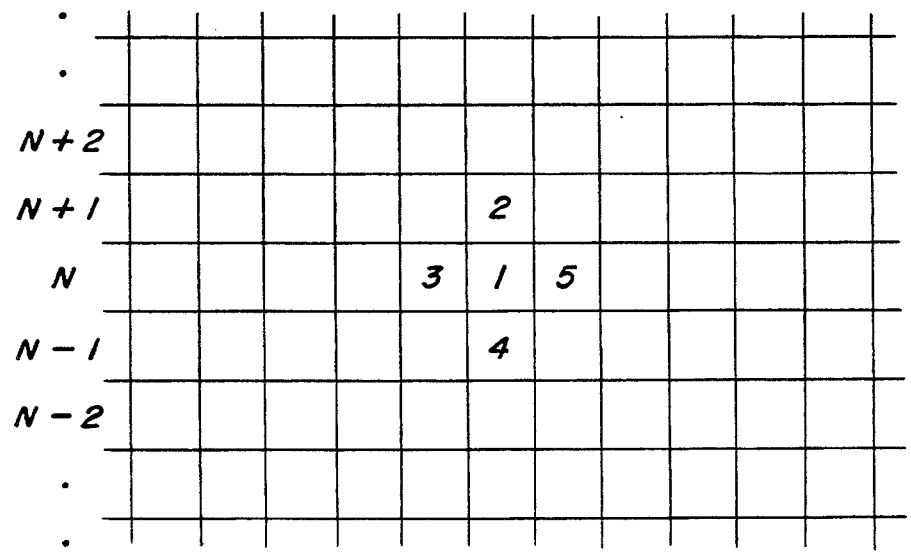
FIG. 6 depicts alternative positions of a first-rendered pixel for a major axis step.

FIG. 6 shows the positions where the pixels for a major axis step may be located. The grid represents pixel locations on a CRT display. The image space is subdivided along scan lines such that in a four processor system each processor is responsible for every fourth scan line. The figure is based on the assumption that the current major and minor axis addresses point to pixel location 1. For an aliased vector, only pixel 1 is rendered at the current major axis step. A Y-major antialiased vector requires that the processor responsible for scan line N render the pixels designated 3, 1 and 5. An X-major antialiased vector requires the pixels designated 2, 1 and 4 be rendered. In a four processor system a different processor renders each of the pixels required for each major axis step of an X-major antialiased vector.

Figure 7:
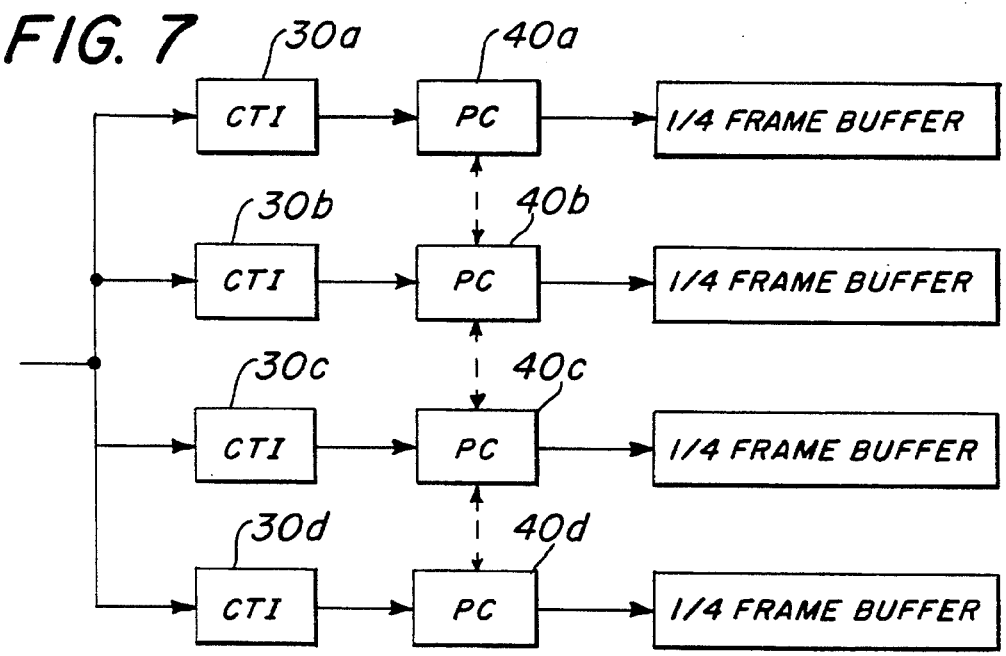
FIG. 7 is a block diagram of a multiprocessor rendering system in accordance with the present invention.

FIG. 7 depicts a portion of a multiprocessor rendering system comprising four parallel CTIs 30a–d coupled to four pixel caches 40a–d, which are each in turn coupled to one-fourth of the storage pixels in the frame buffer; in other words, responsibility for the image space (or frame buffer space) is divided amongst CTIs 30a–d and pixel caches 40a–b. This division of the image space significantly improves rendering speed. When using filter values, or "alpha" values, to antialias a vector, the color at each major axis step is first determined. The three pixels along the minor axis are then each assigned an alpha value. The final color of each pixel is determined by multiplying the color value corresponding to the major axis step by the unique alpha value of each pixel and blending it into the frame buffer. This blending operation is performed in pixel cache units 40a–d in the preferred embodiment. See the above-referenced copending application Ser. No. 495,005.

Figure 8:
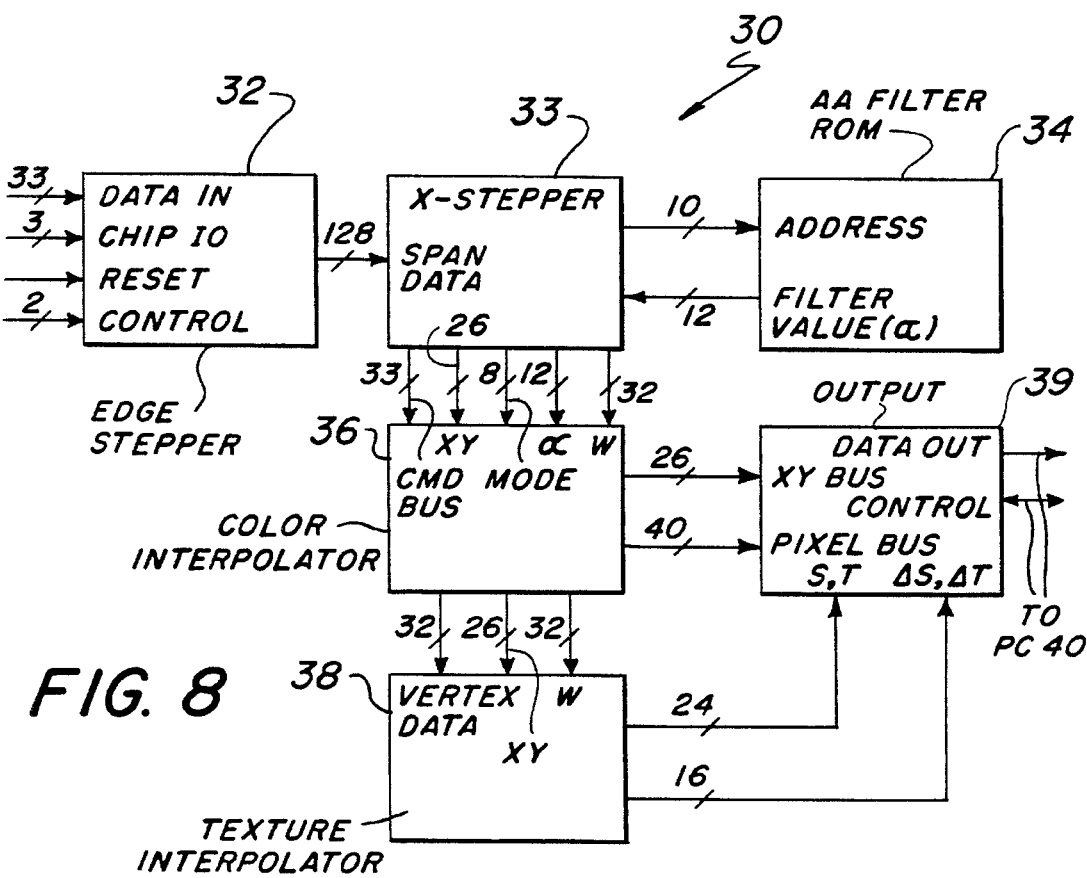
FIG. 8 is a block diagram of a color/texture interpolator (CTI) in accordance with the present invention.

Referring now to FIG. 8, a CTI 30 comprises an Edge Stepper 32, X-Stepper 33, antialiasing (AA) filter ROM 34, Color Interpolator 36, Texture Interpolator 38, and Output Interface 39. (Edge Stepper 32 is described in the above-referenced application Ser. No. 669,150, filed Mar. 12, 1991, entitled "A Polygon Renderer For A Computer Graphics System.") These elements work together to generate respective pixel values for all pixels composing a vector. The pixel generation, or scan conversion, process includes three sub-processes: generating color data, accessing the filter values and updating the frame buffer. Input data, denoted "Data In," is provided to Edge Stepper 32 by the applications program. This data includes the address of the first pixel (i.e., at position 1 of FIG. 6) corresponding to the starting point of the vector, the vector's slope, the vector's length, and an indication of the vector's major axis. The Edge Stepper 32 and X-Stepper 33 use this information to step along the major axis and compute the minor axis ordinate at each step. The two devices are controlled by a programmable logic array (PLA) (not shown), as described below with reference to FIGS. 9a–9c. (Pseudo code representing the operation of the PLA is included in the appendix to the instant application.) The X-Stepper passes the integer major axis locations of the pixels to be rendered to the Color Interpolator 36. This information is received at the port denoted "XY" of Color Interpolator 36. In addition, red, green and blue color data for the endpoints of the vector are sent to the Color Interpolator 36 (this is done only once, at setup). Endpoint data includes the respective colors and major axis addresses corresponding to both endpoints of the vector. This data is received at the port denoted "CMD BUS" of Color Interpolator 36. The color for each major axis step is then found by a perspective interpolation calculation (e.g., for depth cuing) involving the endpoint data and the current position.

Alpha values are stored in the AA Filter ROM 34 with twelve bits of resolution. The values are accessed by the X-Stepper 33 with a ten bit address ("ADDRESS"), where the upper two address bits access one of four sub-tables. These sub-tables are called "top," "middle," "bottom" and "aliased." The filter values corresponding to various combinations of subpixel positions and slopes are stored in the top, middle, and bottom sub-tables. The aliased table consists of only a single value (4095, or binary "111111111111") that is used when rendering aliased vectors.

Four bits of position data and four bits of slope data make up the lower eight address bits. The four bits of position data define the subpixel position, along the minor axis, of the pixel being rendered. These four bits are taken directly from a minor axis position register in the X-Stepper 33 (register 58 of FIG. 9a).

To generate the four slope bits, six bits of slope data (called "MINOR_SLOPE" in the above-referenced article "High Speed High Quality Antialiased Vector Generation") are used: the sign bit, the 45_DEGREE bit and the first four bits of fraction. These six bits are sent through combinational logic to produce four bits corresponding to the absolute value of the slope within an octant. The four bits produced by the combinational logic, denoted "SLOPE_OUT[0]," "SLOPE_OUT[1]," "SLOPE_OUT[2]" and "SLOPE_OUT[3]," are defined in accordance with the following logical formulas:

| | |
|---|---|
| SLOPE_OUT[0] := | (((( ̄MSB_SLOPE * SLOPE_IN[0]) + (MSB_SLOPE *  ̄SLOPE_IN[0]) + ( ̄MSB_SLOPE * SLOPE_IN[4])) * SET_SLOPE) + (SLOPE_OUT[0] *  ̄SET_SLOPE)) |
| SLOPE_OUT[1] := | (((( ̄MSB_SLOPE * SLOPE_IN[1]) + (MSB_SLOPE *  ̄SLOPE_IN[1]) + ( ̄MSB_SLOPE * SLOPE_IN[4])) * SET_SLOPE) + (SLOPE_OUT[1] *  ̄SET_SLOPE)) |
| SLOPE_OUT[2] := | (((( ̄MSB_SLOPE * SLOPE_IN[2]) + (MSB_SLOPE *  ̄SLOPE_IN[2]) + ( ̄MSB_SLOPE * SLOPE_IN[4])) * SET_SLOPE) + (SLOPE_OUT[2] *  ̄SET_SLOPE)) |
| SLOPE_OUT[3] := | (((( ̄MSB_SLOPE * SLOPE_IN[3]) + (MSB_SLOPE *  ̄SLOPE_IN[3]) + ( ̄MSB_SLOPE * SLOPE_IN[4])) * SET_SLOPE) + (SLOPE_OUT[3] *  ̄SET_SLOPE)) | wherein "MSB_SLOPE" represents the sign bit of the slope data, "SLOPE_IN[4]" represents the 45 degree bit, "SLOPE_IN[0]," "SLOPE_IN [1]," "SLOPE_IN[2]," "SLOPE_IN[3]" represent the four fractional bits of slope data, and "SET_SLOPE" is a control bit. (MSB_SLOPE, and SLOPE_IN[0:4] are provided by the X-Steppper 33 to the PLA via line 79 of FIG. 9c.) Thus, the lower eight bits of address data (ADDRESS) sent to the Filter ROM 34 are derived from data stored in hardware registers in the datapath of the X-Stepper 33, which is described in detail below with reference to FIGS. 9a–9c.

Decoding the upper two address bits bits requires additional logic. The middle table address is relatively simple to decode. Referring to FIG. 6, the middle table should be used if a pixel in position 1 is being rendered. Selection of the top and bottom tables requires more logic. Included in the decode logic for selecting the top and bottom tables are the sign of the slope, the current state of the SERP signal (which indicates the direction along the minor axis in which the pixels are being rendered, see the above-referenced article "High Speed High Quality Antialiased Vector Generation") and information indicating whether the current pixel is the first or third pixel along the minor axis. Of course, when additional tables of filter values are stored in the filter memory, one or more additional bits are necessary to access the additional tables.

The following table shows the preferred alpha (filter) values stored in Filter ROM 34 for various values of subpixel location and slope. The table shows the slope and position values as binary numbers and the filter values as decimal numbers, but of course the filter memory actually stores binary numbers; e.g., decimal 4095=binary 111111111111.

| Slope | Pos. | Top | Middle | Bottom |
|---|---|---|---|---|
| 0000 | 0000 | 2368 | 2478 | 38 |
| 0000 | 0001 | 2111 | 2724 | 63 |
| 0000 | 0010 | 1853 | 2954 | 98 |
| 0000 | 0011 | 1603 | 3161 | 146 |
| 0000 | 0100 | 1364 | 3339 | 210 |
| 0000 | 0101 | 1141 | 3481 | 291 |
| 0000 | 0110 | 937 | 3583 | 393 |
| 0000 | 0111 | 755 | 3642 | 516 |
| 0000 | 1000 | 596 | 3655 | 662 |
| 0000 | 1001 | 460 | 3622 | 831 |
| 0000 | 1010 | 346 | 3544 | 1023 |
| 0000 | 1011 | 254 | 3424 | 1235 |
| 0000 | 1100 | 180 | 3266 | 1466 |
| 0000 | 1101 | 124 | 3075 | 1710 |
| 0000 | 1110 | 81 | 2857 | 1964 |
| 0000 | 1111 | 51 | 2619 | 2222 |
| 0001 | 0000 | 2388 | 2495 | 53 |
| 0001 | 0001 | 2106 | 2897 | 64 |
| 0001 | 0010 | 1849 | 2956 | 112 |
| 0001 | 0011 | 1600 | 3161 | 149 |
| 0001 | 0100 | 1362 | 3338 | 213 |
| 0001 | 0101 | 1140 | 3478 | 295 |
| 0001 | 0110 | 915 | 3579 | 398 |
| 0001 | 0111 | 755 | 3637 | 476 |
| 0001 | 1000 | 596 | 3649 | 669 |
| 0001 | 1001 | 461 | 3615 | 837 |
| 0001 | 1010 | 347 | 3458 | 1030 |
| 0001 | 1011 | 255 | 3417 | 1242 |
| 0001 | 1100 | 200 | 3258 | 1473 |
| 0001 | 1101 | 124 | 3068 | 1716 |
| 0001 | 1110 | 82 | 2897 | 1970 |
| 0001 | 1111 | 53 | 2613 | 2388 |
| 0010 | 0000 | 2404 | 2438 | 36 |
| 0010 | 0001 | 2167 | 2667 | 59 |
| 0010 | 0010 | 1914 | 2896 | 93 |
| 0010 | 0011 | 1664 | 3106 | 139 |
| 0010 | 0100 | 1424 | 3289 | 200 |
| 0010 | 0101 | 1198 | 3437 | 278 |
| 0010 | 0110 | 990 | 3548 | 376 |
| 0010 | 0111 | 804 | 3615 | 495 |
| 0010 | 1000 | 639 | 3638 | 636 |
| 0010 | 1001 | 498 | 3616 | 799 |
| 0010 | 1010 | 378 | 3549 | 986 |
| 0010 | 1011 | 280 | 3440 | 1193 |
| 0010 | 1100 | 201 | 3292 | 1419 |
| 0010 | 1101 | 140 | 3111 | 1658 |
| 0010 | 1110 | 94 | 2901 | 1909 |
| 0010 | 1111 | 60 | 2670 | 2164 |
| 0011 | 0000 | 2385 | 2453 | 40 |
| 0011 | 0001 | 2148 | 2681 | 64 |
| 0011 | 0010 | 1901 | 2902 | 99 |
| 0011 | 0011 | 1654 | 3107 | 147 |
| 0011 | 0100 | 1417 | 3285 | 210 |
| 0011 | 0101 | 1193 | 3430 | 291 |
| 0011 | 0110 | 987 | 3536 | 390 |
| 0011 | 0111 | 802 | 3600 | 511 |
| 0011 | 1000 | 639 | 3621 | 654 |
| 0011 | 1001 | 498 | 3596 | 819 |
| 0011 | 1010 | 380 | 3528 | 1006 |
| 0011 | 1011 | 282 | 3417 | 1214 |
| 0011 | 1100 | 203 | 3270 | 1439 |
| 0011 | 1101 | 142 | 3088 | 1678 |
| 0011 | 1110 | 95 | 2880 | 1926 |
| 0011 | 1111 | 61 | 2650 | 2179 |
| 0100 | 0000 | 2437 | 2477 | 45 |
| 0100 | 0001 | 2200 | 2705 | 71 |
| 0100 | 0010 | 1957 | 2922 | 108 |
| 0100 | 0011 | 1712 | 3124 | 159 |
| 0100 | 0100 | 1474 | 3301 | 224 |
| 0100 | 0101 | 1248 | 3345 | 308 |
| 0100 | 0110 | 1040 | 3551 | 410 |
| 0100 | 0111 | 850 | 3617 | 533 |
| 0100 | 1000 | 683 | 3640 | 678 |
| 0100 | 1001 | 537 | 3619 | 845 |
| 0100 | 1010 | 414 | 3554 | 1033 |
| 0100 | 1011 | 310 | 3449 | 1242 |
| 0100 | 1100 | 227 | 3306 | 1466 |
| 0100 | 1101 | 160 | 3129 | 1705 |
| 0100 | 1110 | 110 | 2926 | 1952 |
| 0100 | 1111 | 72 | 2700 | 2203 |
| 0101 | 0000 | 2484 | 2503 | 52 |
| 0101 | 0001 | 2247 | 2730 | 81 |
| 0101 | 0010 | 2006 | 2944 | 121 |
| 0101 | 0011 | 1764 | 3142 | 174 |
| 0101 | 0100 | 1527 | 3315 | 243 |
| 0101 | 0101 | 1301 | 3457 | 330 |
| 0101 | 0110 | 1091 | 3563 | 435 |
| 0101 | 0111 | 898 | 3629 | 562 |
| 0101 | 1000 | 727 | 3652 | 709 |
| 0101 | 1001 | 577 | 3633 | 879 |
| 0101 | 1010 | 449 | 3572 | 1068 |
| 0101 | 1011 | 340 | 3471 | 1277 |
| 0101 | 1100 | 252 | 3333 | 1501 |
| 0101 | 1101 | 181 | 3161 | 1739 |
| 0101 | 1110 | 126 | 3963 | 1983 |
| 0101 | 1111 | 84 | 2741 | 2233 |
| 0110 | 0000 | 2519 | 2457 | 54 |
| 0110 | 0001 | 2282 | 2686 | 83 |
| 0110 | 0010 | 2050 | 2893 | 123 |
| 0110 | 0011 | 1806 | 3094 | 176 |
| 0110 | 0100 | 1578 | 3261 | 244 |
| 0110 | 0101 | 1348 | 3408 | 330 |
| 0110 | 0110 | 1143 | 3513 | 433 |
| 0110 | 0111 | 944 | 3586 | 559 |
| 0110 | 1000 | 774 | 3614 | 701 |
| 0110 | 1001 | 616 | 3603 | 869 |
| 0110 | 1010 | 487 | 3551 | 1051 |
| 0110 | 1011 | 371 | 3457 | 1259 |
| 0110 | 1100 | 280 | 3330 | 1474 |
| 0110 | 1101 | 203 | 3166 | 1711 |
| 0110 | 1110 | 145 | 2980 | 1946 |
| 0110 | 1111 | 98 | 2763 | 2195 |
| 0111 | 0000 | 2552 | 2567 | 74 |
| 0111 | 0001 | 2323 | 2786 | 109 |
| 0111 | 0010 | 2088 | 2991 | 157 |
| 0111 | 0011 | 1852 | 3177 | 219 |
| 0111 | 0100 | 1621 | 3339 | 297 |
| 0111 | 0101 | 1397 | 3472 | 392 |
| 0111 | 0110 | 1187 | 3571 | 506 |
| 0111 | 0111 | 992 | 3633 | 640 |
| 0111 | 1000 | 816 | 3656 | 794 |
| 0111 | 1001 | 659 | 3639 | 967 |
| 0111 | 1010 | 523 | 3581 | 1160 |
| 0111 | 1011 | 406 | 3487 | 1369 |
| 0111 | 1100 | 308 | 3357 | 1592 |
| 0111 | 1101 | 228 | 3196 | 1825 |
| 0111 | 1110 | 164 | 3008 | 2064 |
| 0111 | 1111 | 115 | 2798 | 2305 |
| 1000 | 0000 | 2574 | 2603 | 90 |
| 1000 | 0001 | 2349 | 2816 | 130 |
| 1000 | 0010 | 2119 | 3014 | 183 |
| 1000 | 0011 | 1660 | 3348 | 333 |
| 1000 | 0100 | 1439 | 3475 | 433 |
| 1000 | 0101 | 1231 | 3568 | 553 |
| 1000 | 0110 | 1036 | 3627 | 690 |

| Slope | Pos. | Top | Middle | Bottom |
|---|---|---|---|---|
| 1000 | 0111 | 859 | 3646 | 848 |
| 1000 | 1000 | 700 | 3629 | 1023 |
| 1000 | 1001 | 561 | 3572 | 1218 |
| 1000 | 1010 | 441 | 3481 | 1426 |
| 1000 | 1011 | 339 | 3354 | 1648 |
| 1000 | 1100 | 255 | 3199 | 1877 |
| 1000 | 1101 | 187 | 3015 | 2112 |
| 1000 | 1110 | 133 | 2813 | 2347 |
| 1001 | 0000 | 2581 | 2647 | 112 |
| 1001 | 0001 | 2361 | 2851 | 158 |
| 1001 | 0010 | 2136 | 3042 | 217 |
| 1001 | 0011 | 1910 | 3212 | 290 |
| 1001 | 0100 | 1687 | 3358 | 379 |
| 1001 | 0101 | 1471 | 3475 | 486 |
| 1001 | 0110 | 1265 | 3561 | 611 |
| 1001 | 0111 | 1073 | 3613 | 754 |
| 1001 | 1000 | 897 | 3629 | 915 |
| 1001 | 1001 | 738 | 3608 | 1094 |
| 1001 | 1010 | 597 | 3552 | 1289 |
| 1001 | 1011 | 474 | 3460 | 1497 |
| 1001 | 1100 | 369 | 3337 | 1716 |
| 1001 | 1101 | 282 | 3184 | 1942 |
| 1001 | 1110 | 210 | 3007 | 2172 |
| 1001 | 1111 | 152 | 2810 | 2400 |
| 1010 | 0000 | 2659 | 2687 | 138 |
| 1010 | 0001 | 2445 | 2887 | 190 |
| 1010 | 0010 | 2226 | 3070 | 255 |
| 1010 | 0011 | 2005 | 3235 | 334 |
| 1010 | 0100 | 1785 | 376 | 429 |
| 1010 | 0101 | 1570 | 3490 | 542 |
| 1010 | 0110 | 1364 | 3574 | 671 |
| 1010 | 0111 | 1169 | 3626 | 818 |
| 1010 | 1000 | 989 | 3644 | 982 |
| 1010 | 1001 | 824 | 3627 | 1162 |
| 1010 | 1010 | 677 | 3575 | 1357 |
| 1010 | 1011 | 547 | 3491 | 1564 |
| 1010 | 1100 | 434 | 3376 | 1779 |
| 1010 | 1101 | 338 | 3233 | 2002 |
| 1010 | 1110 | 258 | 3065 | 2225 |
| 1010 | 1111 | 192 | 2877 | 2448 |
| 1011 | 0000 | 2655 | 2794 | 189 |
| 1011 | 0001 | 2448 | 2980 | 251 |
| 1011 | 0010 | 2234 | 3152 | 327 |
| 1011 | 0011 | 2019 | 3302 | 418 |
| 1011 | 0100 | 1805 | 3429 | 525 |
| 1011 | 0101 | 1596 | 3528 | 648 |
| 1011 | 0110 | 1394 | 3599 | 788 |
| 1011 | 0111 | 1204 | 3639 | 943 |
| 1011 | 1000 | 1026 | 3646 | 1115 |
| 1011 | 1001 | 862 | 3621 | 1300 |
| 1011 | 1010 | 715 | 3564 | 1498 |
| 1011 | 1011 | 584 | 3476 | 1705 |
| 1011 | 1100 | 469 | 3359 | 1919 |
| 1011 | 1101 | 370 | 3217 | 2136 |
| 1011 | 1110 | 287 | 3051 | 2353 |
| 1011 | 1111 | 217 | 2867 | 2566 |
| 1100 | 0000 | 2737 | 2890 | 189 |
| 1100 | 0001 | 2520 | 3085 | 253 |
| 1100 | 0010 | 2299 | 3261 | 332 |
| 1100 | 0011 | 2074 | 3417 | 426 |
| 1100 | 0100 | 1853 | 3547 | 537 |
| 1100 | 0101 | 1427 | 3723 | 809 |
| 1100 | 0110 | 1228 | 3764 | 971 |
| 1100 | 0111 | 1045 | 3370 | 1148 |
| 1100 | 1000 | 876 | 3743 | 1341 |
| 1100 | 1001 | 725 | 3682 | 1546 |
| 1100 | 1010 | 589 | 3590 | 1762 |
| 1100 | 1011 | 472 | 3468 | 1984 |
| 1100 | 1100 | 370 | 3319 | 2210 |
| 1100 | 1101 | 285 | 3147 | 2435 |
| 1100 | 1110 | 215 | 2955 | 2656 |
| 1101 | 0000 | 2746 | 3122 | 230 |
| 1101 | 0001 | 2519 | 3313 | 306 |
| 1101 | 0010 | 2287 | 3485 | 396 |
| 1101 | 0011 | 2054 | 3632 | 505 |
| 1101 | 0100 | 1826 | 3752 | 630 |
| 1101 | 0101 | 1603 | 3842 | 774 |
| 1101 | 0110 | 1391 | 3900 | 934 |
| 1101 | 0111 | 1191 | 3923 | 1113 |
| 1101 | 1000 | 1006 | 3913 | 1307 |
| 1101 | 1001 | 839 | 3867 | 1516 |
| 1101 | 1010 | 688 | 3788 | 1735 |
| 1101 | 1011 | 555 | 3677 | 1964 |
| 1101 | 1100 | 439 | 3537 | 2197 |
| 1101 | 1101 | 341 | 3371 | 2341 |
| 1101 | 1110 | 259 | 3183 | 2663 |
| 1101 | 1111 | 193 | 2977 | 2887 |
| 1110 | 0000 | 2799 | 3241 | 241 |
| 1110 | 0001 | 2565 | 3435 | 320 |
| 1110 | 0010 | 2325 | 3608 | 417 |
| 1110 | 0011 | 2086 | 3755 | 530 |
| 1110 | 0100 | 1850 | 3874 | 663 |
| 1110 | 0101 | 1622 | 3962 | 814 |
| 1110 | 0110 | 1403 | 4016 | 984 |
| 1110 | 0111 | 1200 | 4035 | 1170 |
| 1110 | 1000 | 1010 | 4019 | 1373 |
| 1110 | 1001 | 839 | 3968 | 1590 |
| 1110 | 1010 | 685 | 3883 | 1819 |
| 1110 | 1011 | 550 | 3766 | 2054 |
| 1110 | 1100 | 433 | 3618 | 2296 |
| 1110 | 1101 | 334 | 3446 | 2536 |
| 1110 | 1110 | 252 | 3250 | 2774 |
| 1110 | 1111 | 185 | 3037 | 3002 |
| 1111 | 0000 | 2841 | 3498 | 305 |
| 1111 | 0001 | 2596 | 3685 | 399 |
| 1111 | 0010 | 2350 | 3845 | 513 |
| 1111 | 0011 | 2103 | 3980 | 645 |
| 1111 | 0100 | 1861 | 4083 | 798 |
| 1111 | 0101 | 1627 | 4095 | 969 |
| 1111 | 0110 | 1405 | 4095 | 1158 |
| 1111 | 0111 | 1195 | 4095 | 1364 |
| 1111 | 1000 | 1004 | 4095 | 1585 |
| 1111 | 1001 | 829 | 4094 | 1818 |
| 1111 | 1010 | 674 | 3993 | 2060 |
| 1111 | 1011 | 537 | 3861 | 2308 |
| 1111 | 1100 | 421 | 3700 | 2556 |
| 1111 | 1101 | 321 | 3515 | 2803 |
| 1111 | 1110 | 241 | 3309 | 3040 |
| 1111 | 1111 | 175 | 3085 | 3267 |

Texture interpolation is carried out by texture interpolator 38 if texture mapped primitives are being rendered. Texture interpolation is similar to color interpolation, except that "S," "T" "ΔS" and "ΔT" must be generated instead of color values. Texture mapping is a method of increasing the detail and realism of an image without modeling the detail geometrically. Simply stated, texture mapping is the process of mapping a two dimensional function, e.g., a color pattern, onto a three dimensional surface. The two dimensional function is the texture map. (E.g., a two-dimensional map of the world superimposed onto a three-dimensional sphere is what is commonly called a globe; S and T in this case correspond to lines of latitude and longitude.) The texture map is defined accross a plane indexed by two coordinates, S and T. The texture interpolator 38 interpolates the (S, T) coordinates of each pixel based on the (S, T) coordinates at the endpoints. The endpoint coordinates are received at the port denoted "VERTEX DATA" in FIG. 8. ΔS and ΔT are the maximum values of S and T relative to the (S, T) coordinates of adjacent pixels. These values are used by frame buffer address circuitry (not shown) to retrieve the appropriate texture map value. The texture map value is combined in the pixel cache 40 with light source data to derive the final pixel color. The ports denoted "W" in FIG. 8 are for receiving a perspective correction factor W defined as $$W = WS + A^*(WE - WS)$$

where, $A = WS^*(Xs1-Xs)/(WE^*(Xs-Xs2) + WS^*(Xs1-Xs))$
This equation is derived as follows:

We need to find "A," the fraction of the distance from the start of a vector to a given point in terms of the vector's starting and ending coordinates, the given point's screen coordinates and the starting and ending perspective correction factors.

Given:
| | |
|---|---|
| X | :x value in pre-perspective correction space |
| X1 | :x starting value in pre-perspective correction space |
| X2 | :x ending value in pre-perspective correction space |
| Xs | :x value in screen space |
| Xs1 | :x starting value in screen space |
| Xs2 | :x ending value in screen space |
| W | : perspective correction factor |
| WS | : starting perspective correction factor |
| WE | : ending perspective correction factor |

Definitions:
(1) $X = X1 + A*(X2 - X1)$ (Definition of linear interpolation. X may be replaced with any other parameter (including Y or W) with the same A value to completely define a point.)
(2) $W = WS + A*(WE - WS)$ (Rewrite of eq. (1).)
(3) $Xs = X/W$ (Perspective correction.)
(4) $Xs1 = X1/WS$ (Perspective correction at start point.)
(5) $X1 = Xs1*WS$ (Rewrite of eq. (4).)
(6) $Xs2 = X2/WE$ (Perspective correction at end point.)
(7) $X2 = Xs2*WE$ (Rewrite of eq. (6).)

Derivation of formula for A:
(8) $Xs=(X1+A*(X2-X1))/(WS+A*(WE-WS))$
(9) $A*(Xs*(WE-WS)-X2-X1))=X1-Xs*WS$ (Factor out A.)
(10) $A=(Xs1*WS-Xs*WS)/(Xs*(WE-WS)-(X2-X1))$
(11) $A=WS*(Xs1-Xs)/(Xs*(WE-WS)-Xs2*WE-Xs1*WS))$
(12) $A=WS*(Xs1-Xs)/(WE*(Xs-Xs2)+WS*(Xs1-Xs))$ Output Formatter 39 couples the color and texture interpolators to the pixel cache 40. Data generated by the two interpolators 36, 38 is held in the output interface until the pixel cache is ready to accept it, which readiness is indicated by a signal received at the port labelled "CONTROL."

Updating the frame buffer 14 is a complex operation. The ten bits used for each interpolated color (30 bits of color total, ten bits of red, ten bits of green and ten bits of blue) and the 12 bit alpha values must be blended with the old 24 bits (8 red, 8 green, 8 blue) of gamma-corrected (to compensate for characteristics of the CRT display) data from the frame buffer. See the above-referenced copending application Ser. No. 495,005. These operations are carried out in parallel for each of the image space subdivisions in pixel cache 40. The pixel cache reads the old data from the frame buffer 14 and performs an inverse gamma function correction, so that data will be blended in linear space. The pixel cache 40 uses a set of blending rules to combine the new color data into the pixel. The new pixel value is then corrected with the gamma function and written to the frame buffer. The blending rule allows a vector of any color to be blended with a background of any color on a pixel by pixel basis. The intensities of the red, green and blue channels may be computed as follows:

NEW_FRAME_STORE_DATA=GAMMA[ALPHA*(NEW_COLOR)+(( 1-ALPHA)*(GAMMA$^{-1}$[OLD_DATA]))]

where GAMMA is a function that compensates for the nonlinear response of the display device (the intensity of light emitted by a CRT display typically varies as an exponential function of the pixel values.)

Figure 9A:
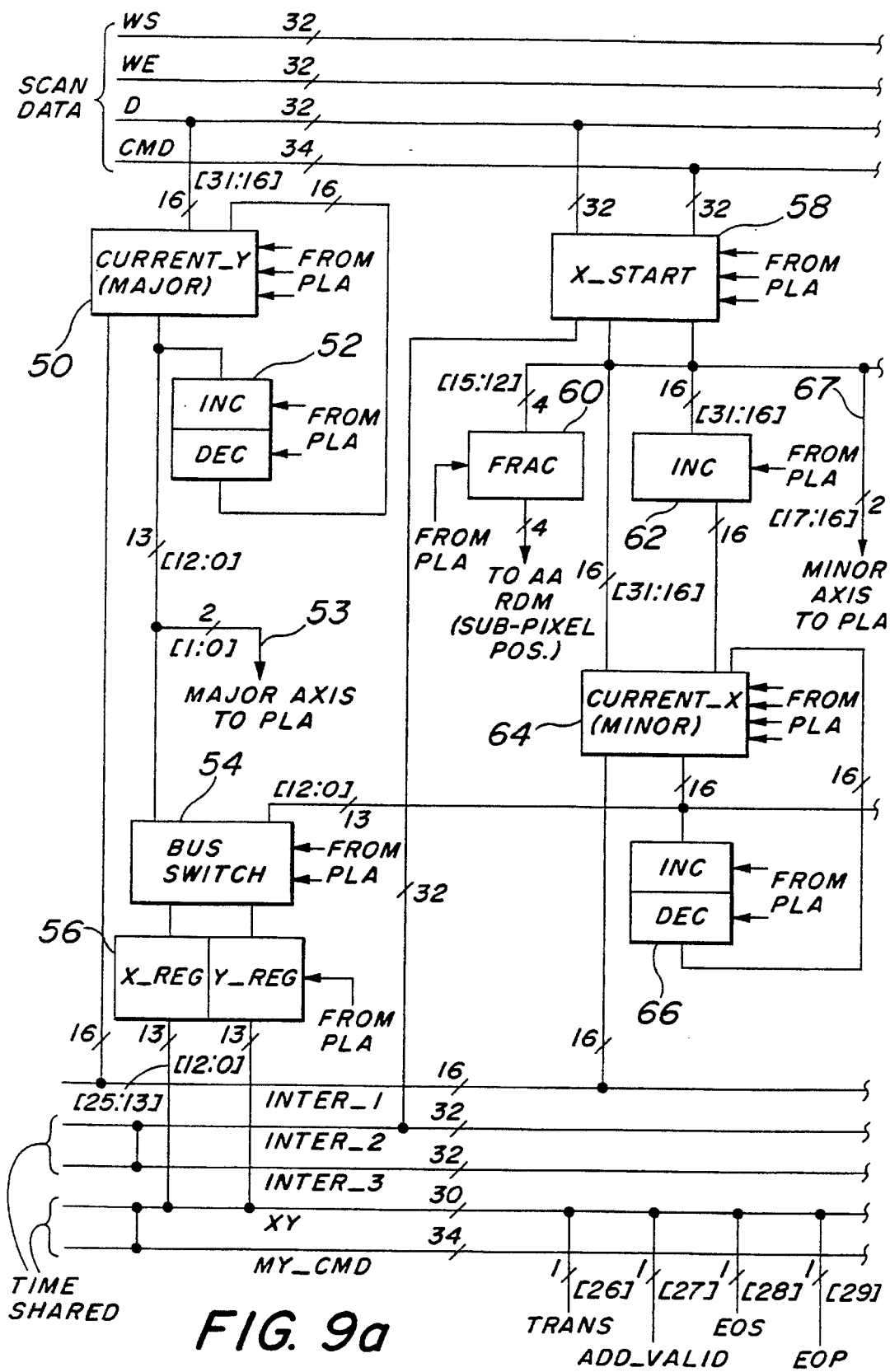
FIGS. 9a, 9b and 9c are collectively a block diagram of the X-Stepper block 33 of FIG. 8.
Figure 9B:
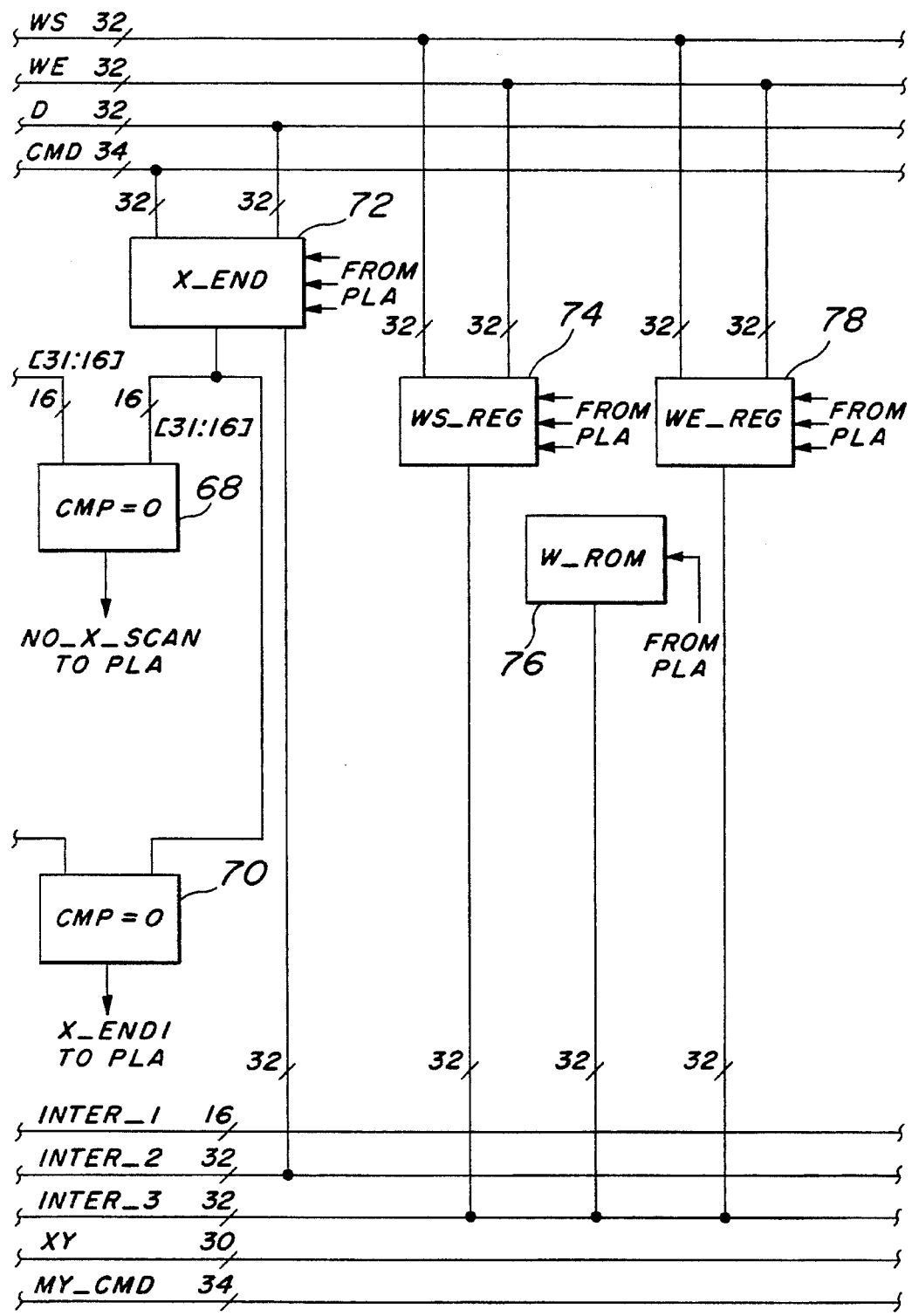
Figure 9C:
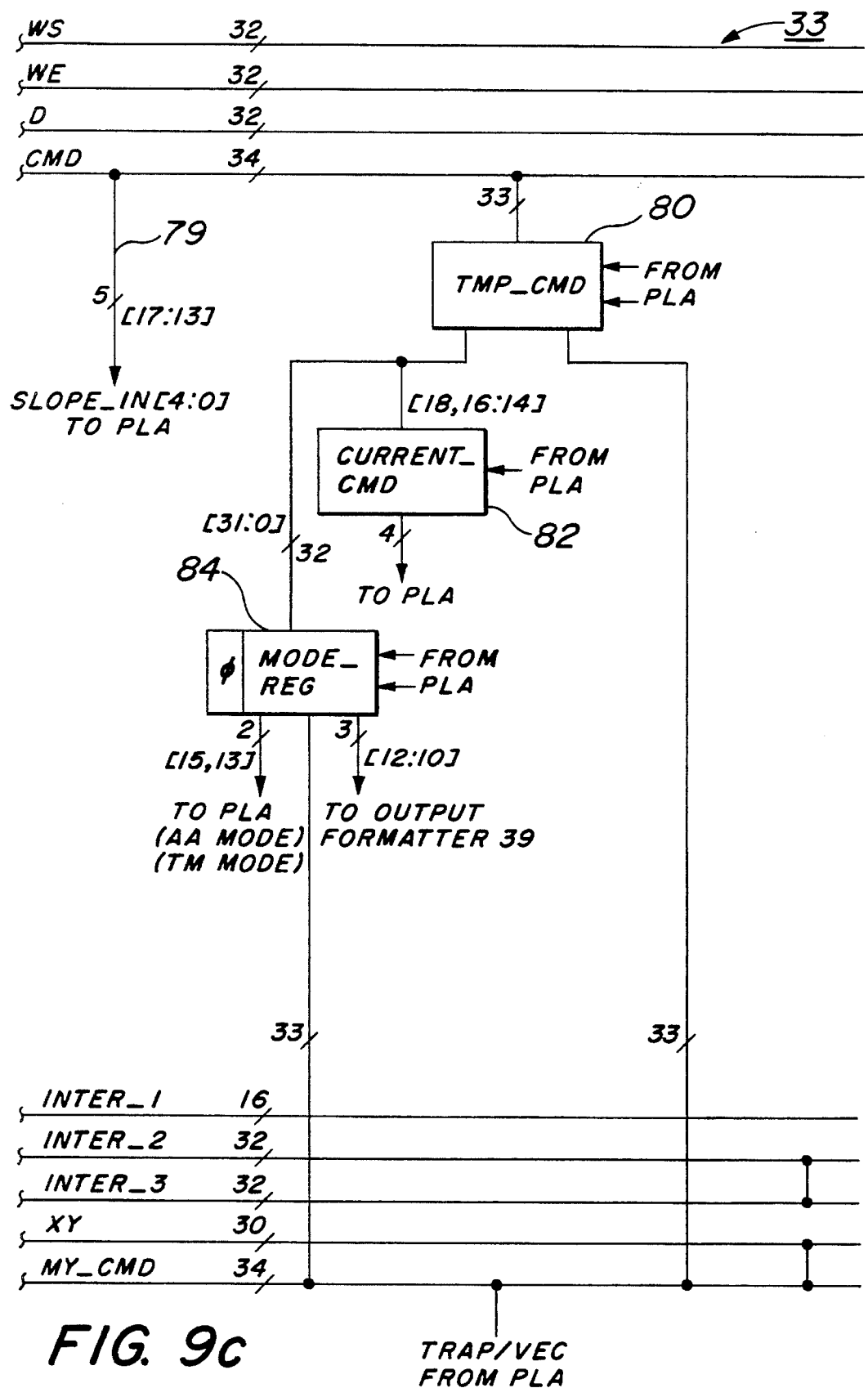

FIGS. 9a–9c are a simplified block diagram of X-Stepper 33 of FIG. 8. (The actual X-Stepper circuit has over 40,000 FETs; the actual CTI circuit has over 250,000 FETs). To fully appreciate the capabilities of this component, it is recommended that the reader refer to the above-referenced article "High Speed High Quality Antialiased Vector Generation" and/or the above-referenced application Ser. No. 644,188, filed Jan. 22, 1991, entitled "High Speed Method For Rendering Antialiased Vectors."

The input data for the X-Stepper, which is labelled "SPAN DATA" in FIG. 9a and which is provided by the Edge Stepper 32, comprises four types of data, denoted "WS," "WE," "D" and "CMD" in FIG. 9a WS and WE represent the starting and ending perspective correction factors discussed above. CMD represents command data. D represents the following kinds of data:

(1) "Current" major axis data; i.e., the major axis position of a pixel to be rendered. This data is stored in CURRENT_Y register 50.

(2) "Current" minor axis data (the minor axis position of a pixel to be rendered). This data first goes to register 58; from there the fractional part is sent to register 60 and the integer part is sent to register 64.

(3) X-axis starting data. This data is stored in X_START register 58, but is only used when rendering trapezoids. When rendering trapezoids, register 58 has one additional function, i.e., to provide the integer part of the X-axis starting data to comparator 68, which compares this value with the integer part of the data stored in X_END register 72. The purpose behind this is discussed below.

(4) X-axis ending data. This data is stored in X_END register 72; it too is only used when rendering trapezoids.

The CURRENT_Y register 50 receives sixteen bits of current Y-axis data when rendering polygons and sixteen bits of major axis (either X- or Y-axis) data when rendering vectors. This register is controlled by a PLA (programmable logic array) (not shown) via three control lines indicated by three arrows to the right of the block representing the CURRENT_Y register. The CURRENT_Y register 50 is also coupled to an output bus labelled "Inter_1," an increment/decrement block 52, and a bus switch 54, which is coupled via register 56 to output bus XY. The contents of register 50 can thus be incremented or decremented (i.e., stepped forward or backward) in response to control signals provided by the PLA, or put out onto the Inter_1 or XY output busses, also under control of the PLA. In addition, the lower two bits of the CURRENT_Y register 50 are sent via line 53 to the PLA (these are referred to as "MAJ_1" and "MAJ_0" in the above-referenced article "High Speed High Quality Antialiased Vector Generation."

The bus switch 54 provides the capability of interchanging current X and current Y data (i.e., the respective contents of CURRENT_X register 64 and CURRENT_Y register 50) in accordance with which axis is in fact the major axis; i.e., bus switch 54 places current Y-axis data on the lower thirteen bits of the XY bus and current X-axis data on the upper thirteen bits of the XY bus. This capability is needed because, when rendering vectors, the major axis is assumed to be the Y-axis and the minor axis is assumed to be the X-axis; if these assumptions prove to be incorrect, and CURRENT_Y register 50 contains X-axis data and CURRENT_X register 64 contains Y-axis data, the X- and Y-axis data is interchanged before it is put onto the XY output bus.

The X_START register 58 receives thirty-two bits of X-axis startpoint data from either the D or CMD bus. The contents of register 58 are put onto the Inter_2 output bus in response to commands from the PLA. The upper four bits (bits 12–15) of fraction are also stored in FRAC register 60, which outputs these four bits to AA filter memory 34. Note that these four bits are the subpixel position bits used to access the filter tables, as discussed above. Bits 16–31 are also stored in INC block 62, which increments its contents in response to commands from the PLA. INC block 62 is only used when rendering trapezoids. The output of INC block 62 and bits 16–31 from X_START register 58 are alternative inputs of CURRENT_X register 64; bits 16–31 are taken as the input when rendering vectors. The sixteen-bit contents (bits 0–15) of CURRENT_X register 64 are put onto the Inter_1 output bus, and are also inputs of increment/decrement block 66 and compare block 70. Bits 0–12 are sent to bus switch 54, as mentioned above.

Increment/decrement block 66 is used to adjust the minor axis in response to commands from the PLA (which are based upon the "Increment," "Decrement" and "Hold" signals referred to in the above-referenced paper "High Speed High Quality Antialiased Vector Generation"); an example would be, if increment signal is true in a single processor configuration then given the "current" minor axis position, which corresponds to the center pixel of an antialiased vector, block 66 increments the contents of CURRENT_X register 64 to produce one side pixel's minor axis position, then decrements twice to produce the other side pixel's minor axis position.

Compare block 70 compares the contents of register 64 to the data stored in X_END register 72; if the two are equal, a signal X_END1 is sent to the PLA. XEND1 tells the PLA to stop stepping along the X-axis. This capability is only used when rendering trapezoids.

Bits 16 and 17 from X_START register 58 are also sent to the PLA over bus 67. (These two bits are referred to as "MIN_1" and "MIN_0" in the above-referenced paper "High Speed High Quality Antialiased Vector Generation.") Bits 16–31 from X_START register 58 make up one input to compare register 68, which compares these bits to bits 16–31 from X_END register 72. A signal NO_X_SCAN is sent to the PLA if the two sets of bits are equal. NO_X_SCAN tells the PLA that there are no pixels to render on a given scan line (i.e., for the current value of Y). This function is used only when rendering trapezoids.

Bits 16–31 from X_END register 72 are sent to compare block 70, which compares these bits to bits 0–15 from CURRENT_X register 64, as described above. The entire thirty-two bit contents of X_END register 72 is sent to the Inter_2 output bus.

WS_REG register 74 and WE_REG register 78 each store thirty-two bits of WS data and thirty-two bits of WE data. The respective WS and WE data is sent to the Inter 3 output bus in response to control signals from the PLA.

W_ROM register 76 is used to store default perspective correction values (i.e., all "1"s) to be used in case the starting and ending perspective correction values discussed above are not specified.

Four bits of slope data from the CMD input bus are sent directly to the PLA via bus 79. These bits are used in accessing the AA filter memory 34, as discussed above.

TMP_CMD register 80 is used to temporarily store thirty-three bits of command data from the CMD input bus. These thirty-three bits are placed onto the MY_CMD output bus along with a signal "Trap/Vec" from the PLA. Trap/Vec indicates whether a vector or trapezoid is being rendered. Pass-through data and setup data may also be stored in the TMP_CMD register and placed onto the MY_CMD output bus. Bits 14, 15, 16 and 18 from TMP_CMD register 80 are stored in CURRENT_CMD register 82, from which they are sent to the PLA. As the register name implies, these bits represent the current command data for the PLA. TMP_CMD register bits 0–31 are inputs of "MODE_REG" register 84. In response to a "read mode" command, this register puts all thirty-two bits and an additional zero bit onto the MY_CMD output register. In addition, bits 13 and 15 are sent to the PLA; they tell the PLA whether to render in AA (antialiased) mode or TM (texture mapped) mode. Bits 10–12 are "display mode" bits sent to the output formatter 39 (see FIG. 8) via the PLA, and are used by the formatter in determining the number of color bits to put out per pixel. For more information on the handling of commands, see the above-referenced application Ser. No. 669,824, filed Mar. 15, 1991, entitled "Dynamic Scheduling of a Pipelined Processor for Parallel Execution of Multiple Processes."

There are notionally five output busses, Inter_1, Inter_2, Inter_3, XY, and MY_CMD; physically, because MY_CMD and XY timeshare thirty lines and Inter_2 and Inter_3 timeshare thirty-two lines, there are only three output buses. Thirty-four bits of the MY_CMD bus supply data to the CMD BUS port of Color Interpolator 36 (see FIG. 8). Twenty-six bits of the XY bus supply data to the XY port of the Color Interpolator. Inter_2 and Inter_3 supply data to the W port on Color Interpolator 36. Inter_1 carries current X and Y data to the Color Interpolator.

Four bits of data respectively labelled "Trans," "Add_Valid," "EOS" and "EOP" are put onto the XY bus. These four bits plus the twenty-six bits sent to the Color Interpolator make up the thirty bits of the XY bus. "Trans" is used to indicate that a surface being rendered is to be "transparent" (i.e., composed of line-type primitives) and that the current pixel is not to be displayed; "Add_Valid" is used to indicate a valid address; "EOS" is used to indicate end of scan; and "EOP" is used to indicate the end of a primitive. These bits are sent via an address pipeline (see below) to the output formatter 39; they are used by the formatter in determining how and when to send its data to the pixel cache 40. The Add_Valid bit is of particular importance since data will not be sent unless it is set.

The X-Stepper 33 is particularly suited for use in generating major and minor axis coordinates of pixels composing an antialiased vector. The current coordinates (i.e., major and minor axis position data) of the center pixel at each major axis step are provided by the Edge Stepper 32. The X-Stepper then generates the respective minor axis positions of the additional pixels on either side of the center pixel. At the same time the slope bits, subpixel position bits, and table access bits are extracted and provided to address circuitry (not shown) for accessing the AA filter memory 34.

It should be noted that, contrary to what is shown in FIG. 8, in the actual implementation of CTI 30 the filter values do not pass through X-Stepper 33 on their way to the Color Interpolator; instead they are sent over a separate bus (not shown) to the Color Interpolator 36 in accordance with the ten bits provided by the X-Stepper (collectively denoted "ADDRESS" in FIG. 8). In addition, it should be noted that the XY output bus of the X-Stepper is in fact sent to the Output Formatter 39 via an address "pipeline" (not shown), without passing through the Color Interpolator 36. The address pipeline comprises a series of registers through which the XY data is propogated; the data flow through the respective registers is controlled by the PLA such that the the XY data arriving at the output formatter 39 is in sync with the pixel value data from interpolators 36 and 38.

The present invention is not limited to the specific embodiment described above. For example, the filter values specified in the above table may be modified to suit the individual needs/tastes of the user. In addition, it is not essential that color or texture interpolation be provided; nor is it essential that the input data to Edge Stepper 32 or output data from output interface 39 be precisely as specified. Moreover, it is not essential that perspective interpolation be used, as linear or quadratic interpolation will be adequate in many instances. It should also be noted that the filter values may be stored in a filter RAM, as opposed to a filter ROM, making the filter values changeable. Many other variations of the preferred embodiment will be apparent after review of the foregoing specification.

```
{ X-STEPPER/CULLER CONTROL BLOCK PLADO SOURCE CODE }
{ xsource.pdo      1.24 03/30/89  Source file of logic for X-Stepper PLA
                                    **** Written By Tony Barkans ****}

CONTROL_BLOCK X_STEPPER;
        {         INPUT'S FROM PROCESSOR I/O PINS}
  INPUT  RESETX,          {RESET LINE FROM OUTSIDE CHIP}
         RESETX_2,        {SAME AS RESET}
         CLK25MHZX,       {MY MACHINES ARE SYNCED TO THE PHASE OF THIS CLK}
         C_IDX[2:0];      {THE CONFIGURATION PINS FROM OUTSIDE CHIP}

{        INPUT'S FROM EDGE STEPPER }
  INPUT  COMMAND_FULLX,   {E.S. COMMAND BUFFER IS FULL}
         COMMAND_BITX,    {E.S. IF = 1 THEN CMD IF = 0 THEN DATA IN BUFFER}
         SCAN_DECODEX,    {E.S. COMMAND IS A SCAN TYPE}
         XRT_EQ_0,        {E.S. X_RIGHT DOES NOT HAVE A FRACTION}
         XST_EQ_0,        {E.S. X_START DOES NOT HAVE A FRACTION}
         PAT_ON,          {LINE PATTERN IS ON FOR THIS PIXEL}
         YCNT_EQ_0,       {THE Y_COUNT REGISTER EQUALS 0}
         LT_CNT_MINUS,    {LINE TYPE COUNT WENT MINUS}
         HOURGLASS,       {SWAPS START AND END IF BOTTOM OF HOURGLASS}

{        INPUT'S FROM INTERPOLATOR AND OUTPUT FORMATTER}
         COM_BUSY,        {COMMAND REG IN INTERPOLATOR IS IN USE}
         PRI_DONE,        {DONE PROCESSING THE PRIMITIVE}
         STOPX,           {HALTS X-STEPPER}

{        INPUT'S FROM REGISTERS IN X-STEPPER/CULLER}
         MIN_AXIS[1:0],   {MINOR AXIS 2 LEAST SIG. ADDRESS BITS}
         MAJ_AXIS[1:0],   {Y/MAJOR AXIS 2 LEAST SIG. ADDRESS BITS}
         Y_MAJOR,         {POINTS TO MAJOR AXIS IN VECTOR MODE}
         MAJ_DECX,        {MAJOR AXIS INC OR DEC IN VECTOR MODE}
         W_FLAG,          {FLAG =1 THEN E.S. HAS GOOD W'S, ELSE USE W ROM}
         AA_MD,           {VECTOR MODE}
         TM_MODEX,        {TEXTURE MAP MODE}
         SEC_COLORX,      {SECONDARY COLOR MODE}
         NO_X_SCAN,       {OUTPUT OF COMPARATOR OF X_START AND X_END}
         X_END,           {COMPARATOR OF CURRENT_X AND X_END}
         CMDS[7:0],       {COMMAND BITS FROM TEMP COMMAD REGISTER}
         SLOPE_IN[4:0],   {2'S COMP. FORMATT OF SLOPE, USED FOR SLOPE_OUT}
         SLOPE_OUT[3:0],  {SLOPE OUT IS SAVED WHILE RENDERING}
         MINOR_SLOPE,     {PASSES MSB OF SLOPE ON TO OUTPUT}
         MSB_SLOPE;       {MSB OF SLOPE USED TO FIND SERPENTINE MODE, [5]}

{        INPUT'S DECODED FROM PROCESSOR CONFIGURATION IN SYSTEM}
  INPUT  S0,              {TRUE IF CURRENT PROCESSOR OWNS SCAN LINE 0}
         S1,              {TRUE IF CURRENT PROCESSOR OWNS SCAN LINE 1}
         S2,              {TRUE IF CURRENT PROCESSOR OWNS SCAN LINE 2}
         S3,              {TRUE IF CURRENT PROCESSOR OWNS SCAN LINE 3}

{        INPUT'S USED TO KEEP TRACK OF PIPELINE EVENTS}
         FLUSH_FLAG,      {SET IN DISPATCH IF INTERPOLATOR BUSY}
         VERTEX_FLAG,     {DO NOT TELL OUTPUT ABOUT VERT'S OR THIER DATA}
         CMD_FLUSH_FLAG,  {SET WHEN FLUSH_FLAG IS SET IF FLUSHING COMMAND}
         SCAN_FLUSH_FLAG, {WHEN FLUSHING TELL OUTPUT IT'S A SCAN CMD}
         VEC_FLUSH_FLAG,  {SET DURING VECTOR FLUSH}
         PRI_FLUSH_FLAG,  {FORCES FLUSH MODE TO BE SENT TO INTERPOLATOR}
```

```
FOUND_LINE,           {FOUND NEXT SCAN LINE DURING TRAPEZOID RENDERING}
KEEP_GOING_1,         {LOOKING FOR NEXT SCAN LINE DURING TRAP RENDERING}
KEEP_GOING_2,         {LOOKING FOR NEXT SCAN LINE DURING TRAP RENDERING}
KEEP_GOING_3,         {LOOKING FOR NEXT SCAN LINE DURING TRAP RENDERING}
NEW_SCAN_LINE,
DELAYED_STOP,         {FOLLOWS STOP SIGNAL BY ONE CLOCK}

W_FRAC_FLAG_A,        {W_FRAC NEEDS ADD}
W_FRAC_FLAG_B,        {W_FRAC NEEDS ADD}
PAT_STAGE_1,          {PIPE LINE TO DELAY LINE TYPE PATTERN}
TRANS_LT,             {LINE TYPE PATTERN IS DELAYED, SO THIS PIXEL IS ON}
ADVANCE_PAT_1,        {ADVANCE LINE PAT_ON TO MATCH PIPE LINE DELAY}
ADVANCE_PAT_3,        {ADVANCE LINE PAT_ON TO MATCH PIPE LINE DELAY}

SWAP_MODE,            {GENERATES INT_MODEX[4] TO TELL INTERALATOR SWAPPED}
SET_SWAP_MODE,        {SAVE THE STATE OF SWAP MODE FOR ENTIRE SCAN LINE}

{       INPUT'S DECODED FROM STATE INFO WHILE VECTOR STEPPING}
OLD_SERP,             {SAVED LAST STATE OF SERP BIT}
OLD_SERP1,            {SAVED STATE DATA}
OLD_SERP2,            {SAVED STATE DATA}
OLD_SERP3,            {SAVED STATE DATA}
OLD_SERP4,            {SAVED STATE DATA}
H_CON,                {HOLD CONTROL BIT}
SET_SERP,             {USED TO GATE SAVING STATE OF SERP BIT}
SET_SAVE,             {SAVE INCR, DECR, HOLD}
SET_SAVE_1,           {SAVE INCR_1, DECR_1, HOLD_1}
SET_SLOPE,            {SAVE THE VECTOR SLOPE IN THE PLA}
SET_XS_FRAC,          {SAVE STAUS OF XS FRACTIONAL BITS}
INCR_1,               {VECTOR DRAWING INCREMENT OF MINOR AXIS}
DECR_1,               {VECTOR DRAWING DECREMENT OF MINOR AXIS}
HOLD_1,               {VECTOR DRAWING HOLD MINOR AXIS}
INCR,                 {VECTOR DRAWING INCREMENT OF MINOR AXIS}
DECR,                 {VECTOR DRAWING DECREMENT OF MINOR AXIS}
HOLD,                 {VECTOR DRAWING HOLD MINOR AXIS}
OLD_INCR,             {VECTOR DRAWING OLD INCREMENT OF MINOR AXIS}
OLD_DECR,             {VECTOR DRAWING OLD DECREMENT OF MINOR AXIS}
OLD_HOLD,             {VECTOR DRAWING OLD HOLD MINOR AXIS}
VEC_PIXEL,            {USED TO SET LSB OF INT_MODEX WHEN RENDERING VECTORS}
NO_XS_FRAC,           {STAUS OF XS FRACTIONAL BITS USED IN TRAP SET_UP}
ALMOST_ADD_V,
ALMOST_AA_ADR,

LAST_INT,             {TRACKS LAST STATE OF INT_MODES}
SET_INT,              {SAVES LAST "INTERESTING" STATE OF INT_MODE[3]}

{       INPUT'S FROM COUNTER WHILE WAITING TO SET_MODE}
INT_MODEX[4:0],       {INTERPOLATOR MODE BITS}
CNT[3:1],             {COUNTER OUTPUT BITS (NOTE BIT 0 IS NOT USED)}

{       INPUT'S USED TO TALK TO SIDE DOOR MACHINE}
SIDE_FLUSH_FLAG,      {TELLS SIDE_DOOR TO SEND A WORD TO YW}
SIDE_DOOR_CMD,        {IF SET THEN TELL YW ITS A CMD WORD}
DO_NOT_START_SIDE,    {X_STEPPER TELLING SIDE DOOR TO HANDLE VERTEX}
SIDE_DOOR_BUSY;       {SIDE_DOOOR TELLING X_STEPPER ITS HANDLING VERTEX}
```

```
STATE   :STATIC_LOGIC;    {SIGNALS DECODED FROM PROCESSOR CONFIGURATION}
STATE   :SAVE_VALUES;     {NEED TO STORE CURRENT STATES OF SOME BITS}
STATE
        CHECK_X_STEPPER= %000,   {WAITS UNTIL X_STEPPER IS BUSY}
        SIDE_DOOR_2     = %001,  {PASSES VERTEX COMMANDS DOWN THE PIPE}
        SIDE_DOOR_3     = %010,  {PASSES VERTEX COMMANDS DOWN THE PIPE}
        SIDE_DOOR_4     = %011,  {PASSES VERTEX COMMANDS DOWN THE PIPE}
        SIDE_DOOR_5     = %100,  {PASSES VERTEX COMMANDS DOWN THE PIPE}
        SIDE_DOOR_6     = %101:  {PASSES VERTEX COMMANDS DOWN THE PIPE}
        SIDE_DOOR;

STATE
        STARTA =            %00000000000000000000000,
        DUMMY =             %00000000000000000000001,
        STARTB =            %00000000000000000000010,
        DISPATCH =          %00000000000000000000100,
        SEND_VERT =         %00000000000000000111000,
        SEND_VERT_WAIT=     %00000000000000000011000,

READ_MODE =         %00000000000000000101000,
         READ_MODE_WAIT =   %00000000000000000001000,
         READ_MODE_2 =      %00000000000000001001000,
         READ_MODE_3 =      %00000000000000001101000,

SET_MODE =          %00000000000000010101000,
        SET_MODE_2 =        %00000000000000010001000,
        SET_MODE_3 =        %00000000000000011001000,

DRAW_VEC_1=         %00000000000001100000000,
         DRAW_VEC_2 =       %00000000000000100000000,
         DRAW_VEC_3 =       %00000000000011100000000,
         DRAW_VEC_4 =       %00000000000010100000000,
         DRAW_VEC_5 =       %00000000000011000000000,
         DRAW_VEC_6 =       %00000000010100000000000,
         DRAW_VEC_7 =       %00000000110100000000000,
         DRAW_VEC_STEP_1 =  %00000000000100000000000,
         DRAW_VEC_STEP_2 =  %00000000100100000000000,
         DRAW_VEC_STEP_3 =  %00000000001100000000000,
         DRAW_VEC_STEP_4 =  %00000000101100000000000,
         DRAW_VEC_FLUSH_1 = %00000001000100000000000,
         DRAW_VEC_FLUSH_2 = %00000001100100000000000,

DRAW_TRAP =         %00000010000000000000000,
        DRAW_TRAP_WAIT =    %00000100000000000000000,
         DRAW_TRAP_2 =      %00000010000000000000000,
         DRAW_TRAP_2X =     %00000110000000000000000,
         DRAW_TRAP_3 =      %00001000000000000000000,
        TRAP_SET_UP_EVEN =  %00010000000000000000000,
        TRAP_SET_UP_ODD =   %00100000000000000000000,
        TRAP_RENDER_EVEN =  %01000000000000000000000,
        TRAP_RENDER_ODD =   %10000000000000000000000:
X_STEPPER;
```

```
OUTPUT    {          OUTPUT'S DECODED FROM PROCESSOR CONFIGURATION IN SYSTEM}
          S0,             {TRUE IF CURRENT PROCESSOR OWNS SCAN LINE 0}
          S1,             {TRUE IF CURRENT PROCESSOR OWNS SCAN LINE 1}
          S2,             {TRUE IF CURRENT PROCESSOR OWNS SCAN LINE 2}
          S3,             {TRUE IF CURRENT PROCESSOR OWNS SCAN LINE 3}

{       OUTPUT'S USED TO KEEP TRACK OF PIPELINE EVENTS}
          FLUSH_FLAG,      {SET IN DISPATCH IF INTERPOLATOR BUSY}
          VERTEX_FLAG,     {DO NOT TELL OUTPUT ABOUT VERT'S OR THIER DATA}
          CMD_FLUSH_FLAG,  {SET WHEN FLUSH_FLAG IS SET IF FLUSHING COMMAND}
          SCAN_FLUSH_FLAG, {WHEN FLUSHING TELL OUTPUT IT'S A SCAN CMD}
          VEC_FLUSH_FLAG,  {SET DURING VECTOR FLUSH}
          PRI_FLUSH_FLAG,  {FORCES FLUSH MODE TO BE SENT TO INTERPOLATOR}
          FOUND_LINE,      {FOUND NEXT SCAN LINE DURING TRAPEZOID RENDERING}
          KEEP_GOING_1,    {LOOKING FOR NEXT SCAN LINE DURING TRAP RENDERING}
          KEEP_GOING_2,    {LOOKING FOR NEXT SCAN LINE DURING TRAP RENDERING}
          KEEP_GOING_3,    {LOOKING FOR NEXT SCAN LINE DURING TRAP RENDERING}
          NEW_SCAN_LINE,
          DELAYED_STOP,    {FOLLOWS STOP SIGNAL BY ONE CLOCK}

W_FRAC_FLAG_A,   {W_FRAC NEEDS ADD}
          W_FRAC_FLAG_B,   {W_FRAC NEEDS ADD}

{       OUTPUT'S GENERATED FROM STATE INFO FOR VECTOR STEPPING}
          OLD_SERP,        {SAVED LAST STATE OF SERP BIT}
          OLD_SERP1,       {SAVED STATE DATA}
          OLD_SERP2,       {SAVED STATE DATA}
          OLD_SERP3,       {SAVED STATE DATA}
          OLD_SERP4,       {SAVED STATE DATA}
          H_CON,           {HOLD CONTROL BIT}
          SET_SERP,        {GATES SAVING SERPENTINE BIT}
          SET_SAVE,        {SAVE INCR, DECR, HOLD}
          SET_SAVE_1,      {SAVE INCR_1, DECR_1, HOLD_1}
          SET_SLOPE,       {SAVE THE VECTOR SLOPE IN THE PLA}
          SET_XS_FRAC,     {SAVE STAUS OF XS FRACTIONAL BITS}
          INCR,            {INCREMENT OF CURRENT X/MINOR AXIS}
          DECR,            {VECTOR DRAWING DECREMENT OF MINOR AXIS}
          HOLD,            {VECTOR DRAWING HOLD MINOR AXIS}
          INCR_1,          {INCREMENT OF CURRENT X/MINOR AXIS}
          DECR_1,          {VECTOR DRAWING DECREMENT OF MINOR AXIS}
          HOLD_1,          {VECTOR DRAWING HOLD MINOR AXIS}
          OLD_INCR,        {VECTOR DRAWING OLD INCREMENT OF MINOR AXIS}
          OLD_DECR,        {VECTOR DRAWING OLD DECREMENT OF MINOR AXIS}
          OLD_HOLD,        {VECTOR DRAWING OLD HOLD MINOR AXIS}
          NO_XS_FRAC,      {STAUS OF XS FRACTIONAL BITS USED IN TRAP SET_UP}
          VEC_PIXEL,
          ALMOST_ADD_V,
          ALMOST_AA_ADR,

{       OUTPUT'S TO COUNTER WHILE WAITING TO SET_MODE}
          CNT_RESET,       {RESET THE COUNTER}
          CNT_NORM,        {ALLOW COUNTER TO FREE RUN}

{       OUTPUT'S GENERATED WHILE STEPPING VECTORS OR TRAPS}
          SLOPE_OUT[3:0],  {SLOPE OUT TO AA ROM ADDRESS REGISTER}
          ADD_VALID,       {CURRENT PIXEL DATA IS VALID}
```

```
EOS,                {END OF SPAN}
VECTOR_TRAP,        {TELLS OUTPUT IF PIXEL IS PART OF VECTOR OR TRAP}
PIPE_LOCAL,         {TELLS OUTPUT IF COMMAND IS IN PIPE}
MAJOR_Y,            {PASSES Y_MAJ BIT ON TO OUTPUT}
MAJOR_DEC,          {PASSES MAJ_DECX ON TO OUTPUT}
MINOR_SLOPE,        {PASSES MSB OF SLOPE ON TO OUTPUT}
PAT_STAGE_1,        {PIPE LINE TO DELAY LINE TYPE PATTERN}
TRANS_LT,           {LINE TYPE PATTERN IS DELAYED, SO THIS PIXEL IS ON}
ADVANCE_PAT_1,      {ADVANCE LINE PAT_ON TO MATCH PIPE LINE DELAY}
ADVANCE_PAT_3,      {ADVANCE LINE PAT_ON TO MATCH PIPE LINE DELAY}

SWAP_MODE,          {GENERATES INT_MODEX[4] TO TELL INTERALATOR SWAPPED}
SET_SWAP_MODE,      {SAVE THE STATE OF SWAP MODE FOR ENTIRE SCAN LINE}

{        OUTPUT'S THAT CONTROL REGISTER SET IN X-STEPPER/CULLER}
CUR_Y_LD_Y_BUS,     {LOAD CURRENT_Y/MAJOR REGISTER FROM Y_BUS}
CUR_Y_LD_INCR,      {INC CURRENT_Y/MAJOR VALUE}
CUR_Y_LD_DECR,      {DEC CURRENT_Y/MAJOR VALUE}

CUR_MAJ_LD,         {LOAD THE CURRENT MAJOR AXIS REGISTER}
CUR_MAJ_NDUMP,      {DUMP THE CURENT MAJOR AXIS REGISTER}

XS_LD_CMD_BUS,      {LOAD X_START REGISTER FROM CMD BUS}
XS_LD_Y_BUS,        {LOAD X_START REG FROM Y_BUS}
XS_NDUMP,           {DUMP THE X_START REGISTER}

CUR_X_LD_XS,        {LOAD CURRENT_X/MINOR REGISTER FROM X_START}
CUR_X_LD_XS_INCR,   {LOAD CURRENT_X/MINOR REGISTER FROM ADJUST}
CUR_X_NDUMP,        {DUMP CURRENT_X/MINOR REGISTER TO BUS}
CUR_X_LD_INCR,      {INC CURRENT_X/MINOR VALUE}
CUR_X_LD_DECR,      {DEC CURRENT_X/MINOR VALUE}

ADD_LD_X_X,         {LOAD ADDRESS REG X FROM X/MINOR}
ADD_LD_X_Y,         {LOAD ADDRESS REG X FROM Y/MAJOR}
ADD_LD_Y_X,         {LOAD ADDRESS REG Y FROM X/MINOR}
ADD_LD_Y_Y,         {LOAD ADDRESS REG Y FROM Y/MAJOR}
ADD_NDUMP,          {DUMP ADDRESS REGISTER TO BUS}

XE_LD_Y_BUS,        {LOAD X_END REGISTER FROM Y_BUS}
XE_LD_CMD_BUS,      {LOAD X_END REG FROM CMD BUS}
XE_NDUMP,           {DUMP THE X_END REGISTER}

W_REGS_LD_1,        {LOAD WS REG FROM W1 BUS AND WE FROM W2 BUS}
W_REGS_LD_2,        {LOAD WS REG FROM W2 BUS AND WE FROM W1 BUS}
WS_NDUMP,           {DUMP THE W_START REGISTER}
WE_NDUMP,           {DUMP THE W_END REGISTER}
W_NDUMP,
W_ROM_NDUMP,        {DUMP ROM OUT FOR W VALUES}
CUR_CMD_LD,         {LOAD CURRENT COMMAND REGISTER}
TEMP_CMD_LD,        {LOAD TEMP COMMAND REGISTER}
TEMP_CMD_NDUMP,     {DUMP THE TEMP COMMAND REGISTER}
MODE_REG_LD,        {LOAD THE MODE REGISTER}
MODE_REG_NDUMP,     {DUMP THE MODE REGISTER}
FRAC_REG_LD,        {LOAD THE FRACTIONAL POSITION INTO ITS REGISTER}

{        OUTPUT'S TO AA VECTOR BLOCK}
```

```
AA_ROM_BANK[1:0],  {THE HIGH ORDER ADDRESS BITS TO THE AA ROM
                    00 = BOTTOM AA PIXEL
                    01 = MIDDLE AA PIXEL
                    10 = TOP AA PIXEL
                    11 = ALIASED PIXEL}

{       OUTPUT'S TO EDGE STEPPER}
IN_BUFFER_TAKEN,  {TELL E.S. INPUT BUFFER MOVED TO EDGE STEPPER}
SFT_ES_A_IN,      {TRANSFERS THE A DATA FROM INPUT BUFFER TO E.S.}
SFT_ES_B_IN,      {TRANSFERS THE B DATA FROM INPUT BUFFER TO E.S.}
SFT_ES_COUNT_IN,  {TRANSFER COUNT FROM INPUT BUFFER TO E.S.}
COMMAND_TAKEN,    {TELL E.S. CMD BUFF DUMPED ONTO CMD BUS}
ES_RESET,         {RESETS THE E.S. REGISTERS}
D_CMD_X,          {DUMP E.S. COMMAND REGISTER}
D_XST_X,          {DUMP E.S. X_START REGISTER}
D_YSL_X,          {DUMP E.S. Y_SLOPE REGISTER}
D_XRT_Y,          {DUMP E.S. X_RIGHT REGISTER}
D_YST_Y,          {DUMP E.S. Y_START REGISTER}
S_LT_DEC,         {LINE TYPE DECREMENT}
S_LTP_SFT,        {SHIFT THE LINE TYPE PATTERN}
RESET_LINETYPE,   {LOADS NEW PATTERN AND COUNT INTO E.S.}
S_WF_ADD,         {ADD W FRAC (A SIDE)}
S_WFRT_ADD,       {ADD W FRAC (B SIDE)}
ES_STEP,          {TELLS E.S. TO STEP}

{       OUTPUT'S TO INTERPOLATOR STACK}
INT_MODEX[4:0],  {INTERPOLATOR MODE BITS}
XS_SET,          {LOADS XS REG IN YW STACK}
XE_SET,          {LOADS XS REG IN YW STACK}
COM_SET,         {LOADS COMMAND REGISTER IN YW STACK}
COM_LD,          {TELLS INTERPOLATOR PLA THAT COMMAND WAS LOADED}
DATA_LD,         {TELLS INTERPOLATOR PLA THAT DATA WAS LOADED}

{       OUTPUT'S USED TO TALK TO SIDE DOOR MACHINE}
SIDE_FLUSH_FLAG,    {TELLS SIDE_DOOR TO SEND A WORD TO YW}
SIDE_DOOR_CMD,      {IF SET THEN TELL YW ITS A CMD WORD}
DO_NOT_START_SIDE,  {X_STEPPER TELLING SIDE_DOOR TO HANDLE VERTEX}
SIDE_DOOR_BUSY,  {SIDE_DOOOR TELLING X_STEPPER ITS HANDLING VERTEX}

{       OUTPUT USED TO ADDRESS PIPE AND DATA IN SYNC}
LAST_INT,         {TRACKS LAST STATE OF INT_MODES}
SET_INT,          {SAVES LAST "INTERESTING" STATE OF INT_MODE[3]}
ADV_EVEN_PIPE,    {ADVANCE ADDRESS PIPES}
ADV_ODD_PIPE,     {ADVANCE AA ROM}
ADV_XY_PIPE,      {ADVANCE AA ROM}
EVEN_L,           {ADVANCE AA ROM}
EVEN_R,           {ADVANCE AA ROM}
ODD,              {ADVANCE AA ROM}
LATCH_ROM,        {ADVANCE AA ROM}
ADV_BYPASS,       {BYPASS TOP OF X Y PIPE}
ADV_NORM,         {ADVANCE TOP OF X Y PIPE}
ADV_PIPE_L,       {ADVANCE THE INTERPOLATOR PIPE}
ADV_PIPE_R,       {ADVANCE THE INTERPOLATOR PIPE}
DADV_PIPE,        {ADVANCE THE INTERPOLATOR PIPE}
DADV_PIPE1;       {ADVANCE THE INTERPOLATOR PIPE}
```

```
{ DEFINE MODES (USED TO CONTROL INTERPOLATOR) }
%define MODE_L1 14
                {POLYGON LEFT SET UP}
%define MODE_L2 10
                {POLYGON LEFT SET UP}
%define MODE_L3 11
                {POLYGON LEFT SET UP}
%define MODE_R1 12
                {POLYGON RIGHT SET UP}
%define MODE_R2 8
                {POLYGON RIGHT SET UP}
%define MODE_R3 9
                {POLYGON RIGHT SET UP}
%define MODE_P1 6
                {POLYGON PIXEL}
%define MODE_P2 2
                {POLYGON PIXEL}
%define MODE_P3 3
                {POLYGON PIXEL}
%define MODE_VP 5
                {PIXEL OF VECTOR *** NOTE: USED INT_MODEX[2] AND VEC_PIXEL}
%define MODE_FLUSH 1
                {END OF EACH PRIMITIVE *** NOTE: USED PRI_FLUSH_FLAG}

{*********************************************************************
****                                                               ****
****                    MACHINE STATIC_LOGIC                       ****
****                                                               ****
*********************************************************************}

MACHINE STATIC_LOGIC;
        BEGIN
            S0 := (~C_IDX[2]*~C_IDX[1]*~C_IDX[0]) +
                  (~C_IDX[2]*C_IDX[1]*~C_IDX[0]) +
                  (C_IDX[2]*~C_IDX[1]*~C_IDX[0]);
            S1 := (~C_IDX[2]*~C_IDX[1]*~C_IDX[0]) +
                  (~C_IDX[2]*C_IDX[1]*C_IDX[0]) +
                  (C_IDX[2]*~C_IDX[1]*C_IDX[0]);
            S2 := (~C_IDX[2]*~C_IDX[1]*~C_IDX[0]) +
                  (~C_IDX[2]*C_IDX[1]*~C_IDX[0]) +
                  (C_IDX[2]*C_IDX[1]*~C_IDX[0]);
            S3 := (~C_IDX[2]*~C_IDX[1]*~C_IDX[0]) +
                  (~C_IDX[2]*C_IDX[1]*C_IDX[0]) +
                  (C_IDX[2]*C_IDX[1]*C_IDX[0]);

END;    {END OF MACHINE STATIC LOGIC}

{*********************************************************************
****                                                               ****
****                    MACHINE SAVE_VALUES                        ****
****                                                               ****
*********************************************************************}
```

```
MACHINE SAVE_VALUES;
    BEGIN                           {SAVE STATE INFORMANTION}
        OLD_SERP  := ((MSB_SLOPE*SET_SLOPE) + (~OLD_SERP*SET_SERP) +
                     (OLD_SERP*~SET_SLOPE*~SET_SERP));
        OLD_SERP1 := ((((MSB_SLOPE*AA_MD)+(C_IDX[2]*AA_MD))*SET_SLOPE) +
                     (((~OLD_SERP*AA_MD)+(C_IDX[2]*AA_MD))*SET_SERP) +
                     (OLD_SERP1 * ~SET_SLOPE * ~SET_SERP));
        OLD_SERP2 := ((MSB_SLOPE*AA_MD*SET_SLOPE) +
                     (~OLD_SERP*AA_MD*SET_SERP) +
                     (OLD_SERP2 * ~SET_SLOPE * ~SET_SERP));
        OLD_SERP3 := ((((~MSB_SLOPE*AA_MD)+(C_IDX[2]*AA_MD))*SET_SLOPE) +
                     (((OLD_SERP*AA_MD)+(C_IDX[2]*AA_MD))*SET_SERP) +
                     (OLD_SERP3 * ~SET_SLOPE * ~SET_SERP));
        OLD_SERP4 := ((~MSB_SLOPE*AA_MD*SET_SLOPE) +
                     (OLD_SERP*AA_MD*SET_SERP) +
                     (OLD_SERP4 * ~SET_SLOPE * ~SET_SERP));

OLD_INCR := (INCR*SET_SAVE) + (OLD_INCR*~SET_SAVE*~SET_SAVE_1) +
                    (INCR_1*SET_SAVE_1);
        OLD_DECR := (DECR*SET_SAVE) + (OLD_DECR*~SET_SAVE*~SET_SAVE_1) +
                    (DECR_1*SET_SAVE_1);
        OLD_HOLD := (HOLD*SET_SAVE) + (OLD_HOLD*~SET_SAVE*~SET_SAVE_1) +
                    (HOLD_1*SET_SAVE_1);
        H_CON := (C_IDX[2] + C_IDX[1] +
                 (~C_IDX[2]*~C_IDX[1]*~AA_MD));      {STATIC PER VECTOR}

SLOPE_OUT[0] := ((((~MSB_SLOPE*SLOPE_IN[0]) +
                        (MSB_SLOPE*~SLOPE_IN[0]) +
                        (~MSB_SLOPE*SLOPE_IN[4]))*SET_SLOPE) +
                        (SLOPE_OUT[0] * ~SET_SLOPE));
        SLOPE_OUT[1] := ((((~MSB_SLOPE*SLOPE_IN[1]) +
                        (MSB_SLOPE*~SLOPE_IN[1]) +
                        (~MSB_SLOPE*SLOPE_IN[4]))*SET_SLOPE) +
                        (SLOPE_OUT[1] * ~SET_SLOPE));
        SLOPE_OUT[2] := ((((~MSB_SLOPE*SLOPE_IN[2]) +
                        (MSB_SLOPE*~SLOPE_IN[2]) +
                        (~MSB_SLOPE*SLOPE_IN[4]))*SET_SLOPE) +
                        (SLOPE_OUT[2] * ~SET_SLOPE));
        SLOPE_OUT[3] := ((((~MSB_SLOPE*SLOPE_IN[3]) +
                        (MSB_SLOPE*~SLOPE_IN[3]) +
                        (~MSB_SLOPE*SLOPE_IN[4]))*SET_SLOPE) +
                        (SLOPE_OUT[3] * ~SET_SLOPE));

PAT_STAGE_1 := ((PAT_ON * ADVANCE_PAT_1) +
                       (PAT_STAGE_1 * ~ ADVANCE_PAT_1));
        TRANS_LT    := ((~PAT_STAGE_1*ADVANCE_PAT_3) +
                       (TRANS_LT*~ADVANCE_PAT_3));

ALMOST_ADD_V := OLD_INCR + OLD_DECR + OLD_HOLD;

ALMOST_AA_ADR :=   {**[TOP/MID PIXEL]= ((OLD_STEP*OLD_DECR)+
                            (~OLD_STEP*OLD_INCR)) + ~AA_MD **}
                       (((((OLD_INCR + OLD_DECR)*Y_MAJOR) +
                       ((OLD_INCR+OLD_DECR)*~C_IDX[2]*~Y_MAJOR))*OLD_DECR) +
                       (~(((OLD_INCR + OLD_DECR)*Y_MAJOR) +
                       ((OLD_INCR+OLD_DECR)*~C_IDX[2]*~Y_MAJOR))*OLD_INCR) +
```

```
            ~AA_MD);

NO_XS_FRAC := ((((~HOURGLASS*XST_EQ_0) + (HOURGLASS*XRT_EQ_0)) *
              SET_XS_FRAC) +
              (NO_XS_FRAC * ~SET_XS_FRAC));

INCR := ((~DELAYED_STOP*((((~MIN_AXIS[1]*~MIN_AXIS[0]*S1) +
      (~MIN_AXIS[1]*MIN_AXIS[0]*S2) +
      (MIN_AXIS[1]*~MIN_AXIS[0]*S3) +
      (MIN_AXIS[1]*MIN_AXIS[0]*S0))* OLD_SERP1 * ~Y_MAJOR) +
      ((((~MAJ_AXIS[1]*MAJ_AXIS[0]*MAJ_DECX*S0) +
      (MAJ_AXIS[1]*MAJ_AXIS[0]*~MAJ_DECX*S0)) +
      ((MAJ_AXIS[1]*~MAJ_AXIS[0]*MAJ_DECX*S1) +
      (~MAJ_AXIS[1]*~MAJ_AXIS[0]*~MAJ_DECX*S1)) +
      ((MAJ_AXIS[1]*MAJ_AXIS[0]*MAJ_DECX*S2) +
      (~MAJ_AXIS[1]*MAJ_AXIS[0]*~MAJ_DECX*S2)) +
      ((~MAJ_AXIS[1]*~MAJ_AXIS[0]*MAJ_DECX*S3) +
      (MAJ_AXIS[1]*~MAJ_AXIS[0]*~MAJ_DECX*S3)))*OLD_SERP2*Y_MAJOR))+
      (INCR * DELAYED_STOP));
DECR := ((~DELAYED_STOP*(((((~MIN_AXIS[1]*~MIN_AXIS[0])*S3) +
      ((~MIN_AXIS[1]*MIN_AXIS[0])*S0) +
      ((MIN_AXIS[1]*~MIN_AXIS[0])*S1) +
      ((MIN_AXIS[1]*MIN_AXIS[0])*S2))* OLD_SERP3 * ~Y_MAJOR) +
      ((((~MAJ_AXIS[1]*MAJ_AXIS[0]*MAJ_DECX*S0) +
      (MAJ_AXIS[1]*MAJ_AXIS[0]*~MAJ_DECX*S0)) +
      ((MAJ_AXIS[1]*~MAJ_AXIS[0]*MAJ_DECX*S1) +
      (~MAJ_AXIS[1]*~MAJ_AXIS[0]*~MAJ_DECX*S1)) +
      ((MAJ_AXIS[1]*MAJ_AXIS[0]*MAJ_DECX*S2) +
      (~MAJ_AXIS[1]*MAJ_AXIS[0]*~MAJ_DECX*S2)) +
      ((~MAJ_AXIS[1]*~MAJ_AXIS[0]*MAJ_DECX*S3) +
      (MAJ_AXIS[1]*~MAJ_AXIS[0]*~MAJ_DECX*S3)))*OLD_SERP4*Y_MAJOR))+
      (DECR * DELAYED_STOP));
HOLD := ((~DELAYED_STOP*(((((~MIN_AXIS[1]*~MIN_AXIS[0])*S0) +
      ((~MIN_AXIS[1]*MIN_AXIS[0])*S1) +
      ((MIN_AXIS[1]*~MIN_AXIS[0])*S2) +
      ((MIN_AXIS[1]*MIN_AXIS[0])*S3))* H_CON * ~Y_MAJOR) +
      ((((~MAJ_AXIS[1]*MAJ_AXIS[0]*MAJ_DECX*S0) +
      (MAJ_AXIS[1]*MAJ_AXIS[0]*~MAJ_DECX*S0)) +
      ((MAJ_AXIS[1]*~MAJ_AXIS[0]*MAJ_DECX*S1) +
      (~MAJ_AXIS[1]*~MAJ_AXIS[0]*~MAJ_DECX*S1)) +
      ((MAJ_AXIS[1]*MAJ_AXIS[0]*MAJ_DECX*S2) +
      (~MAJ_AXIS[1]*MAJ_AXIS[0]*~MAJ_DECX*S2)) +
      ((~MAJ_AXIS[1]*~MAJ_AXIS[0]*MAJ_DECX*S3) +
      (MAJ_AXIS[1]*~MAJ_AXIS[0]*~MAJ_DECX*S3)))*~AA_MD*Y_MAJOR))+
      (HOLD * DELAYED_STOP));

INCR_1 := ((((~MIN_AXIS[1]*~MIN_AXIS[0]*S1) +
      (~MIN_AXIS[1]*MIN_AXIS[0]*S2) +
      (MIN_AXIS[1]*~MIN_AXIS[0]*S3) +
      (MIN_AXIS[1]*MIN_AXIS[0]*S0))* OLD_SERP1 * ~Y_MAJOR) +
      (((~MAJ_AXIS[1]*~MAJ_AXIS[0]*S0) +
      (~MAJ_AXIS[1]*MAJ_AXIS[0]*S1) +
      (MAJ_AXIS[1]*~MAJ_AXIS[0]*S2) +
      (MAJ_AXIS[1]*MAJ_AXIS[0]*S3))*OLD_SERP2*Y_MAJOR));
DECR_1 := ((((~MIN_AXIS[1]*~MIN_AXIS[0])*S3) +
```

```
                ((~MIN_AXIS[1]*MIN_AXIS[0])*S0) +
                ((MIN_AXIS[1]*~MIN_AXIS[0])*S1) +
                ((MIN_AXIS[1]*MIN_AXIS[0])*S2))* OLD_SERP3 * ~Y_MAJOR) +
                (((~MAJ_AXIS[1]*~MAJ_AXIS[0]*S0) +
                (~MAJ_AXIS[1]*MAJ_AXIS[0]*S1) +
                (MAJ_AXIS[1]*~MAJ_AXIS[0]*S2) +
                (MAJ_AXIS[1]*MAJ_AXIS[0]*S3))*OLD_SERP4*Y_MAJOR));
HOLD_1  := (((((~MIN_AXIS[1]*~MIN_AXIS[0])*S0) +
                ((~MIN_AXIS[1]*MIN_AXIS[0])*S1) +
                ((MIN_AXIS[1]*~MIN_AXIS[0])*S2) +
                ((MIN_AXIS[1]*MIN_AXIS[0])*S3))* H_CON * ~Y_MAJOR) +
                (((~MAJ_AXIS[1]*~MAJ_AXIS[0]*S0) +
                (~MAJ_AXIS[1]*MAJ_AXIS[0]*S1) +
                (MAJ_AXIS[1]*~MAJ_AXIS[0]*S2) +
                (MAJ_AXIS[1]*MAJ_AXIS[0]*S3))*~AA_MD*Y_MAJOR));

MAJOR_Y   := Y_MAJOR;   {PASS THROUGH TO OUTPUT FORMATTER}
MAJOR_DEC := MAJ_DECX;  {PASS THROUGH TO OUTPUT FORMATTER}
MINOR_SLOPE := ((MSB_SLOPE*SET_SLOPE) +
   (MINOR_SLOPE*~SET_SLOPE));   {PASS THROUGH TO OUTPUT FORMATTER}

ES_RESET := RESETX;

ADV_EVEN_PIPE := CLK25MHZX*~STOPX;
ADV_ODD_PIPE  := ~CLK25MHZX*~STOPX;
ADV_XY_PIPE   := ~CLK25MHZX*~STOPX + RESETX;
EVEN_L  := CLK25MHZX*~STOPX;
EVEN_R  := CLK25MHZX*~STOPX;
ODD     := ~CLK25MHZX*~STOPX;
LATCH_ROM := CLK25MHZX*~STOPX;
ADV_PIPE_L := ~STOPX + RESETX;
ADV_PIPE_R := ~STOPX + RESETX;
DADV_PIPE  := ~STOPX;
DADV_PIPE1 := ~STOPX;

DELAYED_STOP := STOPX;        {DELAY STOP FOR ONE EXTRA CLOCK}

INT_MODEX[0] := PRI_FLUSH_FLAG + VEC_PIXEL;

INT_MODEX[4] := ((SWAP_MODE * SET_SWAP_MODE) +
                (INT_MODEX[4] * ~SET_SWAP_MODE));

ADV_NORM := RESETX;           {LOGIC TO SWAP TOP OF X Y PIPE}

LAST_INT := ((~INT_MODEX[3] * SET_INT) +
             (LAST_INT * ~SET_INT));

IF (~CLK25MHZX*~STOPX) THEN
   IF (LAST_INT * INT_MODEX[3] * INT_MODEX[0]) THEN
      BEGIN
         ADV_BYPASS;
         EOS;                 {TELL OUT PUT THERE IS A BUBBLE}
      END
   ELSE
      BEGIN
```

```
                    ADV_NORM;
                    SET_INT;
                    END;

END;    {END OF MACHINE SAVE_VALUES}
{*********************************************************************
****                                                               ****
****                    MACHINE X_STEPPER                          ****
****                                                               ****
*********************************************************************}
MACHINE X_STEPPER;
        BEGIN
        IF RESETX THEN
            BEGIN
                ?FLUSH_FLAG;
                ?VERTEX_FLAG;
                ?CMD_FLUSH_FLAG;
                ?SCAN_FLUSH_FLAG;
                ?VEC_FLUSH_FLAG;
                ?PRI_FLUSH_FLAG;
                ?FOUND_LINE;
                ?KEEP_GOING_1;
                ?KEEP_GOING_2;
                ?KEEP_GOING_3;
                ?NEW_SCAN_LINE;
                ?W_FRAC_FLAG_A;
                ?W_FRAC_FLAG_B;
                ?SET_SERP;
                ?SET_SAVE;
                ?SET_SAVE_1;
                ?SET_SLOPE;
                ?VEC_PIXEL;
                ?CNT_RESET;
                ?CNT_NORM;
                ?ADD_VALID;
                ?EOS;
                ?VECTOR_TRAP;
                ?PIPE_LOCAL;
                ?ADVANCE_PAT_1;
                ?ADVANCE_PAT_3;
                ?CUR_Y_LD_Y_BUS;
                ?CUR_Y_LD_INCR;
                ?CUR_Y_LD_DECR;
                ?CUR_MAJ_LD;
                ?CUR_MAJ_NDUMP;
                ?XS_LD_CMD_BUS;
                ?XS_LD_Y_BUS;
                ?XS_NDUMP;
                ?CUR_X_LD_XS;
                ?CUR_X_LD_XS_INCR;
                ?CUR_X_NDUMP;
                ?CUR_X_LD_INCR;
                ?CUR_X_LD_DECR;
                ?ADD_LD_X_X;
```

```
            ?ADD_LD_X_Y;
            ?ADD_LD_Y_X;
            ?ADD_LD_Y_Y;
            ?ADD_NDUMP;
            ?XE_LD_Y_BUS;
            ?XE_LD_CMD_BUS;
            ?XE_NDUMP;
            ?W_REGS_LD_1;
            ?W_REGS_LD_2;
            ?WS_NDUMP;
            ?WE_NDUMP;
            ?W_NDUMP;
            ?W_ROM_NDUMP;
            ?CUR_CMD_LD;
            ?TEMP_CMD_LD;
            ?TEMP_CMD_NDUMP;
            ?MODE_REG_LD;
            ?MODE_REG_NDUMP;
            ?FRAC_REG_LD;
            ?AA_ROM_BANK[1];
            ?AA_ROM_BANK[0];
            ?IN_BUFFER_TAKEN;
            ?SFT_ES_A_IN;
            ?SFT_ES_B_IN;
            ?SFT_ES_COUNT_IN;
            ?D_CMD_X;
            ?D_XST_X;
            ?D_YSL_X;
            ?D_XRT_Y;
            ?D_YST_Y;
            ?S_LT_DEC;
            ?S_LTP_SFT;
            ?RESET_LINETYPE;
            ?S_WF_ADD;
            ?S_WFRT_ADD;
            ?ES_STEP;
            ?INT_MODEX[3];
            ?INT_MODEX[2];
            ?INT_MODEX[1];
            ?XS_SET;
            ?XE_SET;
            ?COM_SET;
            ?COM_LD;
            ?DATA_LD;
            NEXT_STATE DUMMY;
            END
        ELSE
            CASE PRESENT_STATE OF
            DUMMY:
                BEGIN                           {USED ON POWER UP }
                DO_NOT_START_SIDE;
                NEXT_STATE STARTA;
                END;

STARTA:
                BEGIN       {STARTA}            {THIS IS AN EVEN STATE}
```

```
    IF (VERTEX_FLAG) THEN VERTEX_FLAG;
    IF (PRI_FLUSH_FLAG) THEN PRI_FLUSH_FLAG;
    DO_NOT_START_SIDE;   {DO NOT LET SIDE DOOR MACHINE RUN}
    IF (STOPX + ~CLK25MHZX) THEN       {GET IN SYNC TO START}
       BEGIN
         IF (CMD_FLUSH_FLAG) THEN CMD_FLUSH_FLAG;
         IF (FLUSH_FLAG) THEN
           BEGIN
           FLUSH_FLAG;
           IF (SCAN_FLUSH_FLAG) THEN SCAN_FLUSH_FLAG;
           END;
       NEXT_STATE STARTA;
       END
    ELSE
      BEGIN
       IF (FLUSH_FLAG) THEN
          BEGIN
          FLUSH_FLAG := 1;
          IF (CMD_FLUSH_FLAG) THEN CMD_FLUSH_FLAG;
          IF (SCAN_FLUSH_FLAG) THEN SCAN_FLUSH_FLAG;
          NEXT_STATE STARTB;      {LOOP UNTIL IT CAN BE SENT}
          END
        ELSE
          BEGIN
          IF (COMMAND_FULLX*~SIDE_DOOR_BUSY) THEN
             BEGIN
             D_CMD_X;      {DUMP E.S. CMD REG TO CMD BUS}
             TEMP_CMD_LD;           {LOAD TEMP CMD REG}
             COMMAND_TAKEN;         {TELL EDGE STEPPER COMMAND TAKEN}
             NEXT_STATE DISPATCH;              {SEE IF IT'S FOR ME}
             END
           ELSE
             BEGIN {COMMAND NOT READY, GOTO STATRB TO SYNC TO CLK25MHZX}
             NEXT_STATE STARTB;
             END;
          END;                      {END OF ELSE FLUSH_FLAG*COM_BUSY}
       END;
   END; {STARTA}

STARTB:
    BEGIN                       {THIS IS AN ODD STATE}
      DO_NOT_START_SIDE;        {DO NOT LET SIDE DOOR MACHINE RUN}
      IF (VERTEX_FLAG) THEN VERTEX_FLAG; {IF SET THEN KEEP IT SET}
      IF (FLUSH_FLAG*~COM_BUSY*~SIDE_DOOR_BUSY) THEN
         BEGIN         {FLUSH COMMAND}
        TEMP_CMD_NDUMP;
        IF (~VERTEX_FLAG) THEN {DON'T TELL OUTPUT ABOUT VERTS}
        PIPE_LOCAL := 1;    {TELL OUTPUT THAT SOMETHING IN PIPE}
        COM_SET;                {SET REGISTER IN YW STACK}
        IF (SCAN_FLUSH_FLAG) THEN VECTOR_TRAP;
        IF (CMD_FLUSH_FLAG) THEN
             COM_LD              {TELL PLA COMMAND WAS LOADED}
          ELSE
             DATA_LD;         {TELL PLA DATA WAS LOADED}
        NEXT_STATE STARTA;
        END
```

```
        ELSE
          BEGIN
            IF (FLUSH_FLAG) THEN FLUSH_FLAG;      {IF SET THEN KEEP IT SET}
            IF (CMD_FLUSH_FLAG) THEN CMD_FLUSH_FLAG;
            IF (SCAN_FLUSH_FLAG) THEN SCAN_FLUSH_FLAG;
            NEXT_STATE STARTA;
          END;
        END;

DISPATCH:
  BEGIN                            {THIS IS AN ODD STATE}
    DO_NOT_START_SIDE;  {DO NOT LET SIDE DOOR MACHINE RUN}
    IF (VEC_FLUSH_FLAG) THEN
      BEGIN
        INT_MODEX[2];
        PRI_FLUSH_FLAG;
        ADD_VALID := ALMOST_ADD_V;
        VECTOR_TRAP := 1;            {TELL OUTPUT IT'S A VECTOR PIXEL}
        AA_ROM_BANK[1] := ALMOST_AA_ADR;
        AA_ROM_BANK[0] := ~AA_MD + OLD_HOLD;
        ADD_NDUMP;                   {DUMP ADDRESS TO BUS}
        CUR_MAJ_NDUMP;               {SEND CURRENT MAJ TO INTERPOLATOR}
        EOS := 1;                    {FORCE END OF PRIMATIVE}
        PIPE_LOCAL := 1;             {EOS * PIPE = EOP}
      END;
    IF (COMMAND_BITX) THEN
      BEGIN
        IF ((~COM_BUSY * ~VEC_FLUSH_FLAG) *
            !(~CMDS[7]*~CMDS[6]*CMDS[5]*~CMDS[4]*
              ~CMDS[3]*~CMDS[2]*SCAN_DECODEX)) THEN
                                     {EAT SET DRAW MODE}
          BEGIN                      {DUMP CMD REG TO CXY BUS}
            TEMP_CMD_NDUMP;
            COM_SET;
            COM_LD;
          END
        ELSE
          BEGIN
            FLUSH_FLAG;              {SET IN CASE OF GOTO STARTA OR VEC_2}
            CMD_FLUSH_FLAG;
          END;
      END;
    IF (COMMAND_BITX*SCAN_DECODEX) THEN        {PROCESS COMMAND}
      BEGIN
        IF (~CMDS[7]*~CMDS[6]*~CMDS[5]*CMDS[4]) THEN
          BEGIN                      {PROCESSING 4 TYPES OF TRAPS}
            SFT_ES_COUNT_IN;         {MOVE NEW COUNT INTO E.S.}
            IN_BUFFER_TAKEN;         {TELL E.S. DATA IS MOVED}
            CUR_CMD_LD;              {LOAD THE CURRENT COMMAND REG}
            IF (~CMDS[3]) THEN
              BEGIN
                D_YST_Y;             {DUMP Y_START TO Y BUS}
                CUR_Y_LD_Y_BUS;      {LOAD MY CURRENT Y REGISTER}
                IF (CMDS[1]) THEN        {NEW_A_TRAP}
                  BEGIN
                    SFT_ES_A_IN;         {MOVE IN BUFFER A TO STEPPER}
```

```
            W_FRAC_FLAG_A;              { NEW FRAC A WAS LOADED}
         END;
      IF (CMDS[0]) THEN                 {NEW_B_TRAP}
         BEGIN
            SFT_ES_B_IN;                {MOVE IN BUFFER A TO STEPPER}
            W_FRAC_FLAG_B;              { NEW FRAC B WAS LOADED}
         END;
      IF (~COM_BUSY * ~VEC_FLUSH_FLAG) THEN
            BEGIN
            NEXT_STATE DRAW_TRAP_2;
            END
         ELSE
            NEXT_STATE DRAW_TRAP_WAIT;   {LOOP}
      END;
   IF (CMDS[3]) THEN                    {VECTOR COMMAND}
      BEGIN
         D_YSL_X;                       {DUMP THE Y_SLOPE REG FROM E.S.}
         SET_SLOPE := 1;                {SET SLOPE AND FIRST SERP'S}
         IF (CMDS[0]) THEN RESET_LINETYPE;
         SFT_ES_A_IN;                   {MOVE IN BUFFER TO STEPPER}
         SFT_ES_B_IN;
         IF (VEC_FLUSH_FLAG) THEN
            VEC_FLUSH_FLAG;             {DON'T DO 2 TEMP_CMD_NDUMPS}
         NEXT_STATE DRAW_VEC_2;
      END
   END
ELSE IF (~CMDS[7]*~CMDS[6]*CMDS[5]*~CMDS[4]*
         ~CMDS[3]*~CMDS[2]*~CMDS[1]*~CMDS[0]) THEN
   BEGIN                                {SET_MODE}
      CNT_RESET := 1;
      CNT_NORM := 1;                    {RESET SET_MODE COUNTER}
      NEXT_STATE SET_MODE_2;
   END
ELSE IF (~CMDS[7]*~CMDS[6]*CMDS[5]*~CMDS[4]*CMDS[3]) THEN
   BEGIN                                {SET_VERT ETC. (NON_PIPE)}
      IF (COM_BUSY + VEC_FLUSH_FLAG) THEN
         NEXT_STATE SEND_VERT_WAIT      {LOOP}
      ELSE
         BEGIN
            VERTEX_FLAG := 1;           {NEXT DATA IS EATEN BY VERT CMD}
            NEXT_STATE STARTA;
         END;
   END
ELSE IF (CMDS[7]*CMDS[6]*~CMDS[5]*~CMDS[4]*
         CMDS[3]*~CMDS[0]) THEN
   BEGIN
      IF (~COM_BUSY * ~VEC_FLUSH_FLAG) THEN
         BEGIN
            VECTOR_TRAP;
            PIPE_LOCAL := 1;            {TELL OUTPUT SOMETHING IN PIPE}
            NEXT_STATE READ_MODE_2;
         END
      ELSE
         NEXT_STATE READ_MODE_WAIT;     {LOOP}
   END
ELSE                                    {PASS THROUGH COMMAND}
```

```
            BEGIN
            SCAN_FLUSH_FLAG;      {FOR OUTPUT FORMATTER}
            IF (~COM_BUSY * ~VEC_FLUSH_FLAG) THEN
                BEGIN
                    VECTOR_TRAP := 1;      {TELL OUTPUT IT'S A SCAN CMD}
                    PIPE_LOCAL := 1;
                    NEXT_STATE STARTA;
                END
            ELSE
                BEGIN
                    NEXT_STATE STARTA;
                END;
            END
        END
    ELSE                          {DATA OR SOME OTHER CHIP'S CMD}
        BEGIN
        IF (COMMAND_BITX) THEN
            BEGIN
            IF (~COM_BUSY * ~VEC_FLUSH_FLAG) THEN
                BEGIN
                    PIPE_LOCAL := 1;
                    NEXT_STATE STARTA;
                END
            ELSE
                BEGIN
                    FLUSH_FLAG := 1;
                    CMD_FLUSH_FLAG := 1;   {TELL FLUSH ITS A CMD}
                    NEXT_STATE STARTA;
                END;
            END
        ELSE                          {PASS DATA THROUGH}
            BEGIN
            IF (VERTEX_FLAG) THEN VERTEX_FLAG;    {IF SET KEEP SET}
                              {ANY CMD WILL CLEAR VERTEX_FLAG}
            IF (~COM_BUSY * ~VEC_FLUSH_FLAG) THEN
                BEGIN
                    TEMP_CMD_NDUMP;
                    COM_SET;               {SET REGISTER IN YW STACK}
                    DATA_LD;               {TELL PLA DATA WAS LOADED}
                    IF (~VERTEX_FLAG) THEN PIPE_LOCAL := 1;
                    NEXT_STATE STARTA;
                END
            ELSE
                BEGIN
                    FLUSH_FLAG := 1;
                    NEXT_STATE STARTA;     {LOOP}
                END;
            END;
        END;
    END;                          {END OF STATE DISPATCH}

{ ****************** PROCESS VERTEX COMMAND ******************}
        SEND_VERT:
            BEGIN                     {THIS IS AN ODD STATE}
```

```
           DO_NOT_START_SIDE;        {DO NOT LET SIDE DOOR MACHINE RUN}
           IF (COM_BUSY) THEN
              NEXT_STATE SEND_VERT_WAIT    {LOOP UNTIL IT CAN BE SENT}
           ELSE
              BEGIN
              TEMP_CMD_NDUMP;
              COM_SET;              {SET REGISTER IN YW STACK}
              COM_LD;               {TELL PLA COMMAND WAS LOADED}
              VERTEX_FLAG := 1;     {NEXT DATA IS EATEN BY VERT CMD}
              NEXT_STATE STARTA;
              END;
           END;                     {END OF STATE SEND_VERT}

SEND_VERT_WAIT:               {WAIT FOR INTERPOLATOR}
           BEGIN                    {THIS IS AN EVEN STATE}
           DO_NOT_START_SIDE;       {DO NOT LET SIDE DOOR MACHINE RUN}
           IF (PRI_FLUSH_FLAG) THEN PRI_FLUSH_FLAG;
           IF (STOPX) THEN
              NEXT_STATE SEND_VERT_WAIT
           ELSE
              NEXT_STATE SEND_VERT; {GO BACK TO SEE IF I CAN DUMP CMD}
           END;

{ ****************** PROCESS SET_MODE COMMAND ******************}

SET_MODE:
           BEGIN                    {THIS IS AN ODD STATE}
           DO_NOT_START_SIDE;       {DO NOT LET SIDE DOOR MACHINE RUN}
           IF(KEEP_GOING_1) THEN KEEP_GOING_1;    {SECOND TIME THROUGH}
           CNT_RESET := 1;
           CNT_NORM := 1;           {RESET SET_MODE COUNTER}
           NEXT_STATE SET_MODE_2;
           END;

SET_MODE_2:                   {THIS IS AN EVEN STATE}
           BEGIN       {DELAY LONG ENOUGH FOR PIPE TO EMPTY}
           DO_NOT_START_SIDE;       {DO NOT LET SIDE DOOR MACHINE RUN}
           IF (PRI_FLUSH_FLAG) THEN PRI_FLUSH_FLAG;
           IF(KEEP_GOING_1) THEN KEEP_GOING_1;    {SECOND TIME THROUGH}
           IF (STOPX) THEN
              BEGIN
              CNT_NORM;             {STOP THE COUNTER}
              NEXT_STATE SET_MODE_2;
              END
           ELSE
              NEXT_STATE SET_MODE_3;
           END;

SET_MODE_3:
           BEGIN                    {THIS IS AN ODD STATE}
           DO_NOT_START_SIDE;       {DO NOT LET SIDE DOOR MACHINE RUN}
           IF(KEEP_GOING_1) THEN KEEP_GOING_1;    {SECOND TIME THROUGH}
           IF (CNT[3]*CNT[2]*CNT[1]) THEN    {WAITED FOR PIPE TO FLUSH}
              BEGIN
              IF (PRI_DONE*KEEP_GOING_1) THEN   {READY TO CHANGE MODE}
                 BEGIN
```

```
                MODE_REG_LD;
                NEXT_STATE STARTA;
                END
            ELSE                    {OUPUT STILL PROCESSING}
                BEGIN
                KEEP_GOING_1;        {LET COUNTER TIME OUT TWICE}
                NEXT_STATE SET_MODE; {TRY AGAIN}
                END;
            END
        ELSE                         {HAVE NOT COUNTED LONG ENOUGH}
            NEXT_STATE SET_MODE_2;   {COUNT UNTIL PIPE FLUSHED}
        END;

{ ****************** PROCESS READ_MODE COMMAND ******************}

READ_MODE:
            BEGIN                    {THIS IS AN ODD STATE}
            DO_NOT_START_SIDE;       {DO NOT LET SIDE DOOR MACHINE RUN}
            IF (COM_BUSY) THEN
                NEXT_STATE READ_MODE_WAIT    {LOOP UNTIL I CAN SEND IT}
            ELSE
                BEGIN
                TEMP_CMD_NDUMP;              {SEND COMMAND OUT AS HEADER}
                COM_SET;                 {SET COMMAND INTO YW STACK}
                COM_LD;                  {TELL INTERPOLATOR COMMAND LOADED}
                VECTOR_TRAP;
                PIPE_LOCAL := 1;         {TELL OUTPUT THAT SOMETHING IN PIPE}
                NEXT_STATE READ_MODE_2;
                END;
            END;

READ_MODE_WAIT:              {WAIT FOR INTERPOLATOR}
            BEGIN                    {THIS IS AN EVEN STATE}
            DO_NOT_START_SIDE;       {DO NOT LET SIDE DOOR MACHINE RUN}
            IF (PRI_FLUSH_FLAG) THEN PRI_FLUSH_FLAG;
            IF (STOPX) THEN
                NEXT_STATE READ_MODE_WAIT
            ELSE
                NEXT_STATE READ_MODE;    {GO BACK TO SEE IF I CAN DUMP CMD}
            END;

READ_MODE_2:
            BEGIN                    {THIS IS AN EVEN STATE}
            DO_NOT_START_SIDE;       {DO NOT LET SIDE DOOR MACHINE RUN}
            IF (PRI_FLUSH_FLAG) THEN PRI_FLUSH_FLAG;
            IF (STOPX) THEN
                NEXT_STATE READ_MODE_2
            ELSE
                NEXT_STATE READ_MODE_3;  {GO TO DUMP DATA}
            END;

READ_MODE_3:
            BEGIN                    {THIS IS AN ODD STATE}
            DO_NOT_START_SIDE;       {DO NOT LET SIDE DOOR MACHINE RUN}
            IF (COM_BUSY) THEN
```

```
            NEXT_STATE READ_MODE_2    {LOOP UNTIL I CAN SEND IT}
        ELSE
          BEGIN
            MODE_REG_NDUMP;           {SEND CONTENTS OF MODE REG OUT}
            COM_SET;                  {TELL INTERPOLATOR REGISTER SET}
            DATA_LD;                  {TELL INTERPOLATOR DATA LOADED}
            PIPE_LOCAL := 1;          {TELL OUTPUT THAT SOMETHING IN PIPE}
            NEXT_STATE STARTA;        {GO BACK TO TOP OF LOOP}
          END;
      END;                            {END OF READ_MODE_2}

{ ******************* PROCESS DRAW_VEC COMMAND *******************}

DRAW_VEC_1:                       {WAIT FOR INTERPOLATOR}
      BEGIN                           {THIS IS AN ODD STATE}
        DO_NOT_START_SIDE;            {DO NOT LET SIDE DOOR MACHINE RUN}
        IF (FLUSH_FLAG) THEN FLUSH_FLAG;
        NEXT_STATE DRAW_VEC_2;        {GO BACK TO SEE IF I CAN DUMP CMD}
      END;

DRAW_VEC_2:
      BEGIN                           {THIS IS AN EVEN STATE}
        DO_NOT_START_SIDE;            {DO NOT LET SIDE DOOR MACHINE RUN}
        IF (PRI_FLUSH_FLAG) THEN PRI_FLUSH_FLAG;
        IF (FLUSH_FLAG) THEN FLUSH_FLAG;
        IF (STOPX) THEN
          NEXT_STATE DRAW_VEC_2
        ELSE
         BEGIN
          IF (COM_BUSY * FLUSH_FLAG) THEN
            NEXT_STATE DRAW_VEC_1     {LOOP UNTIL I CAN SEND COMMAND}
          ELSE
           BEGIN
            IF (FLUSH_FLAG) THEN      {NDUMP WAS NOT DONE IN DISPATCH}
              BEGIN
                TEMP_CMD_NDUMP;
                COM_SET;              {SET COMMAND INTO YW STACK}
                COM_LD;               {INTERPOLATOR COMMAND LOADED}
              END;
            D_YST_Y;                  {DUMP Y_START/MAJOR REG TO Y BUS}
            CUR_Y_LD_Y_BUS;           {LOAD MY CURRENT Y/MAJOR REG}
            D_XST_X;                  {DUMP X_START/MINOR FROM E.S.}
            XS_LD_CMD_BUS;            {LOAD MINOR INTO X_START REG}
            NEXT_STATE DRAW_VEC_3
           END;
         END;
      END;                            {END OF STATE DRAW_VEC_2}

DRAW_VEC_3:
      BEGIN                           {THIS IS AN ODD STATE}
        DO_NOT_START_SIDE;            {DO NOT LET SIDE DOOR MACHINE RUN}
        ADVANCE_PAT_1;                {LATCH LINE PATTERN INTO ITS PIPE}
        IF (~YCNT_EQ_0) THEN
          BEGIN
            FRAC_REG_LD;              {LOAD FRACTIONAL POSITION INTO REG}
            ES_STEP;
```

```
            SET_SWAP_MODE;                  {SEND STATUS TO INTERPOLATOR}
            IF (MAJ_DECX) THEN
                SWAP_MODE;                  {MAJ_DEC = SWAP ELSE NO-SWAP}
            IF (LT_CNT_MINUS) THEN
                S_LTP_SFT
            ELSE
                S_LT_DEC;                   {STEP LINE TYPE WITH MAJOR AXIS}
            NEXT_STATE DRAW_VEC_4;
            END
        ELSE
            BEGIN
            PRI_FLUSH_FLAG;
            NEXT_STATE STARTA;              {ZERO LENGTH VECTOR}
            END;
        END;                                {END OF STATE DRAW_VEC_3}

DRAW_VEC_4:
    BEGIN                                   {THIS IS AN EVEN STATE}
    DO_NOT_START_SIDE;                      {DO NOT LET SIDE DOOR MACHINE RUN}
    IF (STOPX) THEN
        NEXT_STATE DRAW_VEC_4
    ELSE
        BEGIN
        D_XST_X;                            {DUMP NEXT MINOR POSITION}
        XS_LD_CMD_BUS;                      {LOAD MINOR INTO X_START REG}
        CUR_X_LD_XS;                        {LOAD THE CURRENT X/MINOR REG}
        SET_SAVE_1 := 1;                    {SAVE INCR_1,DECR_1, + HOLD_1}
        SET_SERP := 1;
        NEXT_STATE DRAW_VEC_5;
        END;
    END;                                    {END OF STATE DRAW_VEC_4}

DRAW_VEC_5:
    BEGIN                                   {THIS IS AN ODD STATE}
    VEC_PIXEL;                              {TO SET LSB OF INT_MODEX}
    IF (YCNT_EQ_0) THEN DO_NOT_START_SIDE;
    IF (INCR_1) THEN CUR_X_LD_INCR;         {ADJUST MINOR IF NEEDED}
    IF (DECR_1) THEN CUR_X_LD_DECR;         {ADJUST MINOR IF NEEDED}
    CUR_MAJ_LD;
    FRAC_REG_LD;                            {LOAD FRACTIONAL POSITION INTO REG}
    ADVANCE_PAT_3;                          {ADVANCE LINE PATTERN PIPE}
    IF (Y_MAJOR) THEN
        ADD_LD_Y_Y
    ELSE
        ADD_LD_X_Y;
    IF(((INCR_1+DECR_1)*Y_MAJOR)+((INCR_1+DECR_1)*~C_IDX[2]*~Y_MAJOR))
    THEN
        BEGIN
        IF(~YCNT_EQ_0 * Y_MAJOR * C_IDX[2] ) THEN
            BEGIN                           {LOOK FOR NEXT MAJOR STEP}
            IF (MAJ_DECX) THEN CUR_Y_LD_DECR;   {ADJUST MAJOR AXIS}
            IF (~MAJ_DECX) THEN CUR_Y_LD_INCR;  {ADJUST MAJOR AXIS}
            ADVANCE_PAT_1;                  {LATCH LINE PATTERN INTO ITS PIPE}
            IF (LT_CNT_MINUS) THEN
                S_LTP_SFT
            ELSE
```

```
                    S_LT_DEC;                  {STEP LINE TYPE WITH MAJOR AXIS}
                ES_STEP;
                END;
            NEXT_STATE DRAW_VEC_STEP_1;
            END
        ELSE
            BEGIN
            IF (YCNT_EQ_0) THEN
                NEXT_STATE DRAW_VEC_FLUSH_1 {RENDERING 1 MINOR AXIS STEP}
            ELSE
                BEGIN
                ES_STEP;
                IF (MAJ_DECX) THEN CUR_Y_LD_DECR;    {ADJUST MAJOR AXIS}
                IF (~MAJ_DECX) THEN CUR_Y_LD_INCR;   {ADJUST MAJOR AXIS}
                ADVANCE_PAT_1;         {LATCH LINE PATTERN INTO ITS PIPE}
                IF (LT_CNT_MINUS) THEN
                    S_LTP_SFT
                ELSE
                    S_LT_DEC;                  {STEP LINE TYPE WITH MAJOR AXIS}
                NEXT_STATE DRAW_VEC_6;         {GOTO THE VECTOR LOOP}
                END;
            END;
        END;                                   {END OF STATE DRAW_VEC_5}

DRAW_VEC_6:             {TOP OF LOOP FOR EACH MINOR AXIS STEP}
    BEGIN                       {THIS IS AN EVEN STATE}
    VEC_PIXEL;                  {TO SET LSB OF INT_MODEX}
    IF (STOPX) THEN
        NEXT_STATE DRAW_VEC_6
    ELSE
    BEGIN
    INT_MODEX[2];               {INTERPOLATOR MODE}
    D_XST_X;                            {DUMP NEXT MINOR POSITION}
    XS_LD_CMD_BUS;                      {PUT MINOR IN X_START REG}
    CUR_X_LD_XS;                {LOAD THE CURRENT X/MINOR REG}
    CUR_MAJ_NDUMP;              {SEND CURRENT MAJ TO INTERPOLATOR}
    IF (Y_MAJOR) THEN
        ADD_LD_X_X                      {LOAD ADDRESS REGISTER}
    ELSE
        ADD_LD_Y_X;                     {LOAD ADDRESS REGISTER}
    SET_SAVE := 1;                      {SAVE INCR, DECR, + HOLD}
    SET_SERP := 1;
    NEXT_STATE DRAW_VEC_7;
    END;
    END;                                {END OF STATE DRAW_VEC_6}

DRAW_VEC_7:
    BEGIN                       {THIS IS AN ODD STATE}
    VEC_PIXEL;                  {TO SET LSB OF INT_MODEX }
    IF (YCNT_EQ_0) THEN DO_NOT_START_SIDE;
    INT_MODEX[2];               {INTERPOLATOR MODE}
    IF (INCR) THEN CUR_X_LD_INCR;       {ADJUST MINOR IF NEEDED}
    IF (DECR) THEN CUR_X_LD_DECR;       {ADJUST MINOR IF NEEDED}
    CUR_MAJ_NDUMP;              {SEND CURRENT MAJ TO INTERPOLATOR}
    CUR_MAJ_LD;
    FRAC_REG_LD;                {LOAD FRACTIONAL POSITION INTO REG}
```

```
    ADVANCE_PAT_3;              {LATCH LINE PATTERN INTO ITS PIPE}
    ADD_VALID := OLD_INCR + OLD_DECR + OLD_HOLD;
    VECTOR_TRAP := 1;           {TELL OUTPUT IS IS A VECTOR PIXEL}
    AA_ROM_BANK[1] := ALMOST_AA_ADR;
    AA_ROM_BANK[0] := ~AA_MD + OLD_HOLD;
    ADD_NDUMP;                              {DUMP ADDRESS TO BUS}
    EOS := ~OLD_INCR * ~OLD_DECR * ~OLD_HOLD; {NO VALID PIXEL}
    IF (Y_MAJOR) THEN
        ADD_LD_Y_Y
      ELSE
        ADD_LD_X_Y;
    IF (((INCR + DECR)*Y_MAJOR) + ((INCR + DECR)*~C_IDX[2]*~Y_MAJOR))
    THEN                         {STEP ALONG MINOR AXIS}
        BEGIN
          IF(~YCNT_EQ_0 * Y_MAJOR * C_IDX[2] ) THEN
             BEGIN                 {LOOK FOR NEXT MAJOR STEP}
               IF (MAJ_DECX) THEN CUR_Y_LD_DECR;   {ADJUST MAJOR AXIS}
               IF (~MAJ_DECX) THEN CUR_Y_LD_INCR;  {ADJUST MAJOR AXIS}
               ADVANCE_PAT_1;       {LATCH LINE PATTERN INTO ITS PIPE}
               IF (LT_CNT_MINUS) THEN
                  S_LTP_SFT
               ELSE
                  S_LT_DEC;                {STEP LINE TYPE WITH MAJOR AXIS}
               ES_STEP;
             END;
          NEXT_STATE DRAW_VEC_STEP_1;
        END
      ELSE
        BEGIN
          IF (~YCNT_EQ_0) THEN    {LOOK AT NEXT SCAN LINE}
             BEGIN
               ES_STEP;
               IF (MAJ_DECX) THEN CUR_Y_LD_DECR;   {ADJUST MAJOR AXIS}
               IF (~MAJ_DECX) THEN CUR_Y_LD_INCR;  {ADJUST MAJOR AXIS}
               ADVANCE_PAT_1;       {LATCH LINE PATTERN INTO ITS PIPE}
               IF (LT_CNT_MINUS) THEN
                  S_LTP_SFT
               ELSE
                  S_LT_DEC;                {STEP LINE TYPE WITH MAJOR AXIS}
               NEXT_STATE DRAW_VEC_6;
             END
          ELSE
             NEXT_STATE DRAW_VEC_FLUSH_1;        {CLEAN UP}
        END;
    END;                                {END OF STATE DRAW_VEC_7}
DRAW_VEC_STEP_1:
    BEGIN                       {THIS IS AN EVEN STATE}
    VEC_PIXEL;                  {TO SET LSB OF INT_MODEX}
    IF (STOPX) THEN
        NEXT_STATE DRAW_VEC_STEP_1
      ELSE
        BEGIN
          INT_MODEX[2];         {INTERPOLATOR MODE}
          CUR_MAJ_NDUMP;        {SEND CURRENT MAJ TO INTERPOLATOR}
          IF (Y_MAJOR) THEN
```

```
        ADD_LD_X_X                      {LOAD ADDRESS REGISTER}
    ELSE
        ADD_LD_Y_X;                     {LOAD ADDRESS REGISTER}
    NEXT_STATE DRAW_VEC_STEP_2;
    END;
END;                                    {END OF STATE DRAW_VEC_STEP_1}

DRAW_VEC_STEP_2:
    BEGIN                               {THIS IS AN ODD STATE}
    VEC_PIXEL;                          {TO SET LSB OF INT_MODEX }
    INT_MODEX[2];                       {INTERPOLATOR MODE}
    IF (OLD_SERP) THEN CUR_X_LD_INCR;   {ADJUST MINOR}
    IF (~OLD_SERP) THEN CUR_X_LD_DECR;          {ADJUST MINOR}
    CUR_MAJ_NDUMP;                      {SEND CURRENT MAJ TO INTERPOLATOR}
    ADD_VALID := ALMOST_ADD_V;
    VECTOR_TRAP := 1;                   {TELL OUTPUT IS IS A VECTOR PIXEL}
    AA_ROM_BANK[1] := OLD_INCR;
    ADD_NDUMP;                          {DUMP ADDRESS TO BUS}
    IF (~YCNT_EQ_0 * Y_MAJOR * C_IDX[2]) THEN
        BEGIN
        ES_STEP;
        IF (MAJ_DECX) THEN CUR_Y_LD_DECR;       {ADJUST MAJOR AXIS}
        IF (~MAJ_DECX) THEN CUR_Y_LD_INCR;      {ADJUST MAJOR AXIS}
        ADVANCE_PAT_1;  {LATCH LINE PATTERN INTO ITS PIPE}
        IF (LT_CNT_MINUS) THEN
            S_LTP_SFT
        ELSE
            S_LT_DEC;                   {STEP LINE TYPE WITH MAJOR AXIS}
        END;
    NEXT_STATE DRAW_VEC_STEP_3;
    END;

DRAW_VEC_STEP_3:
    BEGIN                               {THIS IS AN EVEN STATE}
    VEC_PIXEL;                          {TO SET LSB OF INT_MODEX}
    IF (STOPX) THEN
        NEXT_STATE DRAW_VEC_STEP_3
    ELSE
    BEGIN
    INT_MODEX[2];                       {INTERPOLATOR MODE}
    CUR_MAJ_NDUMP;                      {SEND CURRENT MAJ TO INTERPOLATOR}
    IF (Y_MAJOR) THEN
        ADD_LD_X_X                      {LOAD ADDRESS REGISTER}
    ELSE
        ADD_LD_Y_X;                     {LOAD ADDRESS REGISTER}
    NEXT_STATE DRAW_VEC_STEP_4;
    END;
    END;

DRAW_VEC_STEP_4:
    BEGIN                               {THIS IS AN ODD STATE}
    VEC_PIXEL;                          {TO SET LSB OF INT_MODEX }
    INT_MODEX[2];                       {INTERPOLATOR MODE}
    IF (OLD_SERP) THEN CUR_X_LD_INCR;   {ADJUST MINOR}
    IF (~OLD_SERP) THEN CUR_X_LD_DECR;          {ADJUST MINOR}
    CUR_MAJ_NDUMP;                      {SEND CURRENT MAJ TO INTERPOLATOR}
```

```
    ADD_VALID := Y_MAJOR + (~Y_MAJOR*~C_IDX[1]);
    EOS := ~Y_MAJOR * C_IDX[1];    {IF 2 PROC X MAJOR TELL OUTPUT}
    VECTOR_TRAP := 1;              {TELL OUTPUT IS IS A VECTOR PIXEL}
    AA_ROM_BANK[0] := 1;           {MIDDLE PIXEL}
    ADD_NDUMP;                     {DUMP ADDRESS TO BUS}
    IF(~YCNT_EQ_0) THEN
        BEGIN
        ES_STEP;
        IF (MAJ_DECX) THEN CUR_Y_LD_DECR;    {ADJUST MAJOR AXIS}
        IF (~MAJ_DECX) THEN CUR_Y_LD_INCR;   {ADJUST MAJOR AXIS}
        ADVANCE_PAT_1; {LATCH LINE PATTERN INTO ITS PIPE}
        IF (LT_CNT_MINUS) THEN
            S_LTP_SFT
        ELSE
            S_LT_DEC;              {STEP LINE TYPE WITH MAJOR AXIS}
        NEXT_STATE DRAW_VEC_6;
        END
    ELSE
        BEGIN
        DO_NOT_START_SIDE;         {END OF VECTOR SO TURN OFF SIDE}
        NEXT_STATE DRAW_VEC_FLUSH_1;   {CLEAN UP}
        END;
    END;

DRAW_VEC_FLUSH_1:
    BEGIN                          {THIS IS AN EVEN STATE}
    DO_NOT_START_SIDE;             {END OF VECTOR SO TURN OFF SIDE}
    VEC_PIXEL;                     {TO SET LSB OF INT_MODEX}
    IF (STOPX) THEN
        NEXT_STATE DRAW_VEC_FLUSH_1
    ELSE
        BEGIN
        INT_MODEX[2];              {INTERPOLATOR MODE}
        CUR_MAJ_NDUMP;             {SEND CURRENT MAJ TO INTERPOLATOR}
        IF (Y_MAJOR) THEN
            ADD_LD_X_X                    {LOAD ADDRESS REGISTER}
        ELSE
            ADD_LD_Y_X;                   {LOAD ADDRESS REGISTER}
        IF (COMMAND_FULLX*~SIDE_DOOR_BUSY) THEN
            BEGIN           {DO SAME AS STATE STARTA}
            D_CMD_X;        {DUMP E.S. CMD REG TO CMD BUS}
            TEMP_CMD_LD;    {LOAD TEMP CMD REG}
            COMMAND_TAKEN;  {TELL EDGE STEPPER COMMAND TAKEN}
            VEC_FLUSH_FLAG := 1;              {FLAG TO FINISH VECTOR}
            NEXT_STATE DISPATCH;              {SEE IF IT'S FOR ME}
            END
        ELSE
            BEGIN  {COMMAND NOT READY, GOTO FLUSH TO SYNC TO CLK25MHZX}
            NEXT_STATE DRAW_VEC_FLUSH_2;
            END;
        END;
    END;

DRAW_VEC_FLUSH_2:
    BEGIN                          {THIS IS AN ODD STATE}
    VEC_PIXEL;                     {TO SET LSB OF INT_MODEX}
```

```
            DO_NOT_START_SIDE;          {END OF VECTOR SO TURN OFF SIDE}
            INT_MODEX[2];               {INTERPOLATOR MODE}
            PRI_FLUSH_FLAG;
            ADD_VALID := ALMOST_ADD_V;
            VECTOR_TRAP := 1;           {TELL OUTPUT IS IS A VECTOR PIXEL}
            AA_ROM_BANK[1] := ALMOST_AA_ADR;
            AA_ROM_BANK[0] := ~AA_MD + OLD_HOLD;
            ADD_NDUMP;                  {DUMP ADDRESS TO BUS}
            CUR_MAJ_NDUMP;              {SEND CURRENT MAJ TO INTERPOLATOR}
            EOS := 1;                   {FORCE END OF PRIMATIVE}
            PIPE_LOCAL := 1;            {EOS * PIPE = EOP}
            NEXT_STATE STARTA;
            END;

{ ****************** PROCESS DRAW_TRAP COMMAND ******************}

DRAW_TRAP:
            BEGIN                       {THIS IS AN ODD STATE}
            DO_NOT_START_SIDE;          {DO NOT LET SIDE DOOR MACHINE RUN}
            IF(COM_BUSY)THEN
            NEXT_STATE DRAW_TRAP_WAIT   {LOOP UNTIL I CAN SEND COMMAND}
            ELSE
              BEGIN
              TEMP_CMD_NDUMP;
              COM_SET;                  {SET COMMAND INTO YW STACK}
              COM_LD;                   {TELL INTERPOLATOR COMMAND LOADED}
              NEXT_STATE DRAW_TRAP_2;
              END;
            END;

DRAW_TRAP_WAIT:                   {WAIT FOR INTERPOLATOR}
            BEGIN                       {THIS IS AN EVEN STATE}
            DO_NOT_START_SIDE;          {DO NOT LET SIDE DOOR MACHINE RUN}
            IF (PRI_FLUSH_FLAG) THEN PRI_FLUSH_FLAG;
            IF(W_FLAG*W_FRAC_FLAG_A) THEN S_WF_ADD;    {START W INTERPOLATION}
            IF(W_FLAG*W_FRAC_FLAG_B) THEN S_WFRT_ADD;  {START W INTERPOLATION}
            IF (STOPX) THEN
              NEXT_STATE DRAW_TRAP_WAIT
            ELSE
              NEXT_STATE DRAW_TRAP;     {GO BACK TO SEE IF I CAN DUMP CMD}
            END;

DRAW_TRAP_2:
            BEGIN                       {THIS IS AN EVEN STATE}
            IF (PRI_FLUSH_FLAG) THEN PRI_FLUSH_FLAG;
            IF(W_FLAG*W_FRAC_FLAG_A) THEN S_WF_ADD;    {START W INTERPOLATION}
            IF(W_FLAG*W_FRAC_FLAG_B) THEN S_WFRT_ADD;  {START W INTERPOLATION}
            IF (STOPX) THEN
              NEXT_STATE DRAW_TRAP_2
            ELSE
            BEGIN
            CNT_RESET;                  {GET COUNTER READY}
            CNT_NORM;                   {COUNT = 0 WHEN ENTERING TRAP_SET_UP_EVEN}
            NEXT_STATE DRAW_TRAP_3;
            END;
            END;
```

```
DRAW_TRAP_2X:
    BEGIN                        {THIS IS AN EVEN STATE}
    IF (STOPX) THEN
        NEXT_STATE DRAW_TRAP_2X
    ELSE
    BEGIN
    CNT_RESET;        {GET COUNTER READY}
    CNT_NORM;         {COUNT = 0 WHEN ENTERING TRAP_SET_UP_EVEN}
    IF(W_FLAG) THEN S_WF_ADD;        {START W INTERPOLATION}
    IF(W_FLAG) THEN S_WFRT_ADD;      {START W INTERPOLATION}
    NEXT_STATE DRAW_TRAP_3;
    END;
    END;

DRAW_TRAP_3:
    BEGIN                        {THIS IS AN ODD STATE}
    IF (YCNT_EQ_0) THEN          {CHECK IF DONE}
        BEGIN
        DO_NOT_START_SIDE;
        PRI_FLUSH_FLAG;
        EOS;                     {TELL OUTPUT EOP}
        PIPE_LOCAL;              {EOS + PIPE_LOCAL = EOP}
        NEXT_STATE STARTA;       {NO NEXT SCAN LINE TO RENDER}
        END
    ELSE
        BEGIN
        CUR_MAJ_LD;
        IF (((~MAJ_AXIS[1]*~MAJ_AXIS[0]*S0) +
            (~MAJ_AXIS[1]*MAJ_AXIS[0]*S1) +
            (MAJ_AXIS[1]*~MAJ_AXIS[0]*S2) +
            (MAJ_AXIS[1]*MAJ_AXIS[0]*S3)) THEN    {IF (MY_LINE) }
            BEGIN
            NEXT_STATE TRAP_SET_UP_EVEN;
            END
        ELSE
            BEGIN
            ES_STEP;              {STEP E.S. TO NEXT SCAN}
            CUR_Y_LD_INCR;        {ADJUST CURRENT Y}
            NEXT_STATE DRAW_TRAP_2X;
            END;
        END;
    END;

{*************** RENDERING LOOP FOR TRAPEZOID'S ******************}

TRAP_SET_UP_EVEN:               {SET UP SCAN LINE}
    BEGIN                        {THIS IS AN EVEN STATE}
    IF (FOUND_LINE*~NEW_SCAN_LINE) THEN FOUND_LINE;
    IF (KEEP_GOING_1) THEN KEEP_GOING_1;
    IF (KEEP_GOING_2) THEN KEEP_GOING_2;
    IF (KEEP_GOING_3) THEN KEEP_GOING_3;
    IF (STOPX) THEN
        BEGIN
        IF (W_FRAC_FLAG_A) THEN W_FRAC_FLAG_A;   {FLAG FROM ODD}
        CNT_NORM;                 {STOP THE COUNTER WHILE STOPPED}
```

```
            NEXT_STATE TRAP_SET_UP_EVEN;
            END
ELSE
    BEGIN
        CUR_MAJ_NDUMP;              {SEND CURRENT Y TO INTERPOLATOR}
        IF(W_FLAG*W_FRAC_FLAG_A) THEN S_WF_ADD;   {FLAG SET IN ODD}
        IF(W_FLAG*W_FRAC_FLAG_A) THEN S_WFRT_ADD;
        IF (~CNT[3]*~CNT[2]*~CNT[1]) THEN                    {COUNT = 000x}
            BEGIN
                SET_XS_FRAC;                {SAVE NO_XS_FRAC FOR THIS SCAN}
                ADD_LD_Y_Y;                 {MOVE CURRENT Y TO ADDRESS}
                IF (TM_MODEX) THEN
                    BEGIN
                    W_ROM_NDUMP;    {W_ROM EQUALS 1}
                    W_NDUMP;        {ENABLE 1 ONTO BUS}
                    INT_MODEX[3:0] := MODE_L1;
                    END
                ELSE
                    BEGIN
                        IF (SEC_COLORX) THEN
                            INT_MODEX[3:0] := MODE_L2
                        ELSE
                            INT_MODEX[3:0] := MODE_L3;
                    END;
            END;
        IF (~CNT[3]*~CNT[2]*CNT[1]) THEN                     {COUNT = 001x}
            BEGIN
                IF(NO_XS_FRAC) THEN         {IF NO FRAC THEN DO NOT ADJ}
                    CUR_X_LD_XS
                ELSE
                    CUR_X_LD_XS_INCR;
                IF (~SEC_COLORX*~TM_MODEX) THEN
                    BEGIN
                    XS_NDUMP;
                    XS_SET;
                    CNT_RESET;      {GET READY TO GO TO RENDER LOOP}
                    CNT_NORM;
                    INT_MODEX[3:0] := MODE_R3;
                    END;
                IF (~SEC_COLORX*TM_MODEX) THEN
                    INT_MODEX[3:0] := MODE_L3;
                IF (SEC_COLORX*~TM_MODEX) THEN
                    INT_MODEX[3:0] := MODE_L3;
                IF (SEC_COLORX*TM_MODEX) THEN
                    INT_MODEX[3:0] := MODE_L2;
            END;
        IF (~CNT[3]*CNT[2]*~CNT[1]) THEN                     {COUNT = 010x}
            BEGIN
                IF (~SEC_COLORX*TM_MODEX) THEN
                    BEGIN
                    W_ROM_NDUMP;    {W_ROM EQUALS 1}
                    W_NDUMP;        {ENABLE 1 ONTO BUS}
                    INT_MODEX[3:0] := MODE_R1;
                    END;
                IF (SEC_COLORX*~TM_MODEX) THEN
                    INT_MODEX[3:0] := MODE_R2;
```

```
            IF (SEC_COLORX*TM_MODEX) THEN
                INT_MODEX[3:0] := MODE_L3;
            END;
        IF (~CNT[3]*CNT[2]*CNT[1]) THEN                {COUNT = 011x}
        BEGIN
            IF (~SEC_COLORX*TM_MODEX) THEN
            BEGIN
                XS_NDUMP;
                XS_SET;
                CNT_RESET;         {GET READY TO GO TO RENDER LOOP}
                CNT_NORM;
                INT_MODEX[3:0] := MODE_R3;
            END;
            IF (SEC_COLORX*~TM_MODEX) THEN
            BEGIN
                XS_NDUMP;
                XS_SET;
                CNT_RESET;         {GET READY TO GO TO RENDER LOOP}
                CNT_NORM;
                INT_MODEX[3:0] := MODE_R3;
            END;
            IF (SEC_COLORX*TM_MODEX) THEN
            BEGIN
                W_ROM_NDUMP;       {W_ROM EQUALS 1}
                W_NDUMP;           {ENABLE 1 ONTO BUS}
                INT_MODEX[3:0] := MODE_R1;
            END;
        END;
        IF (CNT[3]*~CNT[2]*~CNT[1]) THEN               {COUNT = 100x}
        BEGIN
            IF (SEC_COLORX*TM_MODEX) THEN
                INT_MODEX[3:0] := MODE_R2;
        END;
        IF (CNT[3]*~CNT[2]*CNT[1]) THEN                {COUNT = 101x}
        BEGIN
            IF (SEC_COLORX*TM_MODEX) THEN
            BEGIN
                XS_NDUMP;
                XS_SET;
                CNT_RESET;         {GET READY TO GO TO RENDER LOOP}
                CNT_NORM;
                INT_MODEX[3:0] := MODE_R3;
            END;
        END;
        NEXT_STATE TRAP_SET_UP_ODD;
    END;
END;

TRAP_SET_UP_ODD:
    BEGIN                            {THIS IS AN ODD STATE}
        IF (INT_MODEX[3]) THEN INT_MODEX[3];   {SET SAME MODES AS EVEN}
        IF (INT_MODEX[2]) THEN INT_MODEX[2];   {SET SAME MODES AS EVEN}
        IF (INT_MODEX[1]) THEN INT_MODEX[1];   {SET SAME MODES AS EVEN}
        IF (INT_MODEX[0]) THEN INT_MODEX[0];   {SET SAME MODES AS EVEN}
        IF (FOUND_LINE) THEN FOUND_LINE;
        IF (~YCNT_EQ_0 * ~FOUND_LINE) THEN         {FIND NEXT SCAN}
```

```
BEGIN
    CUR_Y_LD_INCR;                  {ADJUST CURRENT Y}
    W_FRAC_FLAG_A;                  {SET TO ADJUST FRAC}
    W_FRAC_FLAG_B;                  {SET IN CASE OF GOTO TRAP_2}
    ES_STEP;                        {E.S. POINTS TO SCAN LINE N + 1}
    KEEP_GOING_1;    {USED TO TELL MUTLI PROC PASSED HERE ONCE}
    IF(~C_IDX[2] * ~C_IDX[1]) THEN FOUND_LINE;  {I.E. SINGLE PROC}
    IF (~C_IDX[2] * KEEP_GOING_1) THEN FOUND_LINE;  {2 PROC}
    IF (C_IDX[2] * KEEP_GOING_1) THEN KEEP_GOING_2;
    IF (C_IDX[2] * KEEP_GOING_2) THEN KEEP_GOING_3;
    IF (C_IDX[2] * KEEP_GOING_3) THEN FOUND_LINE;   {4 proc}
END;
CUR_MAJ_NDUMP;                      {SEND CURRENT Y TO INTERPOLATOR}
IF (~CNT[3]*~CNT[2]*~CNT[1]) THEN             {COUNT = 000x}
BEGIN
    SET_SWAP_MODE;                  {SET OR CLEARED BASED ON HOURGLASS}
    IF (TM_MODEX) THEN
        BEGIN
            W_ROM_NDUMP;            {W_ROM EQUALS 1}
            W_NDUMP;                {ENABLE 1 ONTO BUS}
        END;
    IF (~HOURGLASS*W_FLAG) THEN
        BEGIN
            W_REGS_LD_1;            {LOAD THE W REGISTERS}
        END;
    IF (HOURGLASS*W_FLAG) THEN
        BEGIN
            W_REGS_LD_2;            {LOAD THE W REGISTERS}
        END;
    IF (~HOURGLASS) THEN
        BEGIN
            D_XST_X;                {E.S. DUMP XS TO CMD BUS}
            D_XRT_Y;                {E.S. DUMP XE TO Y BUS}
            XS_LD_CMD_BUS;          {LOAD XS FROM COMMAND BUS}
            XE_LD_Y_BUS;            {LOAD XE FROM THE Y BUS}
        END
    ELSE
        BEGIN
            SWAP_MODE;              {TELL INTERPOLATOR WE SWAPPED}
            D_XST_X;                {E.S. DUMP XE TO CMD BUS}
            D_XRT_Y;                {E.S. DUMP XS TO Y BUS}
            XS_LD_Y_BUS;            {HOURGLASS SO LOAD XS FROM Y BUS}
            XE_LD_CMD_BUS;          {LOAD XE FROM THE CMD BUS}
        END;
    IF (~YCNT_EQ_0) THEN
        NEXT_STATE TRAP_SET_UP_EVEN
    ELSE
        BEGIN
            EOS;                    {TELL OUTPUT EOP}
            PIPE_LOCAL;             {EOS + PIPE_LOCAL = EOP}
            NEXT_STATE STARTA;      {CHECK LAST YCNT FROM RENDER LOOP}
        END;
END;
IF (~CNT[3]*~CNT[2]*CNT[1]) THEN              {COUNT = 001x}
BEGIN
    IF (~SEC_COLORX*~TM_MODEX) THEN
```

```
            BEGIN
                XE_NDUMP;
                XE_SET;
                IF (NO_X_SCAN * ~NO_XS_FRAC)THEN  {DON'T DO CURRENT SCAN}
                    NEXT_STATE DRAW_TRAP_2
                ELSE
                    NEXT_STATE TRAP_RENDER_EVEN;
                END
            ELSE
                NEXT_STATE TRAP_SET_UP_EVEN;
            END;
        IF (~CNT[3]*CNT[2]*~CNT[1]) THEN                {COUNT = 010x}
        BEGIN
            IF (~SEC_COLORX*TM_MODEX) THEN
                BEGIN
                    W_ROM_NDUMP;     {W_ROM EQUALS 1}
                    W_NDUMP;         {ENABLE 1 ONTO BUS}
                END;
            NEXT_STATE TRAP_SET_UP_EVEN;
        END;
        IF (~CNT[3]*CNT[2]*CNT[1]) THEN                 {COUNT = 011x}
        BEGIN
            IF (~SEC_COLORX*TM_MODEX + SEC_COLORX*~TM_MODEX) THEN
                BEGIN
                    XE_NDUMP;
                    XE_SET;
                    IF (NO_X_SCAN * ~NO_XS_FRAC)THEN  {DON'T DO CURRENT SCAN}
                        NEXT_STATE DRAW_TRAP_2
                    ELSE
                        NEXT_STATE TRAP_RENDER_EVEN;
                END;
            IF (SEC_COLORX*TM_MODEX) THEN
                BEGIN
                    W_ROM_NDUMP;     {W_ROM EQUALS 1}
                    W_NDUMP;         {ENABLE 1 ONTO BUS}
                    NEXT_STATE TRAP_SET_UP_EVEN;
                END;
        END;
        IF (CNT[3]*~CNT[2]*~CNT[1]) THEN                {COUNT = 100x}
        BEGIN
            NEXT_STATE TRAP_SET_UP_EVEN;
        END;
        IF (CNT[3]*~CNT[2]*CNT[1]) THEN                 {COUNT = 101x}
        BEGIN
            XE_NDUMP;
            XE_SET;
            IF (NO_X_SCAN * ~NO_XS_FRAC)THEN    {DON'T DO CURRENT SCAN}
                NEXT_STATE DRAW_TRAP_2
            ELSE
                NEXT_STATE TRAP_RENDER_EVEN;
            END;
        END;

TRAP_RENDER_EVEN:               {RENDER PIXEL LOOP}
    BEGIN                       {THIS IS AN EVEN STATE}
```

```
IF (FOUND_LINE) THEN FOUND_LINE;
IF (KEEP_GOING_1) THEN KEEP_GOING_1;
IF (KEEP_GOING_2) THEN KEEP_GOING_2;
IF (KEEP_GOING_3) THEN KEEP_GOING_3;
IF (W_FRAC_FLAG_A) THEN W_FRAC_FLAG_A;        {FLAG FROM ODD}
IF (STOPX) THEN
   BEGIN
   CNT_NORM;                      {STOP THE COUNTER WHILE STOPPED}
   NEXT_STATE TRAP_RENDER_EVEN;
   END
ELSE
   BEGIN
   CUR_X_NDUMP;
   IF(W_FLAG*W_FRAC_FLAG_A) THEN S_WF_ADD;    {FLAG SET IN ODD}
   IF(W_FLAG*W_FRAC_FLAG_A) THEN S_WFRT_ADD;
   IF (~CNT[3]*~CNT[2]*~CNT[1]) THEN                    {COUNT = 000x}
      BEGIN
      ADD_LD_X_X;
      IF (TM_MODEX) THEN
         BEGIN
         INT_MODEX[3:0] := MODE_P1;
         W_ROM_NDUMP;       {W_ROM EQUALS 1}
         W_NDUMP;           {ENABLE 1 ONTO BUS}
         END
      ELSE
         BEGIN
         IF (W_FLAG) THEN
            BEGIN
            WE_NDUMP;
            W_NDUMP;
            END
         ELSE
            BEGIN
            W_ROM_NDUMP;
            W_NDUMP;
            END;
         IF(SEC_COLORX) THEN
            INT_MODEX[3:0] := MODE_P2     {TM = 0 SEC = 1}
         ELSE
            BEGIN                           {TM = 0 SEC = 0}
            CNT_RESET;               {GET READY FOR NEXT PIXEL}
            CNT_NORM;
            INT_MODEX[3:0] := MODE_P3
            END;
         END;
      END;
   IF (~CNT[3]*~CNT[2]*CNT[1]) THEN                     {COUNT = 001x}
      BEGIN
      IF (W_FLAG) THEN
         BEGIN
         WE_NDUMP;
         W_NDUMP;
         END
      ELSE
         BEGIN
         W_ROM_NDUMP;
```

```
              W_NDUMP;
              END;
           IF (SEC_COLORX*TM_MODEX) THEN
              INT_MODEX[3:0] := MODE_P2
           ELSE
              BEGIN
              CNT_RESET;                    {GET READY FOR NEXT PIXEL}
              CNT_NORM;
              INT_MODEX[3:0] := MODE_P3;
              END;
           END;
        IF (~CNT[3]*CNT[2]) THEN            {COUNT = 01xx}
           BEGIN
           IF (W_FLAG) THEN
              BEGIN
              WE_NDUMP;
              W_NDUMP;
              END
           ELSE
              BEGIN
              W_ROM_NDUMP;
              W_NDUMP;
              END;
           CNT_RESET;                       {GET READY FOR NEXT PIXEL}
           CNT_NORM;
           INT_MODEX[3:0] := MODE_P3;
           END;
        NEXT_STATE TRAP_RENDER_ODD;
        END;
     END;

TRAP_RENDER_ODD:
  BEGIN                                     {THIS IS AN ODD STATE}
  IF (INT_MODEX[3]) THEN INT_MODEX[3];      {SET SAME MODES AS EVEN}
  IF (INT_MODEX[2]) THEN INT_MODEX[2];      {SET SAME MODES AS EVEN}
  IF (INT_MODEX[1]) THEN INT_MODEX[1];      {SET SAME MODES AS EVEN}
  IF (INT_MODEX[0]) THEN INT_MODEX[0];      {SET SAME MODES AS EVEN}
  IF (FOUND_LINE) THEN FOUND_LINE;
  CUR_X_NDUMP;
  ADD_NDUMP;
  IF (~YCNT_EQ_0 * ~FOUND_LINE) THEN        {FIND NEXT SCAN}
        BEGIN                               {NOTE SET UP DOES FIRST FEW PASSES}
        CUR_Y_LD_INCR;                      {ADJUST CURRENT Y}
        W_FRAC_FLAG_A;                      {SET TO ADJUST FRAC}
        W_FRAC_FLAG_B;                      {SET IN CASE OF GOTO TRAP_2}
        ES_STEP;                            {E.S. POINTS TO SCAN LINE N + 1}
        IF (C_IDX[2] * KEEP_GOING_2) THEN KEEP_GOING_3;
        IF (C_IDX[2] * KEEP_GOING_3) THEN FOUND_LINE;  {4 proc}
        END;
     IF (~CNT[3]*~CNT[2]*~CNT[1]) THEN      {COUNT = 000x}
        BEGIN
        ADD_VALID;
        IF (X_END) THEN
           BEGIN
           EOS;                             {END OF SCAN}
           IF (YCNT_EQ_0) THEN
```

```
              BEGIN
                 PIPE_LOCAL;              {TELL OUTPUT EOP (EOS*PIPE=EOP)}
              END;
           END;
        END;
   IF (INT_MODEX[2]) THEN              {MODE_P1}
     BEGIN
        W_ROM_NDUMP;    {W_ROM EQUALS 1}
        W_NDUMP;                     {ENABLE 1 ONTO BUS}
        NEXT_STATE TRAP_RENDER_EVEN;
     END;
   IF (~INT_MODEX[2]*~INT_MODEX[0]) THEN    {MODE_P2}
     BEGIN
        IF (W_FLAG) THEN
           BEGIN
           WS_NDUMP;
           W_NDUMP;
           END
        ELSE
           BEGIN
           W_ROM_NDUMP;
           W_NDUMP;
           END;
        NEXT_STATE TRAP_RENDER_EVEN;
     END;
   IF (INT_MODEX[0]) THEN                        {MODE_P3}
     BEGIN
        CUR_X_LD_INCR;
        IF (W_FLAG) THEN
           BEGIN
           WS_NDUMP;
           W_NDUMP;
           END
        ELSE
           BEGIN
           W_ROM_NDUMP;
           W_NDUMP;
           END;
        IF (X_END) THEN
           BEGIN
              IF (YCNT_EQ_0) THEN
                 BEGIN
                 DO_NOT_START_SIDE;
                 PRI_FLUSH_FLAG;
                 NEXT_STATE STARTA;
                 END
              ELSE
                 BEGIN
                    IF (FOUND_LINE) THEN
                       BEGIN
                       CUR_MAJ_LD;
                       NEW_SCAN_LINE;
                       NEXT_STATE TRAP_SET_UP_EVEN;
                       END
                    ELSE              {LOOK FOR NEXT SCAN LINE}
                       NEXT_STATE DRAW_TRAP_2;
```

```
                    END;
                END
            ELSE
                NEXT_STATE TRAP_RENDER_EVEN;
            END;
        END;

OTHERWISE
      BEGIN
        ?X_STEPPER[0];
        ?X_STEPPER[1];
        ?X_STEPPER[2];
        ?X_STEPPER[3];
        ?X_STEPPER[4];
        ?X_STEPPER[5];
        ?X_STEPPER[6];
        ?X_STEPPER[7];
        ?X_STEPPER[8];
        ?X_STEPPER[9];
        ?X_STEPPER[10];
        ?X_STEPPER[11];
        ?X_STEPPER[12];
        ?X_STEPPER[13];
        ?X_STEPPER[14];
        ?X_STEPPER[15];
        ?X_STEPPER[16];
        ?X_STEPPER[17];
        ?X_STEPPER[18];
        ?X_STEPPER[19];
        ?X_STEPPER[20];
        ?X_STEPPER[21];
        ?X_STEPPER[22];
        ?X_STEPPER[23];
    ?FLUSH_FLAG;
    ?VERTEX_FLAG;
    ?CMD_FLUSH_FLAG;
    ?SCAN_FLUSH_FLAG;
    ?VEC_FLUSH_FLAG;
    ?PRI_FLUSH_FLAG;
    ?FOUND_LINE;
    ?KEEP_GOING_1;
    ?KEEP_GOING_2;
    ?KEEP_GOING_3;
    ?NEW_SCAN_LINE;
    ?W_FRAC_FLAG_A;
    ?W_FRAC_FLAG_B;
    ?SET_SERP;
    ?SET_SAVE;
    ?SET_SAVE_1;
    ?SET_SLOPE;
    ?VEC_PIXEL;
    ?CNT_RESET;
    ?CNT_NORM;
    ?ADD_VALID;
    ?EOS;
```

```
?VECTOR_TRAP;
?PIPE_LOCAL;
?ADVANCE_PAT_1;
?ADVANCE_PAT_3;
?CUR_Y_LD_Y_BUS;
?CUR_Y_LD_INCR;
?CUR_Y_LD_DECR;
?CUR_MAJ_LD;
?CUR_MAJ_NDUMP;
?XS_LD_CMD_BUS;
?XS_LD_Y_BUS;
?XS_NDUMP;
?CUR_X_LD_XS;
?CUR_X_LD_XS_INCR;
?CUR_X_NDUMP;
?CUR_X_LD_INCR;
?CUR_X_LD_DECR;
?ADD_LD_X_X;
?ADD_LD_X_Y;
?ADD_LD_Y_X;
?ADD_LD_Y_Y;
?ADD_NDUMP;
?XE_LD_Y_BUS;
?XE_LD_CMD_BUS;
?XE_NDUMP;
?W_REGS_LD_1;
?W_REGS_LD_2;
?WS_NDUMP;
?WE_NDUMP;
?W_NDUMP;
?W_ROM_NDUMP;
?CUR_CMD_LD;
?TEMP_CMD_LD;
?TEMP_CMD_NDUMP;
?MODE_REG_LD;
?MODE_REG_NDUMP;
?FRAC_REG_LD;
?AA_ROM_BANK[1];
?AA_ROM_BANK[0];
?IN_BUFFER_TAKEN;
?SFT_ES_A_IN;
?SFT_ES_B_IN;
?SFT_ES_COUNT_IN;
?D_CMD_X;
?D_XST_X;
?D_YSL_X;
?D_XRT_Y;
?D_YST_Y;
?S_LT_DEC;
?S_LTP_SFT;
?RESET_LINETYPE;
?S_WF_ADD;
?S_WFRT_ADD;
?ES_STEP;
?INT_MODEX[3];
?INT_MODEX[2];
```

```
            ?INT_MODEX[1];
            ?XS_SET;
            ?XE_SET;
            ?COM_SET;
            ?COM_LD;
            ?DATA_LD;
              END;

END;                               {END OF CASE}
      END;                                  {END OF MACHINE X-STEPPER}

{*********************************************************************
****                                                              ****
****                MACHINE SIDE_DOOOR                            ****
****                                                              ****
*********************************************************************}

MACHINE SIDE_DOOR;
      BEGIN
      IF RESETX_2 THEN
         BEGIN
         ?SIDE_FLUSH_FLAG;
         ?SIDE_DOOR_CMD;
         NEXT_STATE CHECK_X_STEPPER;
         END
      ELSE
         CASE PRESENT_STATE OF
         CHECK_X_STEPPER:
            BEGIN
            IF (DO_NOT_START_SIDE + CLK25MHZX) THEN   {X_STEPPER IN CONTROL}
               NEXT_STATE CHECK_X_STEPPER
            ELSE
               IF (COMMAND_FULLX) THEN                {E.S. HAS A COMMAND}
                  NEXT_STATE SIDE_DOOR_2
               ELSE
                  NEXT_STATE CHECK_X_STEPPER;
            END;                            {END OF STATE CHECK_X_STEPPER}

SIDE_DOOR_2:
            BEGIN
            IF (DO_NOT_START_SIDE) THEN               {X_STEPPER IN CONTROL}
               NEXT_STATE CHECK_X_STEPPER   {CHECK AGAIN, DO TO DELAY}
            ELSE
               IF (COMMAND_FULLX) THEN                {E.S. HAS A COMMAND}
                  BEGIN
                  SIDE_DOOR_BUSY;
                  IF (SCAN_DECODEX *
                      (~CMDS[7]*~CMDS[6]*CMDS[5]*~CMDS[4]*CMDS[3])) THEN
                     NEXT_STATE SIDE_DOOR_3   {PROCESS VERTEX COMMAND}
                  ELSE
                     NEXT_STATE CHECK_X_STEPPER     {ONLY PASS VERTEX}
                  END;
            END;                            {END OF STATE SIDE_DOOR_2}

SIDE_DOOR_3:
```

```
      BEGIN
      SIDE_DOOR_BUSY;
      IF (~CLK25MHZX) THEN         {SYNC TO CLOCK}
         BEGIN
            IF(VEC_PIXEL) THEN     {DUMP THIS STATE (X_S RENDERING VEC)}
               BEGIN
               D_CMD_X;
               TEMP_CMD_LD;
               COMMAND_TAKEN;              {TELL E.S. THAT COMMAND TAKEN}
               END;
            NEXT_STATE SIDE_DOOR_4;
         END
      ELSE
         NEXT_STATE SIDE_DOOR_3;
      END;                         {END OF STATE SIDE_DOOR_3}

SIDE_DOOR_4:
      BEGIN
      SIDE_DOOR_BUSY;
      SIDE_DOOR_CMD;               {TELL INTERPOLATOR CMD IS SENT}
      SIDE_FLUSH_FLAG;             {SEND WORD TO INTERPOLATOR}
      IF(~VEC_PIXEL) THEN          {DUMP THIS STATE (X_S RENDERING TRAP)}
         BEGIN
         D_CMD_X;
         TEMP_CMD_LD;
         COMMAND_TAKEN;            {TELL E.S. THAT COMMAND TAKEN}
         END;
      NEXT_STATE SIDE_DOOR_5;
      END;                         {END OF STATE SIDE_DOOR_4}

SIDE_DOOR_5:            {STATES 5 AND 6 PASS VERTEX DATA}
      BEGIN
      SIDE_DOOR_BUSY;
      IF (SIDE_FLUSH_FLAG) THEN SIDE_FLUSH_FLAG;
      IF (SIDE_DOOR_CMD) THEN SIDE_DOOR_CMD;
      IF (COMMAND_FULLX * ~SIDE_FLUSH_FLAG * VEC_PIXEL)  THEN
                                   {INPUT FULL & I'M NOT}
         BEGIN
         IF (COMMAND_BITX) THEN    {GONE ON TO NEXT COMMAND}
            NEXT_STATE CHECK_X_STEPPER
         ELSE
            BEGIN
            D_CMD_X;
            TEMP_CMD_LD;
            COMMAND_TAKEN;              {TELL E.S. THAT COMMAND TAKEN}
            SIDE_FLUSH_FLAG;            {FLUSH DATA NEXT STATE}
            NEXT_STATE SIDE_DOOR_6;
            END;
         END
      ELSE
         NEXT_STATE SIDE_DOOR_6;
      END;                         {END OF STATE SIDE_DOOR_5}

SIDE_DOOR_6:
      BEGIN
      SIDE_DOOR_BUSY;
```

```
        IF (SIDE_FLUSH_FLAG) THEN
            BEGIN
            IF (~COM_BUSY) THEN     {SEND THE WORD TO YW STACK}
                BEGIN
                TEMP_CMD_NDUMP;     {DUMP DATA AND CMD FOR VERTEX CMD}
                COM_SET;            {SET COMMAND INTO YW STACK}
                IF (SIDE_DOOR_CMD) THEN
                    COM_LD
                ELSE
                    DATA_LD;        {TELL INTERPOLATOR DATA LOADED}
                END
            ELSE
                BEGIN
                SIDE_FLUSH_FLAG;
                IF (SIDE_DOOR_CMD) THEN SIDE_DOOR_CMD;
                END;
            END;
        IF (COMMAND_FULLX * ~COM_BUSY * ~VEC_PIXEL)   THEN
                                    {INPUT FULL & I'M NOT}
            BEGIN
            IF (COMMAND_BITX) THEN  {GONE ON TO NEXT COMMAND}
                NEXT_STATE CHECK_X_STEPPER
            ELSE
                BEGIN
                D_CMD_X;
                TEMP_CMD_LD;
                COMMAND_TAKEN;      {TELL E.S. THAT COMMAND TAKEN}
                SIDE_FLUSH_FLAG;    {FLUSH DATA NEXT STATE}
                NEXT_STATE SIDE_DOOR_5;
                END;
            END
        ELSE
            NEXT_STATE SIDE_DOOR_5;
        END;                        {END OF STATE SIDE_DOOR_6}

OTHERWISE
        BEGIN
        ?SIDE_DOOR[0];
        ?SIDE_DOOR[1];
        ?SIDE_DOOR[2];
    ?SIDE_FLUSH_FLAG;
    ?SIDE_DOOR_CMD;
        END;

END;                            {END OF CASE}
END;                                {END OF MACHINE SIDE_DOOR}
```

What is claimed is:

1. Stepper means for generating data defining minor axis coordinates of pixels composing an antialiased vector to be rendered in a computer graphics system, said antialiased vector comprising multiple sets of pixels, each set being composed of multiple pixels positioned at a given major axis coordinate and the pixels of a given set being positioned at different minor axis coordinates, the appearance of the respective pixels of a set being defined in part by a distribution pattern represented by antialiasing filter values stored in a filter memory, the filter value for a given pixel being selected on the basis of at least a subpixel position defined as a fractional part of the given pixel's minor axis coordinate, the stepper means comprising:

(i) input means for receiving input data defining the vector to be rendered, said input data including major axis start data, minor axis start data, and slope data, wherein said slope data defines a slope of the vector to be rendered and said minor axis start data is composed of an integer part and a fractional part;

(ii) first register means, coupled to said input means, for storing said major axis start data, the contents of said first register means defining current major axis data;

(iii) second register means, coupled to said input means, for storing said minor axis start data;

(iv) third register means, coupled to said second register means, for storing at least the integer part of said minor axis start data, the contents of said third register means defining current minor axis data;

(v) minor step means, coupled to said third register means, for adjusting said current minor axis data to define a minor axis coordinate for one or more additional pixels of the set of pixels positioned at the major axis coordinate defined by said current major axis data wherein said minor axis coordinate(s) of said additional pixel(s) includes an integer part and a fractional part, the fractional part defining the additional pixel's subpixel position;

(vi) means for addressing said filter memory in accordance with the fractional parts of the respective minor axis coordinates of the pixels composing a set to thereby access the filter values for use in defining the antialiased vector; and (vii) said filter memory storing antialiasing filter values.

2. The apparatus recited in claim 1, wherein said input data further includes major axis end data and said contents of said third register means further defines current major axis data, and further comprising:

fourth register means, coupled to said input data means, for storing said major axis end data; and first comparator means, coupled to said third and fourth register means, for comparing said current major axis data to said major axis end data and producing a signal indicative of the result of the comparison.

3. The apparatus recited in claim 1, further comprising major step means, coupled to said first register means, for adjusting said current major axis data.

4. The apparatus recited in claim 1, wherein said filter values are addressable in accordance with particular combinations of vector slope and minor axis subpixel position corresponding to a pixel to be rendered.

5. The apparatus recited in claim 4, further comprising means for providing address data to said filter memory to access said filter values, said address data indicative of said slope and minor axis subpixel position.

6. The apparatus recited in claim 5, further comprising means for generating data for three minor axis positions corresponding to three pixels at each major axis step.

7. The apparatus recited in claim 6, wherein said input data further comprises endpoint color data defining color values corresponding to endpoints of said vector to be rendered.

8. The apparatus recited in claim 7 in combination with color interpolator means for receiving said endpoint color data and interpolating color data for each pixel composing said vector.

9. The apparatus recited in claim 8, further comprising a frame buffer and blending means, coupled between said color interpolator means and said frame buffer, for computing new pixel data for said vector to be rendered, said new pixel data based upon said filter values and color data.

10. The apparatus recited in claim 9, wherein said new pixel data is computed in accordance with the following formula:

$$\text{NEW\_FRAME\_STORE\_DATA} = \text{GAMMA}[\text{ALPHA}^*(\text{NEW\_COLOR}) + ((1-\text{ALPHA})^*(\text{GAMMA}^{-1}[\text{OLD\_DATA}]))],$$

wherein GAMMA represents a prescribed function, NEW_FRAME_STORE_DATA represents said new pixel data, NEW_COLOR represents said color data, ALPHA represents said filter values and OLD_DATA represents data formerly stored in said frame buffer.

11. The apparatus recited in claim 5, further comprising means for generating data for at least two minor axis positions corresponding to at least two pixels at each major axis step.

12. A computer graphics system, comprising:

a) image creation means for rendering an image composed of at least one antialiased vector represented by a plurality of pixels, said antialiased vector comprising multiple sets of pixels, each set being composed of multiple pixels positioned at a given major axis coordinate and the pixels of a given set being positioned at different minor axis coordinates, the appearance of the respective pixels of a set being defined in part by a distribution pattern represented by antialiasing filter values stored in a filter memory, the filter value for a given pixel being selected on the basis of at least a subpixel position defined as a fractional part of the given pixel's minor axis coordinate,, said image creation means comprising:

i) computing means for computing color data corresponding to endpoints of said vector and for computing major and minor axis position data for at least one pixel at each of a plurality of major axis steps;

(ii) filter memory means for storing predetermined antialiasing filter values, each value stored at a unique memory address;

(iii) stepper means, coupled to said computing means and said filter memory means, comprising (1) means for receiving input data defining the position of a first pixel composing the vector to be rendered, (2) means for computing, on the basis of said input data, respective minor axis ordinates of at least one additional pixel for antialiasing said vector, and (3) means for addressing filter values for said first pixel and said additional pixel(s); and (iv) color interpolator means for receiving said endpoint color data and position data for at least one pixel at each major axis step of said vector, and on the basis thereof interpolating color data for each pixel composing said vector;

b) blending means, coupled to said color interpolator means, for computing new pixel data for said vector to be rendered, said new pixel data based upon said filter values and color data; and c) frame buffer means, coupled to said blending means, for storing said new pixel data.

13. The computer graphics system recited in claim 12, wherein said input data includes major axis start data, minor axis start data, and slope data, wherein said slope data defines a slope of the vector to be rendered and said minor axis start data is composed of an integer part and a fractional part, and said stepper means comprises:

first register means, coupled to said input means, for storing said major axis start data, the contents of said first register means defining current major axis data;

second register means, coupled to said input means, for storing said minor axis start data;

third register means, coupled to said second register means, for storing at least the integer part of said minor axis start data, the contents of said third register means defining current minor axis data; and minor step means, coupled to said third register means, for adjusting said current minor axis data, whereby minor axis data for additional pixels corresponding to said current major and minor axis data are generated.

14. The computer graphics system recited in claim 13, wherein said input data further includes major axis end data and said contents of said third register means further defines current major axis data, and further comprising:

fourth register means, coupled to said input data means, for storing said major axis end data; and first comparator means, coupled to said third and fourth register means, for comparing said current major axis data to said major axis end data and producing a signal indicative of the result of the comparison.

15. The computer graphics system recited in claim 13, further comprising major step means, coupled to said first register means, for adjusting said current major axis data.

\* \* \* \* \*